US007194124B2

(12) United States Patent
Soll et al.

(10) Patent No.: US 7,194,124 B2
(45) Date of Patent: Mar. 20, 2007

(54) RECONSTRUCTION AND MOTION ANALYSIS OF AN EMBRYO

(75) Inventors: David R. Soll, Iowa City, IA (US); Edward R. Voss, Iowa City, IA (US); Paul J. Heid, Coralville, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 663 days.

(21) Appl. No.: 10/409,838

(22) Filed: Apr. 9, 2003

(65) Prior Publication Data
US 2004/0076315 A1 Apr. 22, 2004

Related U.S. Application Data

(60) Provisional application No. 60/371,043, filed on Apr. 9, 2002.

(51) Int. Cl.
*G06K 9/00* (2006.01)
(52) U.S. Cl. ........................ 382/133; 382/257
(58) Field of Classification Search ................ 382/128, 382/131, 133, 154, 199, 256, 257; 345/419, 345/427; 128/922
See application file for complete search history.

(56) References Cited

U.S. PATENT DOCUMENTS

| 5,396,418 A | 3/1995 | Heuscher | 364/413.18 |
| 5,655,028 A | 8/1997 | Soll et al. | 382/133 |
| 2003/0108231 A1* | 6/2003 | Hamahashi et al. | 382/133 |

FOREIGN PATENT DOCUMENTS

| WO | WO-99/67739 A1 | 12/1999 |
| WO | WO-00/48509 A1 | 8/2000 |
| WO | WO-02/01251 A3 | 1/2002 |

OTHER PUBLICATIONS

Soll, "Computer-assisted three-dimensional reconstruction and motion analysis of living, crawling cells," *Computerized Medical Imaging and Graphics*, vol. 23, No. 1, Jan. 1999, pp. 3-14.*
Heid et al., "3D-DIASemb: A Computer-Assisted System for Reconstructing and Motion Analyzing in 4D Every Cell and Nucleus in a Developing Embryo," *Developmental Biology*, vol. 245, No. 2, May 2002, pp. 329-347.*
Devries, J. H., et al., "Four-Dimensional Imaging: Computer Visualization of 3D Movements in Living Specimens", *Science*, 273, (1996), 603-607.

* cited by examiner

*Primary Examiner*—Andrew W. Johns
(74) *Attorney, Agent, or Firm*—Schwegman, Lundberg, Woessner, & Kluth, P.A.

(57) ABSTRACT

In an embodiment, a method includes receiving a number of optical sections of different parts of an embryo over time along a Z-axis through differential interference contrast microscopy. The method also includes outlining a perimeter of the number of parts of the embryo within the number of optical sections. Additionally, the method includes generating a three-dimensional faceted image of the number of parts based on the outlined perimeter. The method includes reconstructing, separately, a four-dimensional image of a growth of the different parts of the embryo over time based on the three-dimensional facet image of the number of parts.

35 Claims, 41 Drawing Sheets

FIG. 17

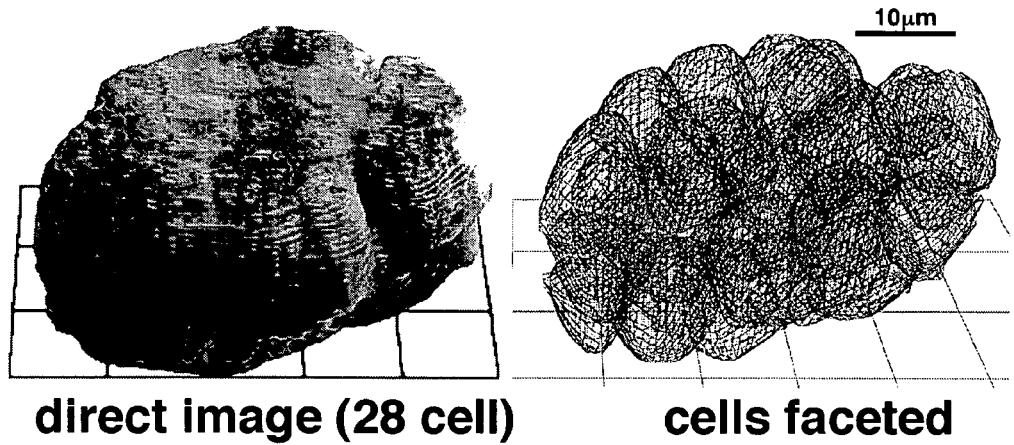
direct image (28 cell)          cells faceted
FIG. 21A                         FIG. 21B
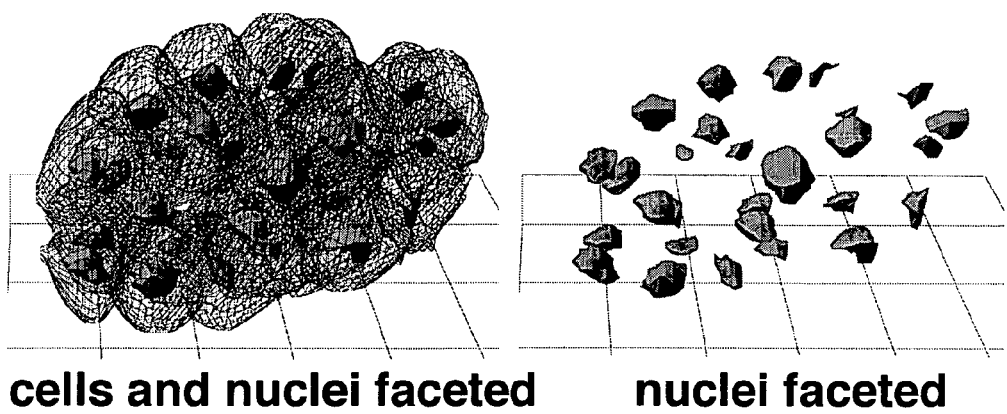
cells and nuclei faceted         nuclei faceted
FIG. 21C                         FIG. 21D

RECONSTRUCTION AND MOTION ANALYSIS OF AN EMBRYO

RELATED APPLICATION

This application claims priority under 35 U.S.C. 119(e) to U.S. Provisional Application Ser. No. 60/371,043, filed Apr. 9, 2002, which application is incorporated herein by reference.

STATEMENT OF GOVERNMENT RIGHTS

This invention was made, at least in part, with a grant from the Government of the United States (Contract No. HD-18577, from the National Institutes of Health). The Government may have certain rights to the invention.

FIELD OF THE INVENTION

The present invention relates generally to motion analysis, and more particularly to a system and method for reconstruction and motion analysis of cells and nuclei in a developing embryo.

BACKGROUND

The analysis of the behavior of motile, living cells using computer-assisted systems comprises a crucial tool in understanding, for example, the reasons why cancer cells become metastic, the reasons why HIV infected cells do not perform their normal functions, and the roles of specific cytoskeletal and signaling molecules in cellular locomotion during embryonic development and during cellular responses in the immune system. Further, motion analysis systems have been used to analyze the parameters of the shape and motion of objects in a variety of diverse fields. For example, such systems have been used for analysis of such diverse dynamic phenomena as the explosion of the space shuttle Challenger, echocardiography, human kinesiology, insect larvae crawling, sperm motility, bacterial swimming, cell movement and morphological change, shape changes of the embryonic heart, breast movement for reconstructive surgery, and the like. Often times, the information required to analyze such systems requires manual gathering of data. For example, in analyzing embryonic heart action, a researcher would display an echocardiograph of a heart on a monitor and make measurements of the monitor using a scale, or the like, held up to the screen. The tedious and time consuming nature of these types of manual measurements severely limits the practicality of such an approach.

Moreover, the patterns of a higher eukaryotic organism are laid down during embryogenesis. In this process, cell multiplication, cell differentiation, the definition of the body axes, cell and tissue reorganization and the genesis of organ systems progress in an integrated fashion both in time and space. With the advent of molecular and genetic tools, and sequencing of entire genomes, the regulatory mechanisms underlying the different aspects of embryogenesis are rapidly being elucidated.

SUMMARY OF THE INVENTION

In an embodiment, a method includes receiving a number of optical sections of different parts of an embryo over time along a Z-axis through differential interference contrast microscopy. The method also includes outlining a perimeter of the number of parts of the embryo within the number of optical sections. Additionally, the method includes generating a three-dimensional faceted image of the number of parts based on the outlined perimeter. The method includes reconstructing, separately, a four-dimensional image of a growth of the different parts of the embryo over time based on the three-dimensional facet image of the number of parts.

BRIEF DESCRIPTION OF THE DRAWINGS

In the following description of example embodiments of the invention, reference is made to the accompanying drawings which form a part hereof, and which is shown by way of illustration only, specific embodiments in which the invention may be practiced. It is to be understood that other embodiments may be utilized and structural changes may be made without departing from the scope of the present invention. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings:

FIG. 17 illustrates a graphical user interface screen to allow for selection from a plurality of parameters representing the motility and morphology of an object, according to one embodiment of the invention.

FIG. 21A illustrates a "direct image" reconstruction, according to one embodiment of the invention.

FIG. 21B illustrates a faceted image reconstruction of cell surfaces alone, according to an embodiment of the invention.

FIG. 21C illustrates a faceted image reconstruction of cell surfaces with nontransparent nuclei, according to an embodiment of the invention.

FIG. 21D illustrates a nontransparent reconstruction of nuclei alone, according to an embodiment of the invention.

DETAILED DESCRIPTION

Figure 1:
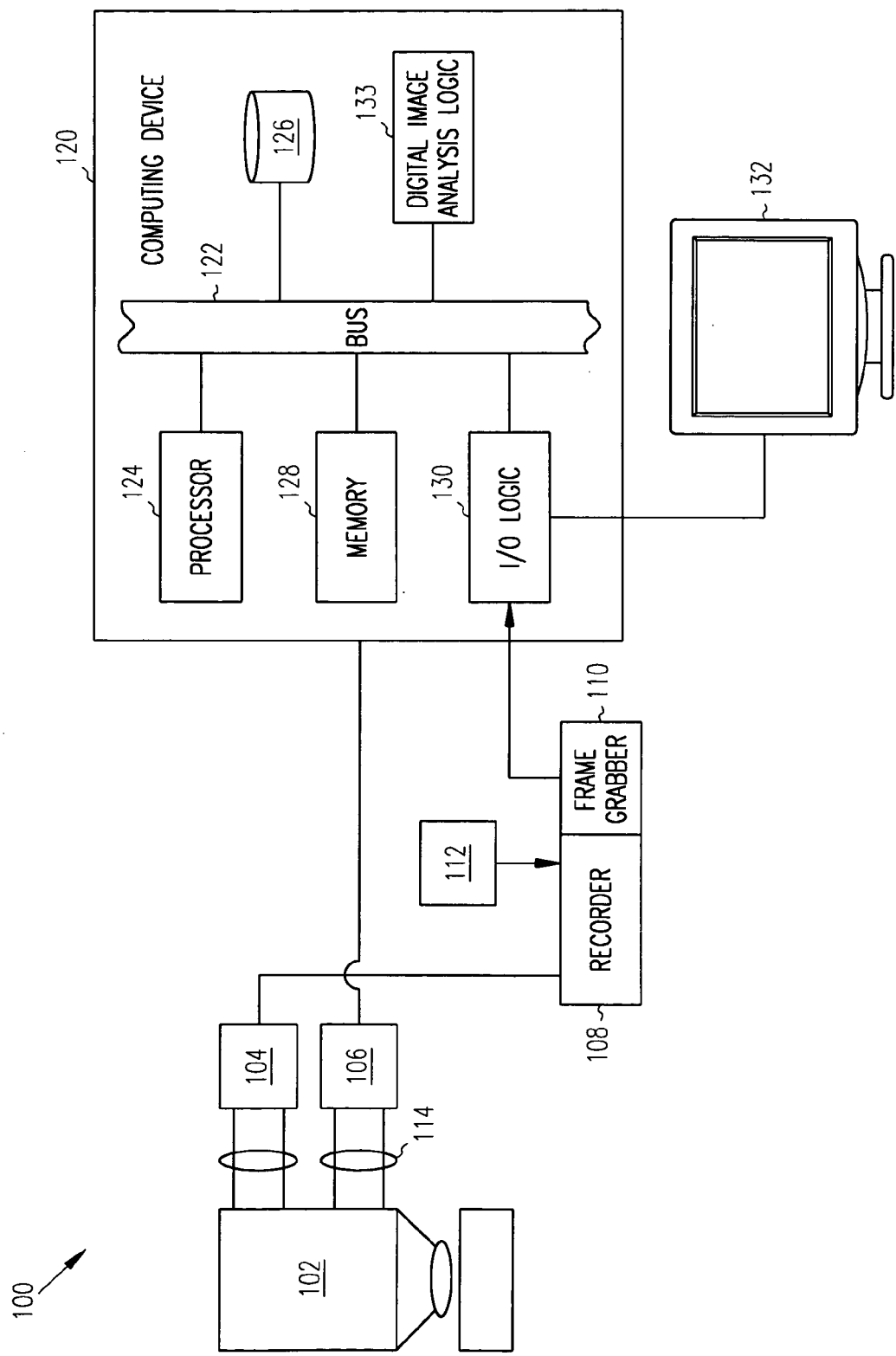
FIG. 1 illustrates a block diagram of a system that allows for reconstruction and motion analysis of cells and nuclei in a developing embryo, according to one embodiment of the invention.

A method, apparatus and system for reconstruction and motion analysis of cells and nuclei in a developing embryo are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality with undue experimentation.

References in the specification to "one embodiment", "an embodiment", "an example embodiment", etc., indicate that the embodiment described may includes a particular feature, structure, or characteristic, but every embodiment may not necessarily include the particular feature, structure, or characteristic. Moreover, such phrases are not necessarily referring to the dame embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for reconstruction and motion analysis of cells and nuclei in a developing embryo, in accordance with embodiments of the invention. A number of figures show flow diagrams illustrating operations for reconstruction and motion analysis of cells and nuclei in a developing embryo, in accordance with embodiments of the invention. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

Introduction

Embodiments of the invention include a four-dimensional reconstruction and motion analysis of cell cleavage, nuclear division, cell-cell interaction and change in cell shape. Such a reconstruction and motion analysis allows for insights into the spatial dynamics and cellular interactions basic to embryogenesis, and a context for evaluating the specific effects of mutations environmental perturbation and pharmacological agents on specific embryogenic processes.

In an embodiment, using differential interference contrast (DIC) microscopy and computer-controlled stepper motors, a cell is optically sectioned in one to two seconds, and this operation repeated at intervals as short as one to two seconds. Moreover, the edges of the cell, nucleus and particulate free zones of pseudopods in each optical section may be digitized, the perimeters of each of these components converted to β-spline models and the models used to generate faceted 3D reconstructions of a crawling cell that include the outer cell surface, the nucleus and demarcated pseudopods, all color-coded for easy three-dimensional (3D) discrimination. The time sequence of 3D reconstructions may also be converted into an animated 3D computer movie that can be viewed from any angle through a stereo workstation. More importantly, every component of the dynamic 3D image (cell surface, cell centroid, pseudopod and nucleus) can be individually motion analyzed, leading to quantitative phenotypes of wild type and mutant cell behavior that have been instrumental in elucidating the roles of a number of cytoskeletal and regulatory elements in motility and chemotaxis.

In an embodiment, using a computer-regulated motor for optically sectioning embryos, DIC optics and logic (either hardware and/or software), 75 optical sections are collected through the z-axis of a live developing embryo in a 2.5 second period, and the operation is repeated at 5 second intervals. In an embodiment, the edge of each cell and nucleus is traced in individual trace slots, the perimeters converted into β-spline models, and from the individual stacks of modeled perimeters, each cell and each nucleus in the developing embryo is reconstructed in 3D at intervals as short as every 5 seconds.

At each time point, the models of all cells and nuclei may be merged into a 3D model of the entire embryo. The sequence of reconstructions of the single developing embryo can then be viewed as a 3D movie through a stereo workstation. Embodiments of the invention allow the view for the first time of the developing embryo from any angle through time and space, to isolate and follow in time any cell and subsequent progeny (cell lineage), to subtract cell surfaces and follow all nuclei, or one nucleus and progeny nuclei (nuclear lineage), in time. Since the surface of each cell and each nucleus have been converted to β-spline models, the system provides more than 100 parameters of motility and dynamic morphology for each cell and nucleus at time intervals as short as 5 seconds. Additionally, embodiments of the invention provide "direct image reconstructions" that can be analyzed for particle movements within the cytoplasm, generating vector flow plots of cytoplasmic streaming.

System Description

FIG. 1 illustrates a block diagram of a system that allows for reconstruction and motion analysis of cells and nuclei in a developing embryo, according to one embodiment of the invention. In particular, FIG. 1 illustrates a system 100 that includes a microscope 102 having a focus knob 114, a camera 104, a stepping motor 106, a recorder 108 that includes a frame grabber 110, a character generator 112, a computing device 120 and a display 132. The computing device 120 includes a processor 124, a memory 128, a storage disk 126, a digital image analysis logic 133 and an input/output (I/O) logic 130 that are coupled together through a system bus 122. The computing device 120 is coupled to the display 132 through a port of I/O logic 130.

The microscope 120 is positioned to focus on an embryo located thereon to retrieve images of the cells and nuclei within these cells of the embryo. The stepper motor 106 is coupled to the focus knob 114. In one embodiment, the stepper motor 106 is a MicroStepZ3D stepping motor.

The camera 104 is coupled to the microscope 102 to capture video images of these cells and nuclei of such cells through the microscope 102. In an embodiment, the microscope 102 is an inverted compound microscope fitted with differential interference contrast (DIC) optics. The camera 104 may be configured to capture NTSC video. In one embodiment, the camera 104 is a cooled CCD camera that is capable of processing 30 frames per second without motion blurring.

The camera 104 is coupled to the recorder 108, wherein the video images captured by the camera 104 are recorded onto a media by the recorder 104. While the recorder 108 may be one of a number of different types of analog/digital-based recorders, in an embodiment, the recorder 108 is a video cassette recorder (VCR). In one embodiment, the frame grabber 110 is capable of grabbing 30 frames per second of a full size image, wherein the results are stored in a movie-based format.

The frame grabber 110 is coupled to the computing device 120 through a port (such as a serial port, parallel port, a Universal Serial Bus (USB) port, etc.) of the I/O logic 130. The computing device 120 may be a Macintosh computer, a Windows-based personal computer, etc. In an embodiment, the speed of the processor 124 is at least 1 gigahertz. The storage disk 126 is a hard disk capable of storing the frames received from the frame grabber 110. In an embodiment, the size of the storage disk 126 is at least two gigabytes. The memory 128 may be a random access memory (RAM) (e.g., dynamic RAM). In one embodiment, the size of the memory 128 is 512 megabytes. The display 132 is capable of pseudo three-dimensional viewing through Stereo Graphics "Crystal Eyes" three-dimensional display screen with glasses or a standard color display with inexpensive red blue stereo glasses.

In one embodiment, the digital image analysis logic 133 may be a process or task that can reside within the memory 128 and/or the processor 124 and can be executed within the processor 124. However, embodiments of the invention are not so limited, as the digital image analysis logic 133 may be different types of hardware (such as digital logic) executing the operations described therein (which is described in more detail below).

Those skilled in the art will appreciate the possibility of various changes and substitutions to the components of the system 100. For example, the computing device 120 can comprise any number of types and varieties of general purpose computers, or a digital camera with a direct link to the computing device 120 could replace the camera 104 and the recorder 108. Additionally, in an embodiment, differential interference contract (DIC) microscopy is utilized. DIC optics allows for high resolution microscopy; without the use of dyes or lasers, which may lead to the premature death of the organisms due to increases in heat and the effects of phototoxicity. Premature death leads to shortened periods of motility and dynamic morphology for analysis. By contrast, confocal optical systems, that use lasers, typically require application of stains or dyes to the motile objects. This will kill a living object which eliminates the possibility of analyzing the objects motility and morphology.

Figure 2:
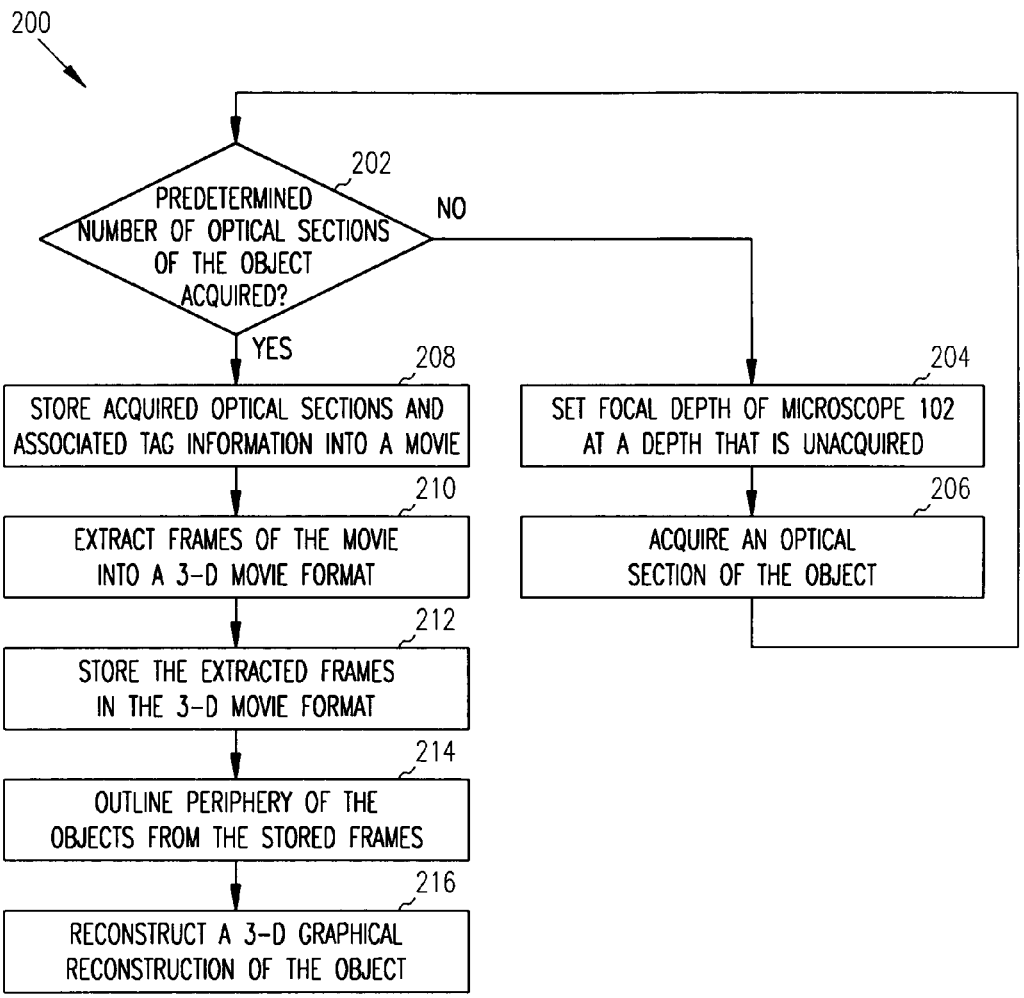
FIG. 2 illustrates a flow diagram for reconstruction and motion analysis of cells and nuclei in a developing embryo, according to one embodiment of the invention.

FIG. 2 illustrates a flow diagram for reconstruction and motion analysis of cells and nuclei in a developing embryo, according to one embodiment of the invention. In particular, the flow diagram 200 illustrates the operation of the system 100, according to an embodiment of the invention. A sample object, such as an embryo having a number of cells that includes a number of nuclei, are placed on the microscope 102. Since typically the object comprises a living cell, the object is contained in a fluid filled viewing chamber (not shown). Accordingly, the supporting materials of such a chamber are a correct width and chemical nature (e.g., glass, plastic, quartz, etc.) to be compatible with the focal depth and light transmission for the given object being processed by the system 100. Magnification of the microscope 102 is selected to be compatible with the speed of cellular transmission, over a period of recording and compatible with the size of the cell. In an embodiment, the stepper motor 106 is programmed such that a given cycle spans the desired Z-axis focal depth. For example, for amoebae cells like *Dictyostelium discoideum* amoebae or polymorphonuclear leukocytes, which average fifteen microns in length and usually no more than ten microns in height, a Z-axis distance of ten to twenty microns is sufficient. However, in an embodiment, the Z-axis distance is empirically defined.

In block 202, a determination is made of whether the predetermined number of optical sections of the object have been acquired. With reference to the system 100, the digital image analysis logic 133 determines whether the predetermined number of optical sections of the object have been acquired. The system 100 is to acquire a number of optical sections of the object at a number of focal depths over a given period of time. Accordingly, a scan rate by the camera 104 is selected to allow for the acquisition of the predetermined number of optical sections of the object. For example, a two-second scan in either direction up or down the Z-axis that includes 30 optical sections is sufficient for analysis of cells moving at velocities of seven to twenty microns per minute. This rate results in relatively small errors due to cell movement during the time of sectioning.

In one embodiment, the reconstruction operations (as described below) may be based on a scan up the Z-axis as well as a scan down the Z-axis. Accordingly, a fast rate and a fast frequency of scanning would include sequential up and down scans by the microscope 102, wherein a given scan would include 30 frames over one second through ten microns. Upon determining that the predetermined number of optical scans of the object have been acquired, the operations of the flow diagram 200 continue at block 208, which is described in more detail below.

In block 204, upon determining that the predetermined number of optical scans of the object have not been acquired, the focal depth of the microscope 102 is set at a depth that is unacquired (but is to be acquired). With reference to the system 100, the stepper motor 106 sets the focal depth of the microscope 102 (through the focal knob 114) to a depth that is unacquired (but is to be acquired). As described, the stepper motor 106 is programmed to a number of different focal depths along the Z-axis for acquisition of the different optical sections of the object. Control continues at block 206.

In block 206, an optical section of the object is acquired. With reference to the system 100, the camera 104 acquires the optical section of the object. Although the optical sections can be read directly into the frame grabber 110, in one embodiment, the optical sections are stored on a media by the recorder 108. Image acquisition on a media (e.g., a video tape) is relatively limitless and inexpensive and, therefore, will accommodate extended recording periods. Real time frame grabbing will have storage limits. Moreover, the image acquisition on a media allows the character generator 112 and the stepper motor 106 to notate the video frame for time, height, and direction of scan. As each of the plurality of optical sections are read the image from the camera 104 transfers to the media being recorded by the recorder 108 are also transmitted to the frame grabber 110 and into the computing device 120 via the I/O logic 130. Such operations may repeat for a plurality of focal depths over a period of time. In one embodiment, the frame grabber 110 digitizes each of the plurality of optical sections and then transfers the data to the computing device 120. Moreover, the stepper motor 106 and the character generator 112 may simultaneously transfer information to the computing device 120 that associates a tag with each of the plurality of digitized optical sections. The tag allows identification of at least the time and the focal depth corresponding to each of the plurality of digitized optical sections. Control returns to block 202 wherein the determination is made of whether the predetermined number of optical sections of the object have been acquired.

In block 208, the acquired optical sections and associated tag information are stored into a movie. With reference to the system 100, the digital image analysis logic 133 stores the acquired optical sections and associated tag information into a movie on the storage disk 126. The movie generated may be based on a number of different types of applications. For example, in one embodiment, the movie is a QuickTime movie. Further, embodiments of the invention can be incorporated into PICT stacks. The rate that the digital image analysis logic 133 reads the frames into the storage disk 126 is variable and may be based on the number of frames needed for a given application in comparison to the size of the storage disk 126 (e.g., 30 frames/second, 20 frames/second, 10 frames/second, etc.). For example, a twenty minute segment read in at thirty frames per second will take more than five hundred megabytes of storage on the storage disk 126. The movie may be synchronized to the automatic up and down scans and the time of the scans may be recorded in a synchronization file in the storage disk 126 of the computing device 120. Control continues at block 210.

In block 210, frames of the movie are extracted from the acquired optical sections. With reference to the system 100, the digital image analysis logic 133 extracts frames of the movie from the acquired optical sections. Accordingly, the system 100 is configurable by the user to select a number of digitized optical sections to be used in reconstructions, the interval between reconstructions, and image averaging (which is described in more detail below). For instance, the user of the system 100 may only need every other section for reconstructions. Control continues at block 212.

In block 212, the extracted frames are stored in a three-dimensional movie format. With reference to the system 100, the digital image analysis logic 133 stores the extracted frames in the three-dimensional (3-D) movie format. The movie format (such as the QuickTime movie format), from which the frames were extracted, is designed for smooth viewing in real time and may provide a relatively slow direct access time (e.g., two seconds per frame). In an embodiment, the 3-D movie format provides direct frame access at a rate of five frames per second, which is ten times faster than the movie format from which the frames were extracted.

In one embodiment, if the area of the object in a frame takes up a minority of pixels, the digital image analysis logic 133 performs a compression to reduce the amount of storage that the frame occupies. Additionally, during the optical sectioning, a user can reduce the size of the optical section to a specific window which contains only a portion of interest, thereby reducing the amount of digitized information. The 3-D movie format allows for frame averaging to reduce background noise and accentuate the periphery of the object. For instance, at a rate of thirty frames per second, every three frames can be averaged in an overlapping fashion, resulting in the second to twenty-ninth optical section averaged with the two neighboring sections, and the two end sections (one and thirty) average with only one neighboring section. Control continues at block 214.

In block 214, the periphery of the objects of the stored frames are outlined. With reference to the system 100, the digital image analysis logic 133 outlines the periphery of the objects of the stored frames. Since a typical twenty minute recording of a translocating cell, for example, in which thirty optical sections are performed in two seconds and repeated every five seconds, would include seven thousand two hundred optical sections, this outlining operation performed by the digital image analysis logic 133 increases the rate of operation of the system 100. Manual outlining can be employed for certain objects, such as those wherein high resolution reproductions are employed. A more detailed description of the outlining of the periphery of the object of the stored frames is set forth below in conjunction with the flow diagram 400 of FIG. 4. Control continues at block 216.

In block 216, a three-dimensional graphical reconstruction of the object is reconstructed. With reference to the system 100, the digital image analysis logic 133 reconstructs a three-dimensional graphical reconstruction of the object. One embodiment of a more detailed description of the reconstruction of a three-dimensional graphical reconstruction of the object is set forth below in conjunction with the flow diagram 1100 of FIG. 11.

Figure 3A:
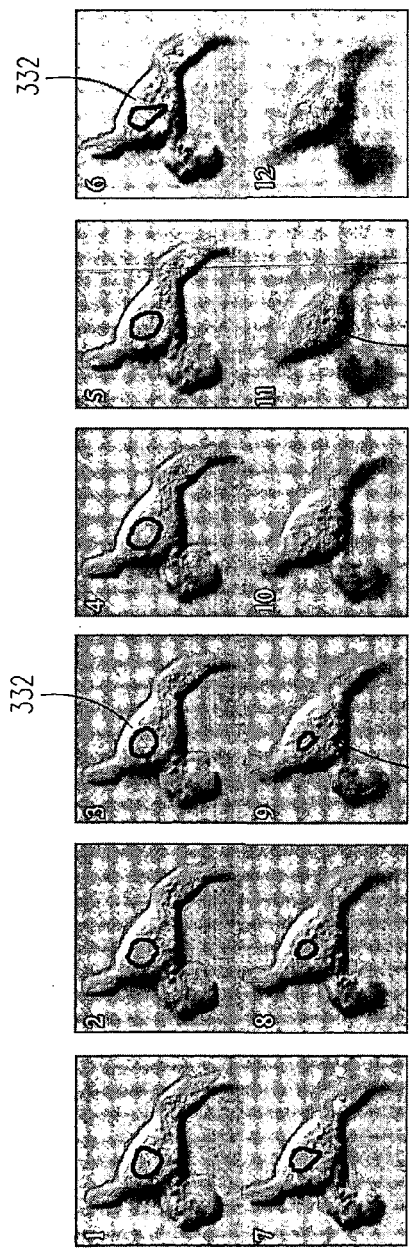
FIGS. 3A–3B illustrate the before and after effect of outlining an object at a plurality of focal depths, according to one embodiment of the invention.
Figure 3B:
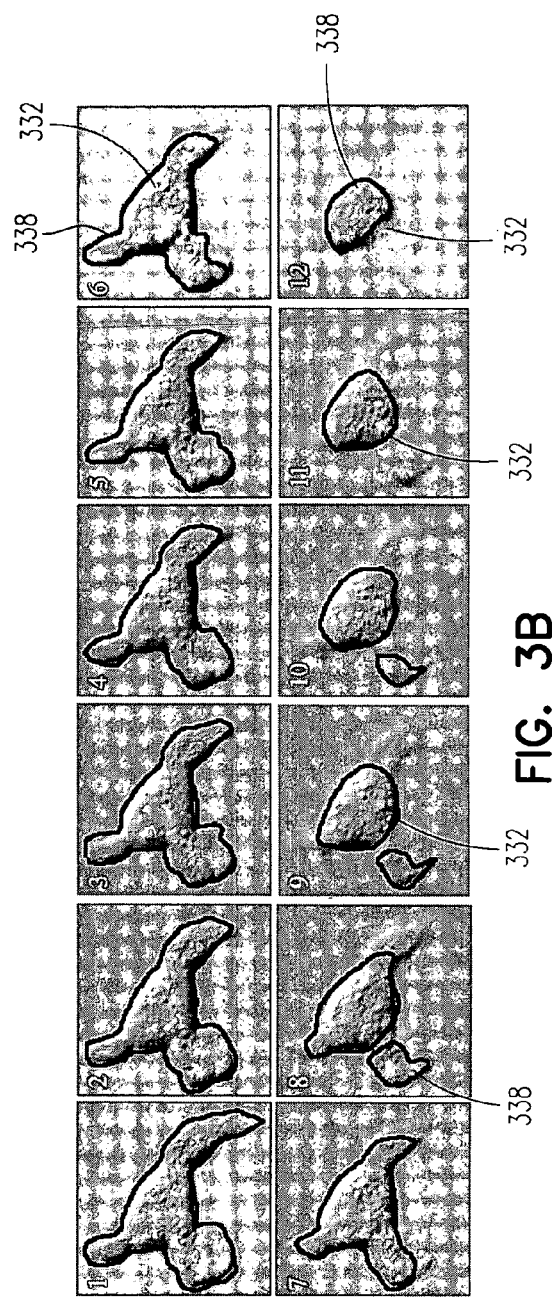

The operations of outlining of the periphery of objects will now be described. In particular, FIGS. 3A–3B illustrate the before and after effect of outlining an object at a plurality of focal depths, according to one embodiment of the invention. In particular, FIG. 3A illustrates the original digitized optical sections 332 of an object at twelve different focal depths, while FIG. 3B illustrates the same digitized optical sections 332 with the corresponding outlines 338 included. The outlines 338 attempt to trace the circumference of the in focus portion of the object. As shown, not only the size of the in-focus portion of the object varies at different focal depths, but the surrounding background also varies. Such variances introduce a significant challenge in the outlining operations. In some portions of the digitized optical sections 332, the boundary between the in-focus portion and the out-of-focus portion represents a bright area. In other parts of the digitized optical sections 332, the boundary between the in-focus and out-of-focus area represents a dark area. Therefore, a simple gray level thresholding operation, which selects or deselects pixels based solely on their grayscale value, may not successfully perform the outlining of the digitized optical sections 332. Accordingly, as described below, one embodiment of the invention uses a combination of a variety of image processing operations to accomplish the task of outlining the periphery of the digitized optical sections 332.

Figure 4:
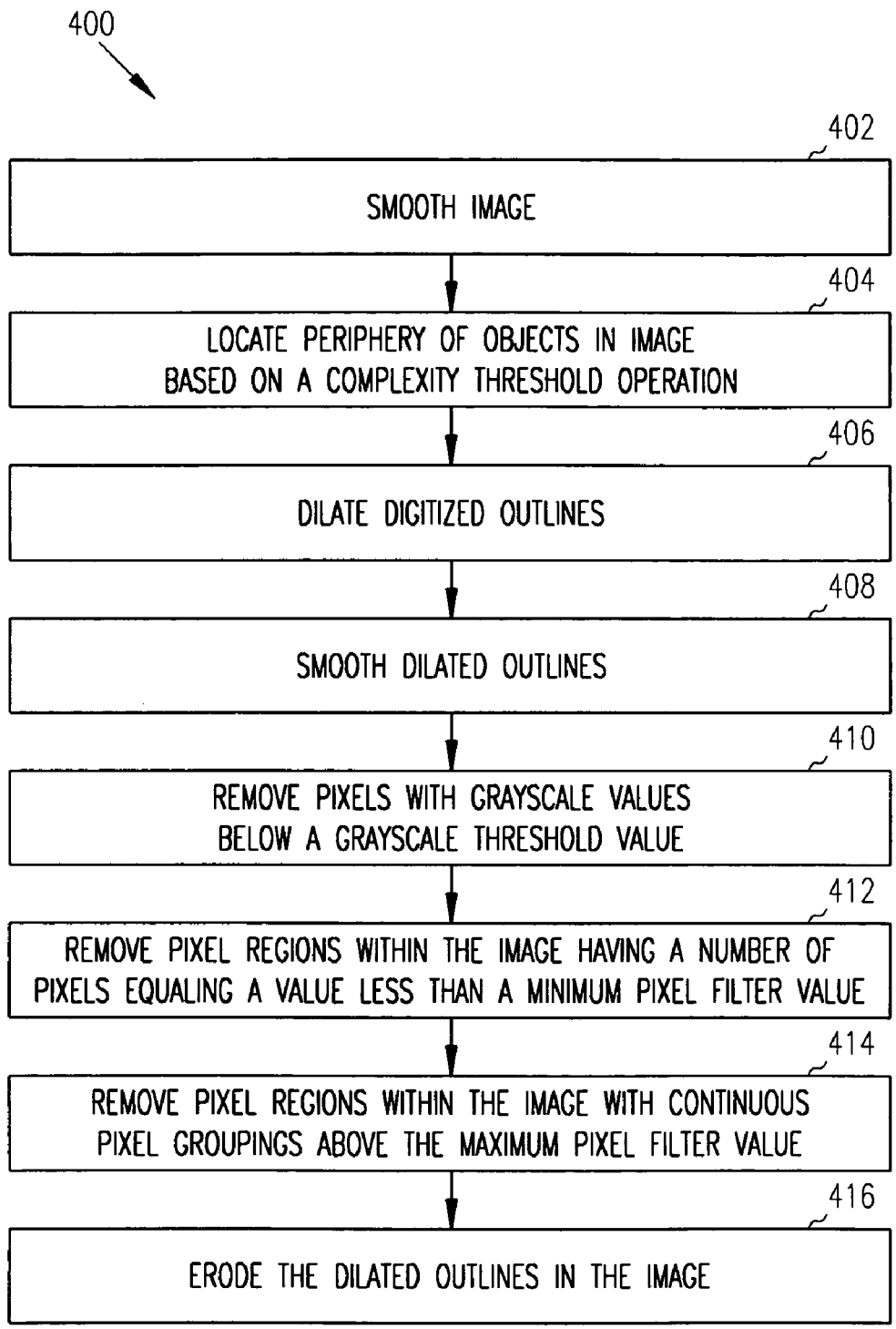
FIG. 4 illustrates a flow diagram for outlining of objects for reconstruction and motion analysis of cells and nuclei in a developing embryo, according to one embodiment of the invention.

FIG. 4 illustrates a flow diagram for outlining of objects for reconstruction and motion analysis of cells and nuclei in a developing embryo, according to one embodiment of the invention. Those of ordinary skill in the art will appreciate the fact that the order of the steps depicted in the flow diagram of FIG. 4 can vary and in some cases the digital image analysis logic 133 may perform a number of the operations simultaneously.

In block 402, the image is smoothed. With reference to the system 100, the digital image analysis logic 133 smoothes the image. Smoothing removes the jagged and rough edges, and reduces the overall contrast. In an embodiment, the digital image analysis logic 133 incorporates standard smoothing operations for the smoothing of the image. Control continues at block 404.

In block 404, the periphery of the objects in the image are located based on a complexity threshold operation. With reference to the system 100, the digital image analysis logic 133 locates the periphery of the objects in the image based on a complexity threshold operation. Complexity is defined as the standard deviation from a mean pixel grayscale value within a 3×3 or 5×5 pixel neighborhood surrounding the pixel under analysis. The neighborhood is referred to as a kernel. Since the perimeter of a cell represents a boundary of high contrast, the standard deviation of the grayscale of a pixel at an edge, and the pixels on either side (inside and outside of the cell) will be high. Therefore, the complexity will also be high. In other words, for each of the digitized optical sections 332 the transition between the in-focus region and the out-of-focus region is defined by an area of high grayscale contrast. In this manner, examining a 3×3 or 5×5 kernel and calculating the standard deviation of the grayscales of the kernel allows for identifying the boundaries of the cell periphery for a particular digitized optical section 332 at a particular focal depth.

For each pixel, based on the pixel's corresponding kernel, a standard deviation representing the amount of grayscale variation within the kernel is calculated. A threshold value allows selecting only those pixels with a complexity value above the threshold. Thus, kernels with a high standard deviation represent areas of high complexity based on a large amount of contrast in that pixel neighborhood. Conversely, kernels of low standard deviation represent areas of low complexity due to the minimal amount of grayscale contrast. This operation effectively deselects the background of the image and also the interior of the object, since these regions of the digitized optical sections 332 tend to exhibit low contrast. The actual threshold value can correlate to a grayscale level between 0 and 255, or a percentage between 0 and 100, with the low value representing regions of low complexity and the high value representing regions of high complexity, or any other similar designation.

Regardless of the specific designation, the threshold represents a cut off level all of the pixels whose kernels yield complexity levels below the threshold and these pixels receive a grayscale value of 255 (white). All of the pixels with complexity values above the threshold receive a grayscale value of zero (black). For analysis purposes, therefore, the particular digitized optical section 332 converts to an image where the background and the cell interior appears white and the periphery of the object appears black. The black areas form the outline 338. Typically, increasing the complexity threshold value will shrink or remove the outline 338, while lowering the complexity threshold value will increase the area of the outline 338. Control continues at block 406, which is described in more detail below.

In an embodiment, the operations of the flow diagram 400 are complete as the outlining of the periphery of the objects have been made. In one embodiment, further image processing operations are necessary to complete the outlining operations. For example, in some instances high complexity regions may exist in the background areas far outside of the periphery of the object. In these circumstances, simply applying a complexity threshold operation may not remove these regions. Additionally, another problem that can occur involves the fact that some regions of the periphery of the digitized optical sections 332 do not comprise areas of high complexity.

Figure 5A:
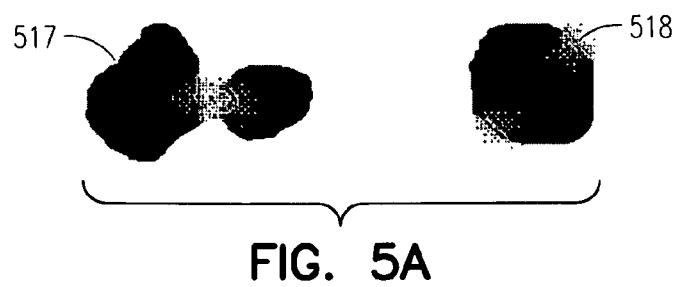
FIGS. 5A–5E illustrate the digitized optical sections being processed over time, according to one embodiment of the invention.
Figure 5B:
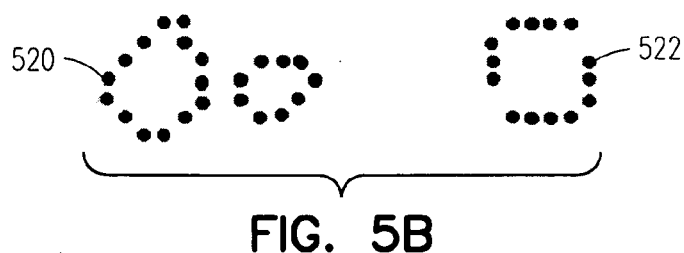
Figure 5C:
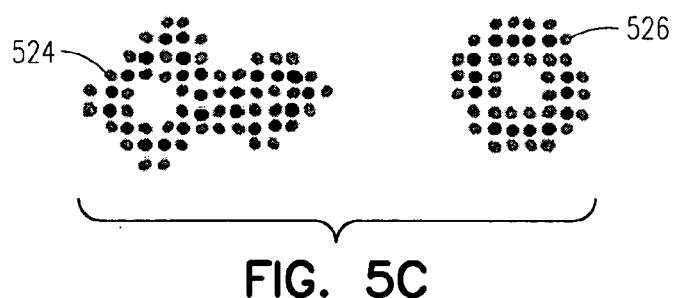
Figure 5D:
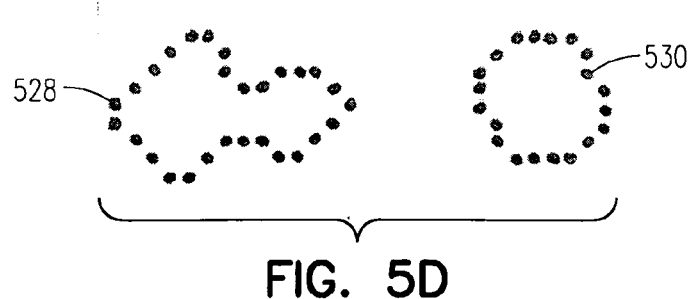
Figure 5E:
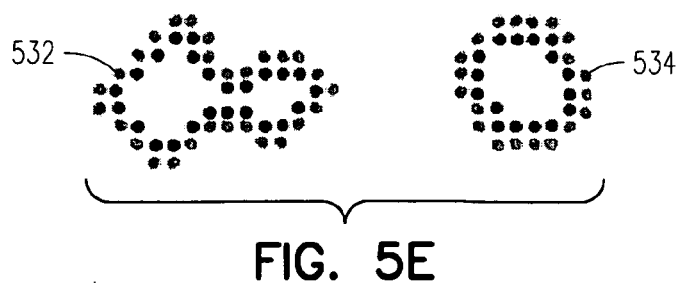

To help illustrate, FIGS. 5A–5E illustrate the digitized optical sections being processed over time, according to one embodiment of the invention. FIG. 5A illustrates digitized optical sections 517 and 518 that are unprocessed. FIG. 5B illustrates the digitized outlines 520 and 522 for the digitized optical sections 517 and 518, respectively. FIG. 5C illustrates dilations 524 and 526 of the digitized outlines 520 and 522, respectively. FIG. 5D illustrates dilated outlines 528 and 530 based on the dilations 524 and 526, respectively. FIG. 5E illustrates eroded outlines 532 and 534 based on the dilated outlines 528 and 530, respectively.

FIGS. 5A–5B show two digitized optical sections 517 and 518 in which application of the complexity threshold did not form complete outlines 520 and 522, respectively. In FIG. 5A, the digitized optical section 517 appears in two sections with a fuzzy low contrast transition between the two. Therefore, application of a complexity threshold did not properly outline the transition area, as illustrated by the digitized outline 520 in FIG. 5B. Similarly, the digitized optical section 518 shows that a portion of the periphery comprises a fuzzy low contrast region, which an application of the complexity threshold operation failed to fully outline, as illustrated by the digitized outline 522 in FIG. 5B. Accordingly, in one embodiment, the digitized outlines 520 and 522 in FIG. 5B require further image processing.

In an embodiment, to deal with the situation of incomplete and partial outlines, the system 100 provides the ability to dilate, erode and smooth the digitized optical sections 332 (as will be describe in the blocks 406, 408 and 416 of the flow diagram 400 of FIG. 4). Referring again to FIGS. 5A–5E, applying the operation illustrated in block 402 that locates the periphery of the objects in the image based on a complexity threshold operation to the digitized optical sections 517 and 518 produce digitized outlines 520 and 522, respectively. FIG. 5B shows that both the digitized outlines 520 and 522 do not completely enclose their respective objects 517 and 518. In an embodiment, in order to complete the digitized outlines 520 and 522, a dilation operation is performed on the digitized outlines 520 and 522.

In block 406, the digitized outlines are dilated. With reference to the system 100, the digital image analysis logic 133 dilates the digitized outlines 520 and 522. Dilation involves selecting pixels that surrounds a black pixel and converting that pixel to a grayscale of 0 (black). FIG. 5C illustrates the dilation operation applied to the digitized outlines 520 and 522, which produces the dilations 524 and 526 (a broader outline that fills in the gaps in the digitized outlines 520 and 522, respectively. In one embodiment, dilation involves adding the four horizontal and vertical neighboring pixels for pixels of the digitized outlines 520 and 522. The dilation operation fattens the object by the amount of dilation. In this manner, the gaps that appeared in the digitized outlines 520 and 522 fill in. Additionally, as part of the dilation, the digital image analysis logic 133 outlines the outer perimeter of the dilations 524 and 526, thereby creating dilated outlines 528 and 530 (illustrated in FIG. 5C). Control continues at block 408.

In block 408, the dilated outlines are smoothed. With reference to the system 100, the digital image analysis logic 133 smoothes the dilated outlines 528 and 530 (shown in FIG. 5D). In an embodiment, the digital image analysis logic 133 incorporates standard smoothing operations for the smoothing of the image. For example, one type of smoothing operation involves converting the locations of non-white pixels to a floating point number, and averaging the pixel locations for a neighborhood. A pixel is added at a location as close as possible to the average location. Accordingly, the roughness is reduced. Control continues at block 410.

In block 410, pixels with grayscale values below a grayscale threshold value are removed. With reference to the system 100, the digital image analysis logic 133 removes the pixels with grayscale values below a grayscale threshold value. As noted previously, grayscale typically varies from 0 (white) to 255 (black), however, the grayscale threshold can be expressed in a percent from 0% (white) to 100% (black). This operation effectively reduces any remaining residual background areas. Control continues at block 412.

In block 412, pixel regions within the image having a number of pixels equaling a value less than a minimum pixel filter value are removed. With reference to the system 100, the digital image analysis logic 133 removes the pixel regions within the image having a number of pixels equaling a value less than a minimum pixel filter value. This operation allows removal of small, high contrast regions appearing in the background of the digitized optical sections 332. While, in one embodiment, the default for the minimum pixel filter value comprises twenty-five, most of the outlined background consists of groups of pixels of between five and ten pixels. Typically, a minimum pixel filter value of between five and ten will allow for the removal of these unwanted background objects without interfering with the outline 338 of the digitized optical section 332. Control continues at block 414.

In block 414, pixel regions within the image with continuous pixel groupings above the maximum pixel filter value are removed. With reference to the system 100, the digital image analysis logic 133 removes pixel regions within the image with continuous pixel groupings above the maximum pixel filter value. This operation allows for the elimination of large unwanted areas that appear within the digitized optical sections 332. While the maximum pixel filter value is variable (based for, example, on the specific application), in an embodiment, the maximum pixel filter value equals twenty thousand. Control continues at block 416.

In block 416, the dilated outlines are eroded. With reference to the system 100, the digital image analysis logic 133 erodes the dilated outlines 528 and 530 (illustrated in FIG. 5D). Eroding the dilated outlines 528 and 530 creates the eroded outlines 532 and 534 respectively (as shown in FIG. 5E). This erode operation returns the outlines 338 to the proper size. In particular, the digital image analysis logic 133 erodes the outline 338 by the number of dilations (in block 406) plus the number of times the outline 338 is smoothed (in block 408). In an embodiment, during the erode operation, the digital image analysis logic 133 moves each pixel of the dilated outlines 528 and 530 inward a distance of one pixel. In this manner, the eroded outlines 532 and 534 now more accurately reflect the periphery of the object in the digitized optical sections 517 and 518. In one embodiment, the dilation equals three, since the erosion equals two and the smooth outline equals one.

Figure 6:
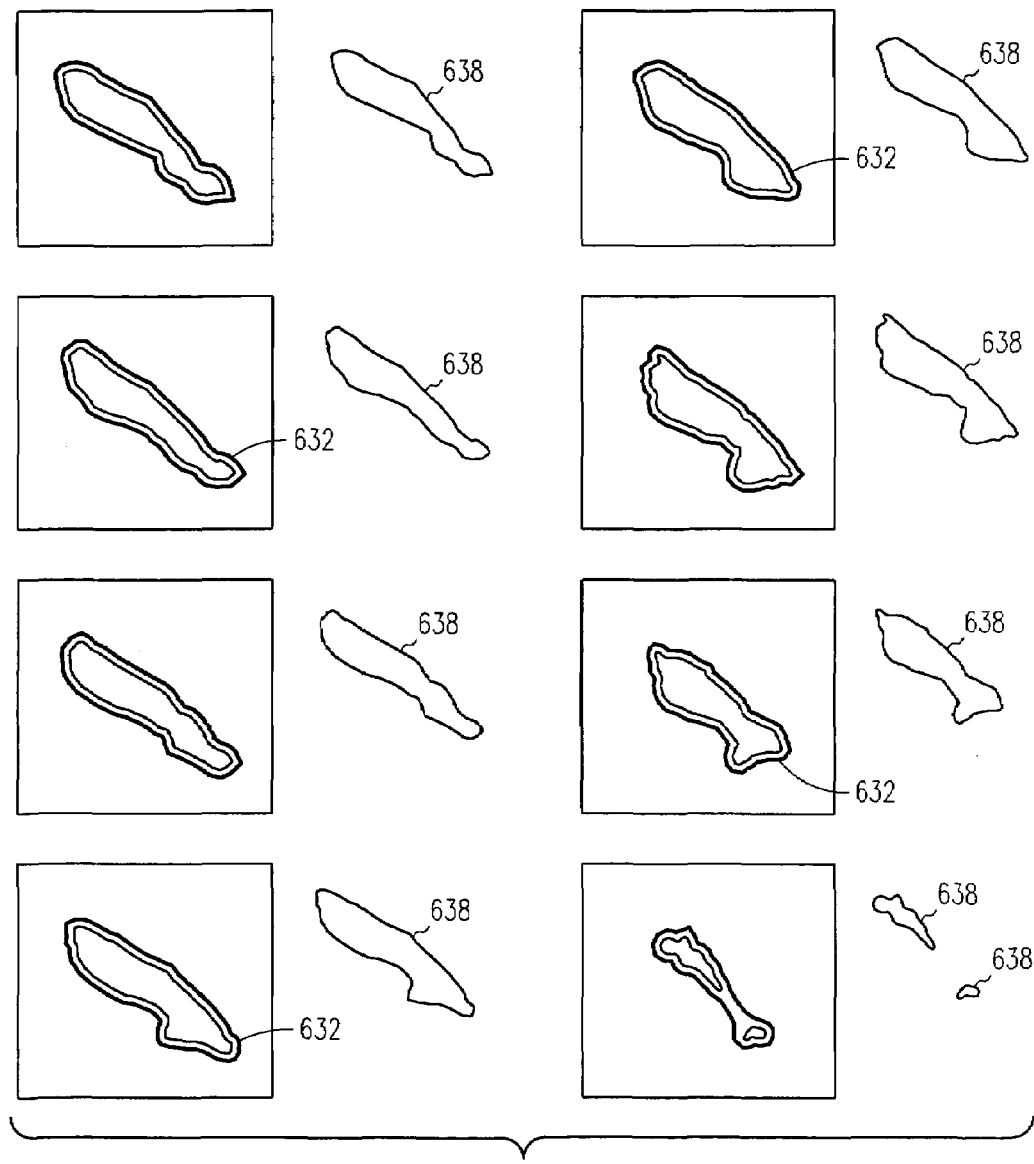
FIG. 6 illustrates the outlining of an individual cell, according to one embodiment of the invention.

FIG. 6 illustrates the outlining of an individual cell, according to one embodiment of the invention. FIG. 6 shows a plurality of digitized optical sections 632, each taken at a different focal depth, and the associated outline 638 of each digitized optical section 632. In this case, not only do the outlines 638 change in size and shape, but some of the outlines 632 contain more than one distinct circumscribed area.

Those of ordinary skill in the art will appreciate the fact that optimizing the outlining parameters for the outlining operations illustrated in the flow diagram 400 of FIG. 4 comprises a trial and error process; that involves varying not only the outlining parameters but the number of times an operation is performed. In an embodiment, after selecting the optimum imaging parameters, however, all of the plurality of digitized optical sections 332 can be processed with the optimized parameters.

Figure 7A:
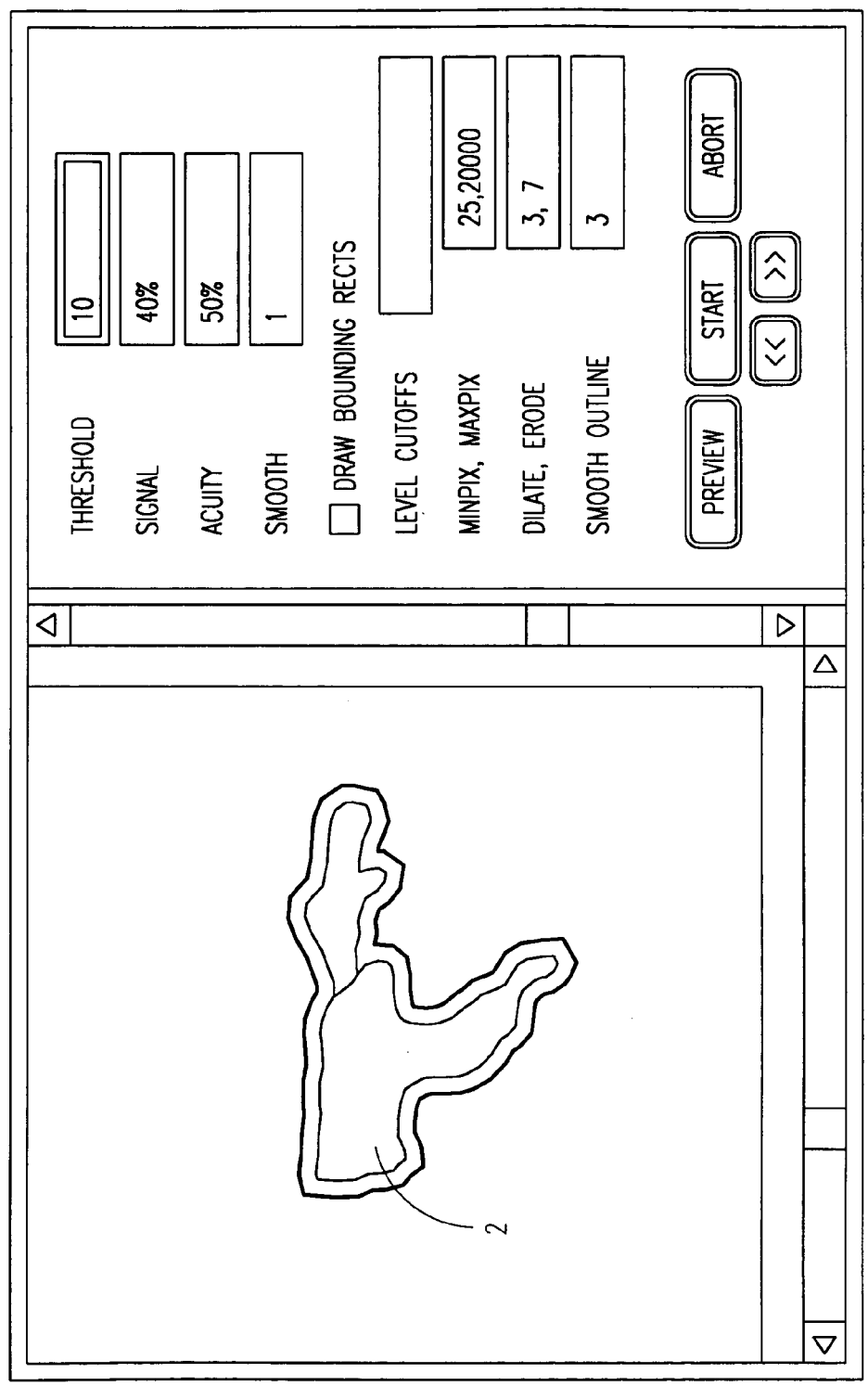
FIGS. 7A–7F illustrate screenshots that allow for modification of different parameters for the outlining of the number of cells of an embryo, according to one embodiment of the invention.
Figure 7B:
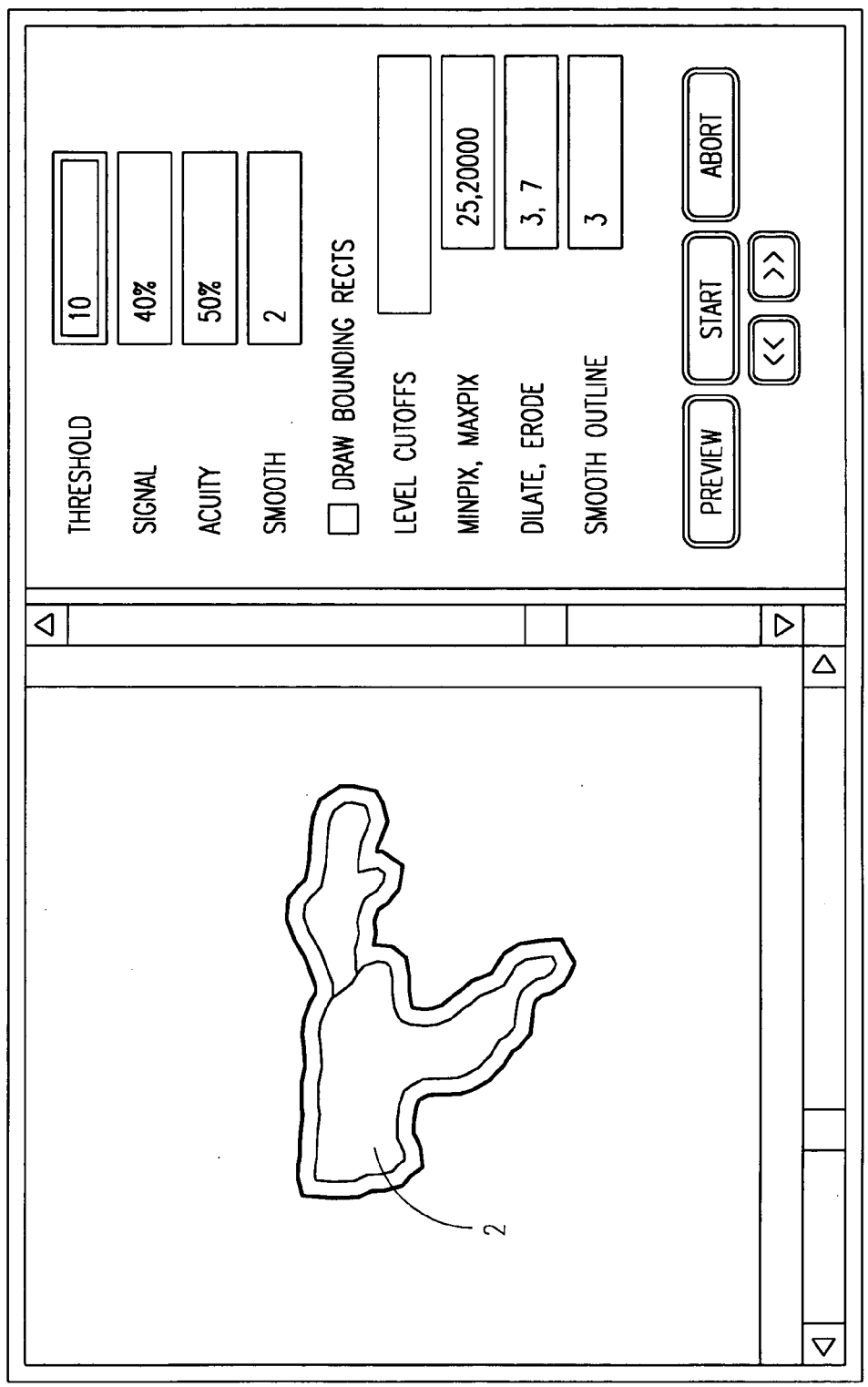
Figure 7C:
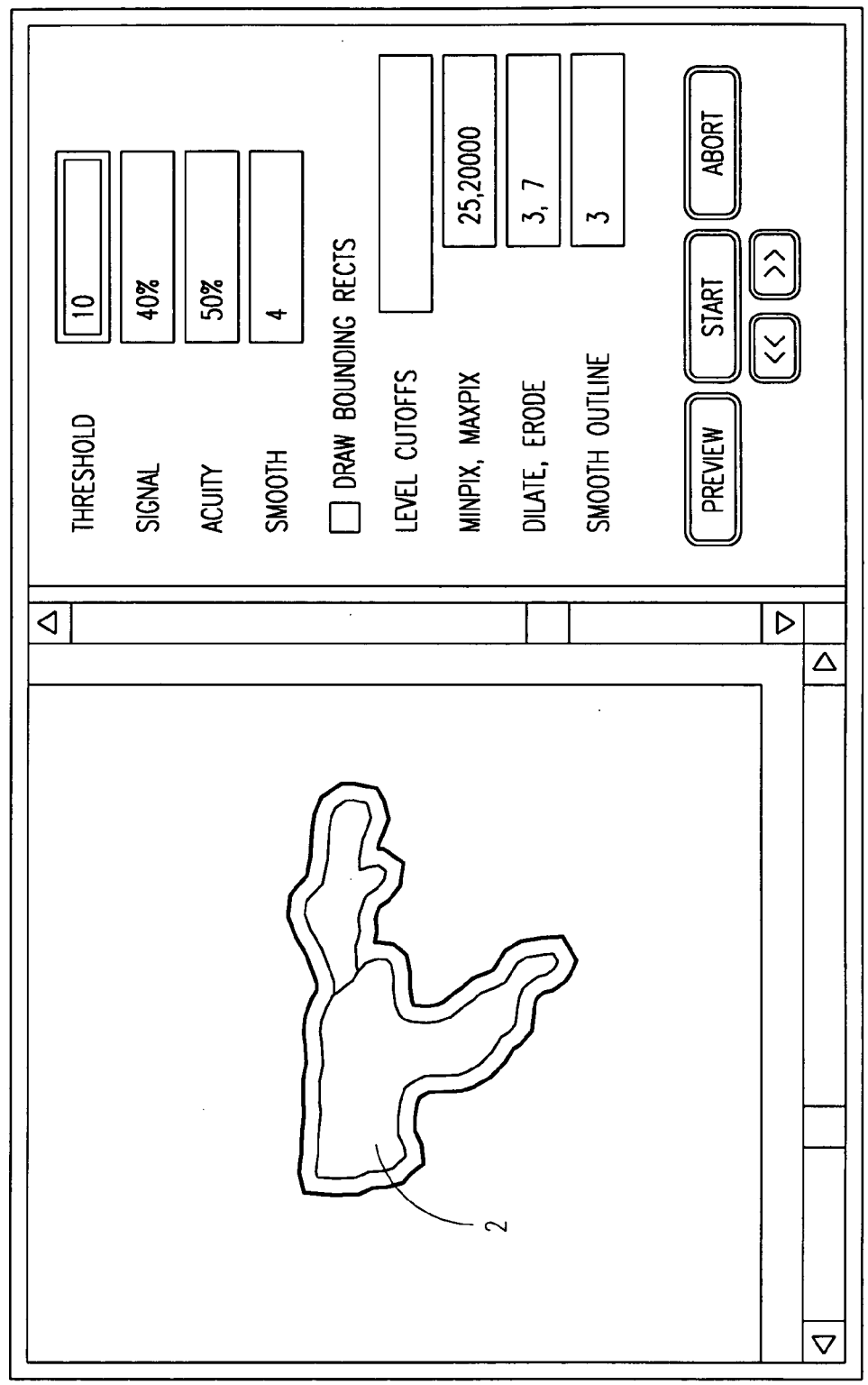

To help illustrate, FIGS. 7A–7F illustrate screenshots that allow for modification of different parameters for the outlining of the number of cells of an embryo, according to one embodiment of the invention. FIGS. 7A–7C show the effect of varying the number of times the smooth image operation (illustrated in block 402 of FIG. 4) is performed. In FIG. 7A, the smooth image operation is performed once; in FIG. 7B, the smooth image operation is performed twice; in FIG. 7C, the smooth image operation is performed four times. Increasing the smoothing of the image effectively reduces the sharpness of the image, and, therefore, reduces the complexity of the digitized optical section 338. This reduces the area of the outline 338 since the smoothing reduces the contrast of the digitized optical section 332.

Figure 7D:
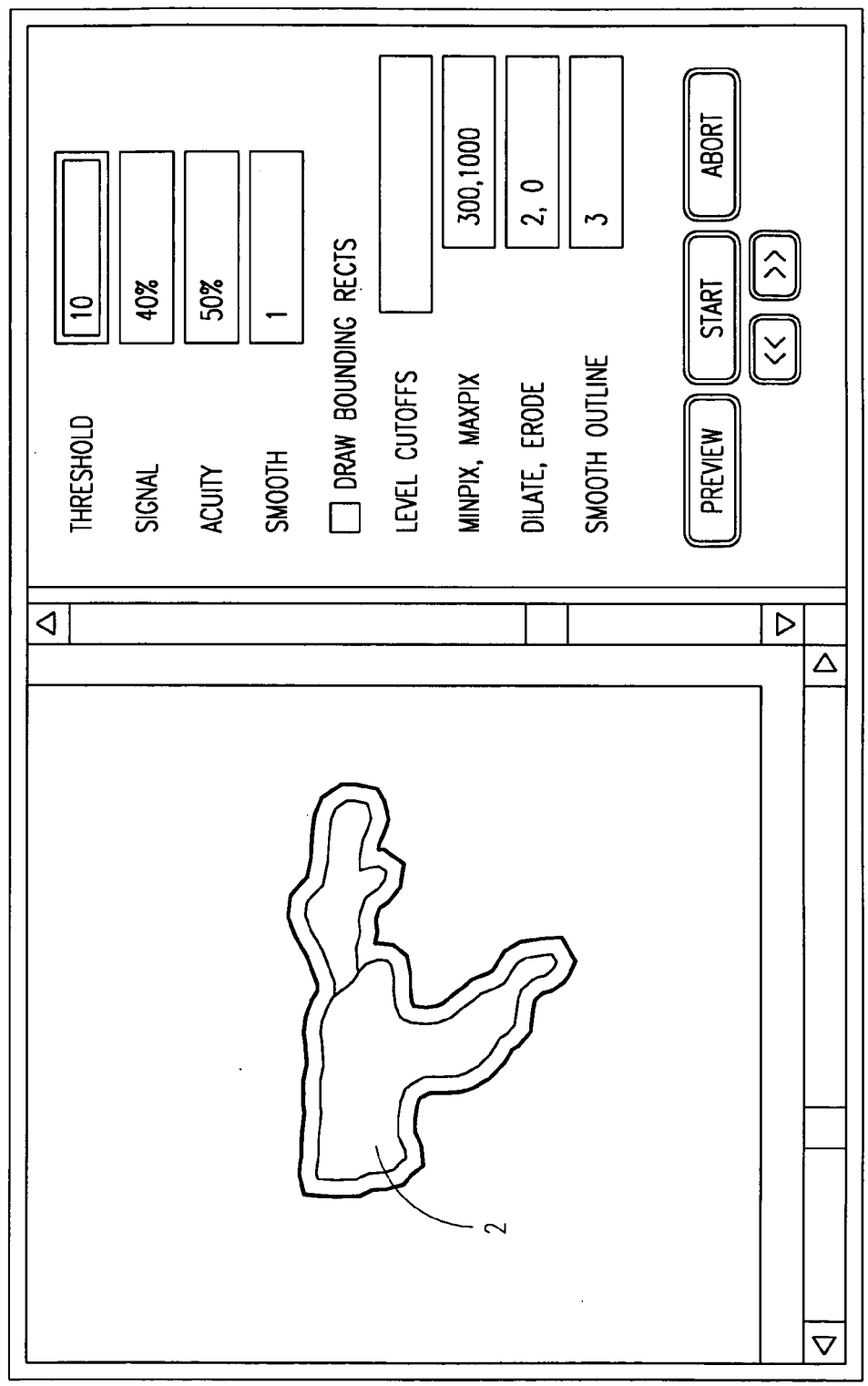
Figure 7E:
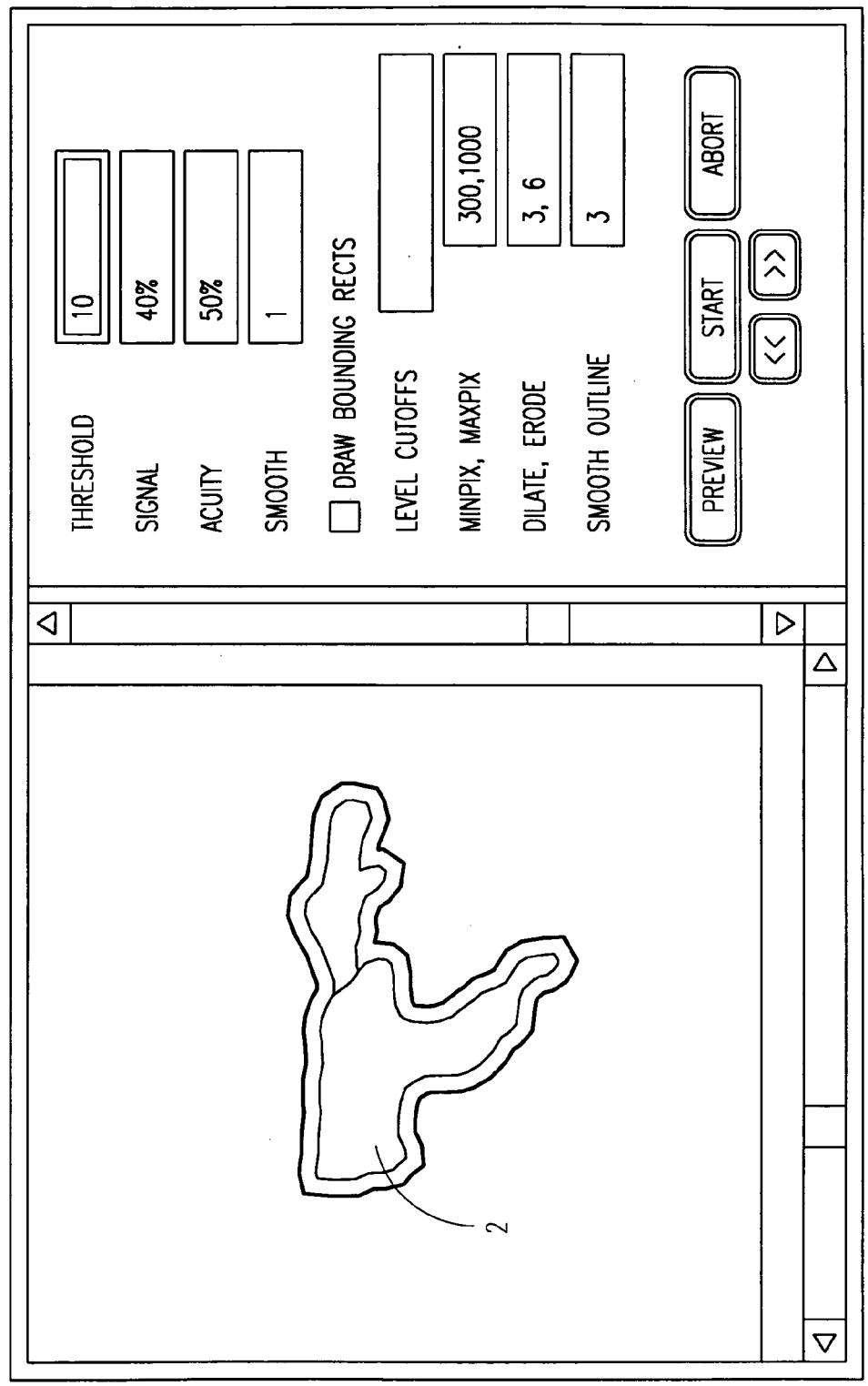
Figure 7F:
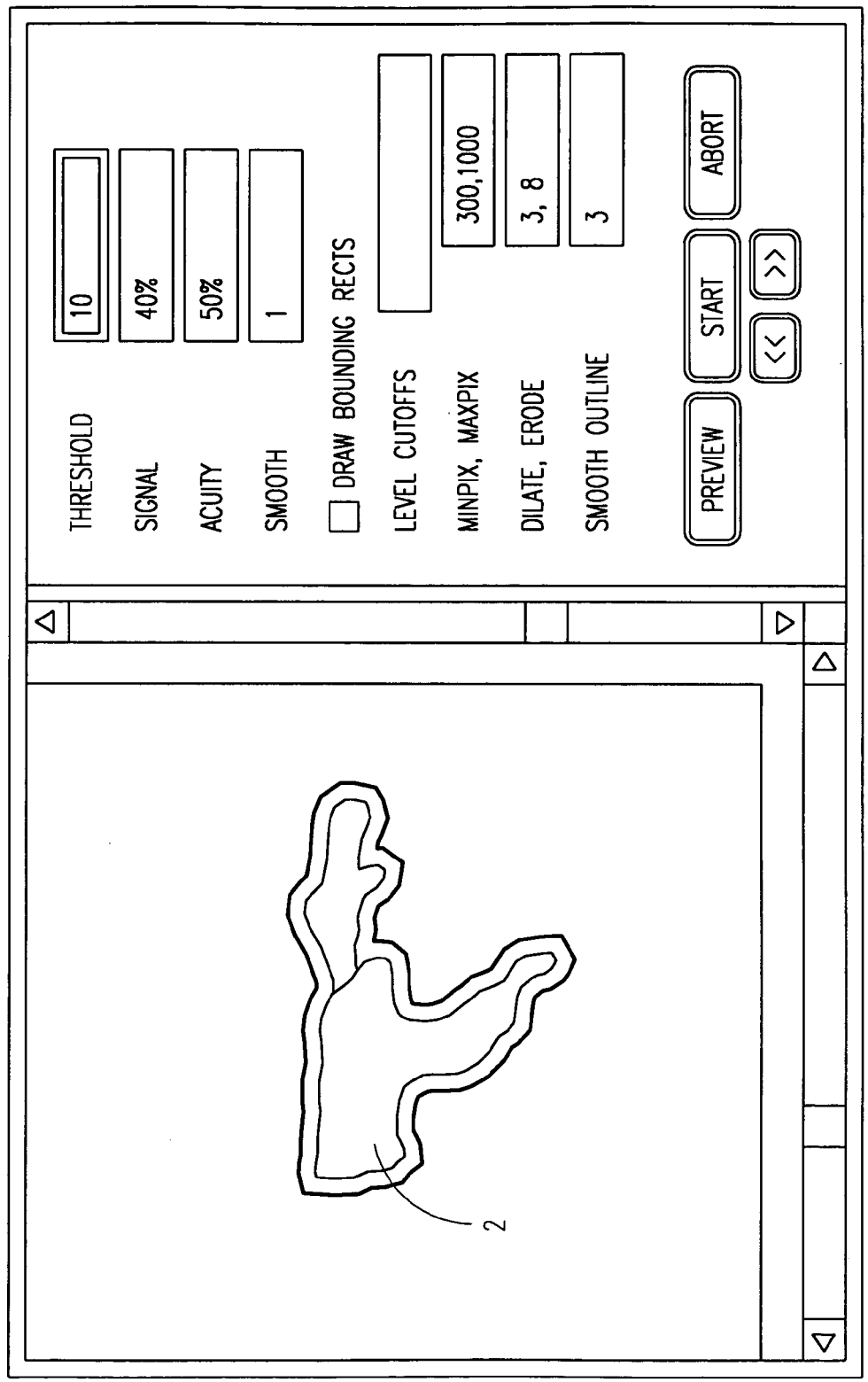

FIGS. 7D–7F show the effect of differing combinations of the dilation operation (illustrated in block 406) and the erode operation (illustrated in block 416). In FIGS. 7D–7F, the smooth image operation (illustrated in block 402) is performed once, and the smooth outline operation (illustrated in block 408) is performed three times. In FIG. 7D, the dilation is performed twice, and the erosion is not performed. In FIG. 7E, the dilation is performed three times, and the erosion is performed six times. In FIG. 7F, the dilation is performed three times, and the erosion is performed eight times. The overall effect shown in FIGS. 7D–7F comprises increasing the gap between the number of dilations and the number of erosion operations, which in general reduces the size of the outline 338. Also, increasing the number of dilations and erosionis between the values depicted in FIG. 7D and FIG. 7E helped to better fill in a particularly bright portion of outline 338. The preceding examples of the effect of altering the outlining parameters merely demonstrate the type of iterative process required for optimization, and illustrates some general trends applicable to changing certain parameters. The specific effect, of course, will vary depending on the exact circumstances of the application.

Figure 8:
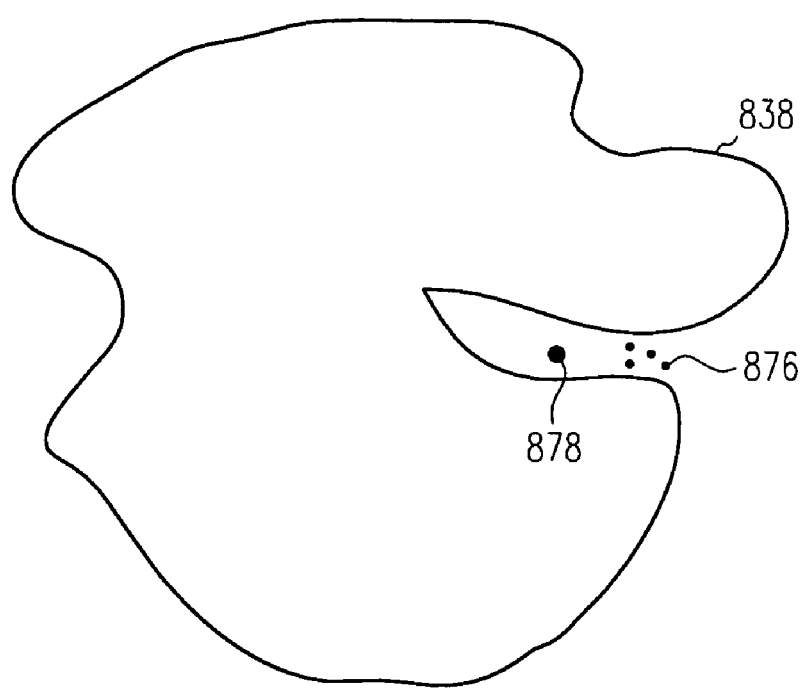
FIG. 8 illustrates an outline of an embryo with a lateral indentation, according to an embodiment of the invention.

Despite the overall effectiveness of the outlining operations, some instances may include manual outlining. For example, FIG. 8 illustrates an outline of an embryo with a lateral indentation, according to an embodiment of the invention. The outline 838 represents the ideal outline 838. Applying the above outlining parameters could result in filing in the lateral indentation 878 with outline 876 (shown in phantom). In this type of situation the system 100 provides for the possibility of manual outlining.

Reconstruction

After optically sectioning the object, digitizing the optical sections, and outlining the digitized optical sections 332, a three dimensional graphical representation of the object is reconstructed for computerized viewing. In one embodiment, the system 100 contemplates two types of reconstructions: a three-dimensional elapsed time stacked image reconstruction and a three dimensional time-elapse faceted image reconstruction.

Figure 9A:
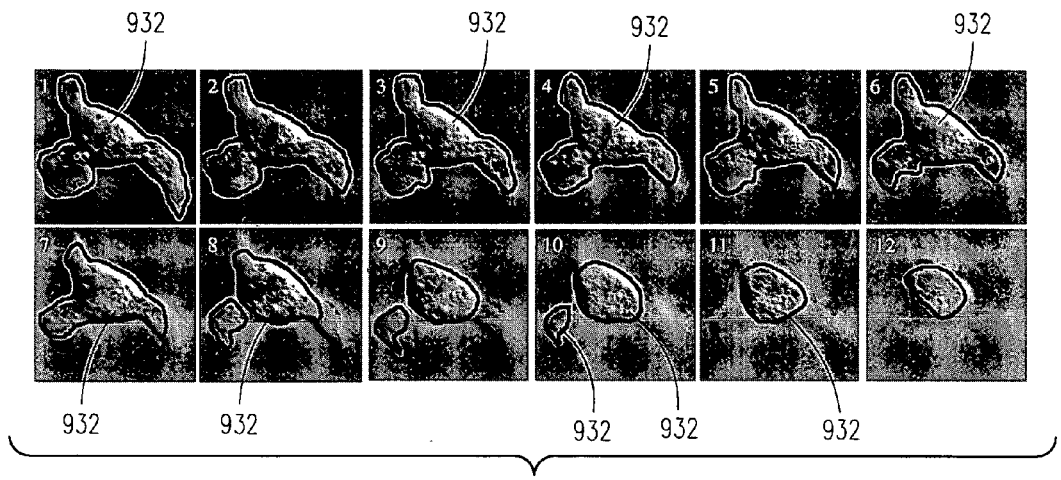
FIG. 9A illustrates a number of digitized optical sections at different focal planes, according to one embodiment of the invention.
Figure 9B:
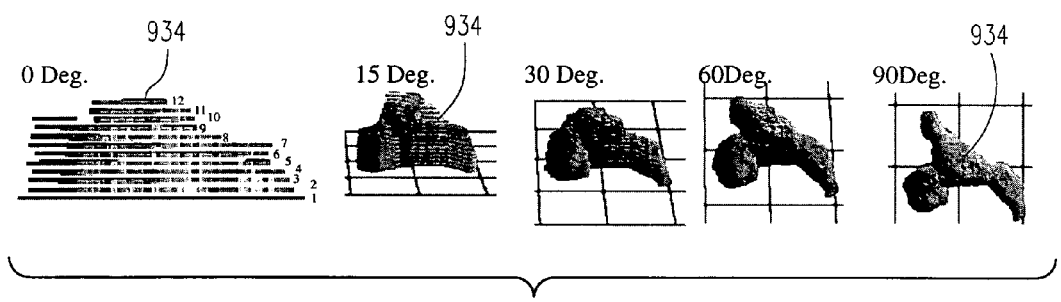
FIG. 9B illustrates a three-dimensional elapsed time stacked image reconstruction based on a number of digitized optical sections according to one embodiment of the invention.

To help illustrate, FIG. 9A illustrates a number of digitized optical sections at different focal planes, according to one embodiment of the invention. In particular, FIG. 9A illustrates a number of optical sections 932 at different focal depths. FIG. 9B illustrates a three-dimensional elapsed time stacked image reconstruction based on a number of digitized optical sections, according to one embodiment of the invention. In particular, FIG. 9B illustrates stacked image reconstruction 934 that includes stacking each of the digitized optical sections 932, wherein the focal depth of the digitized optical sections 932 translates into a height. The digital image analysis logic 133 constructs a stacked image reconstruction 934 by stacking each of the digitized optical sections 932 by height. The first stacked image reconstruction 934 of FIG. 9B shows the digitized optical sections from a 0° viewing attitude, with each digitized optical section labeled from one to twelve. Thus, the digitized optical section 932 appearing in FIG. 9A (frame 1) appears at the bottom of the stacked image reconstruction 934 shown in FIG. 9B at 0°, and the digitized optical section 932 appearing in FIG. 9A (frame 12) appears at the top of the same stacked image reconstruction 934. The stacked image reconstruction 934 viewed from the 0° viewing attitude only displays a side view of each digitized optical section 932, but clearly shows the height spacing between each digitized optical section 932.

Each stacked image reconstruction 934 displays only that portion of each of the plurality of digitized optical sections 932 defined by the outline 338 of the digitized optical sections 932, and visible from the particular viewing attitude. The 30° stacked image reconstruction 934 of FIG. 9B shows the digitized optical sections 932 of FIG. 9A viewed from a viewing attitude of 30° above the horizontal. In this manner, the edges of the digitized optical sections 932 overlap each other clearly showing the three-dimensional nature of the stacked image reconstruction 934. The stacked image reconstructions 934 essentially comprises overlapping a series of two dimensional digitized optical sections 932, and then displaying only that portion of the digitized optical sections 932 not overlapped or hidden by an underlying digitized optical section 932. For example, starting with the low-level digitized optical section 932 shown in FIG. 10A (frame 1), each subsequent digitized optical section 932 stacks over the top of the previous digitized optical section 932.

The digital image analysis logic 133 assigns a grayscale value to each point of each of the plurality of digitized optical sections 932, with the grayscale weight of each digitized optical section 932 increasing by height. As each digitized optical section 932 is laid over the lower digitized optical section 932, that portion of the proceeding digitized optical section 932 overlapped by the newly applied digitized optical section 932 is no longer visible from that particular viewing attitude. FIG. 9B also shows the same stacked image reconstruction 934 displayed from a 60° viewing attitude and a 90° viewing attitude, which expose for viewing different portions of the digitized optical sections 932. By creating a stacked image reconstruction 934 for each period of time of optical sectioning, and displaying each stacked image reconstruction 934, the system 100 creates and displays a three dimensional elapsed time stacked image reconstruction of the object.

Figure 9C:
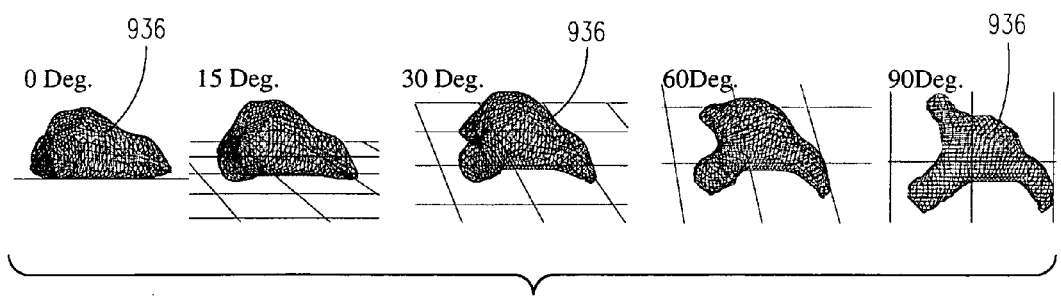
FIG. 9C illustrates a three-dimensional elapsed time faceted image reconstruction based on a number of digitized optical sections, according to one embodiment of the invention.

FIG. 9C illustrates a three-dimensional elapsed time faceted image reconstruction based on a number of digitized optical sections, according to one embodiment of the invention. In particular, FIG. 9C shows a faceted image reconstruction 936 of the plurality of digitized optical sections 932 appearing in FIG. 9A.

Figure 10:
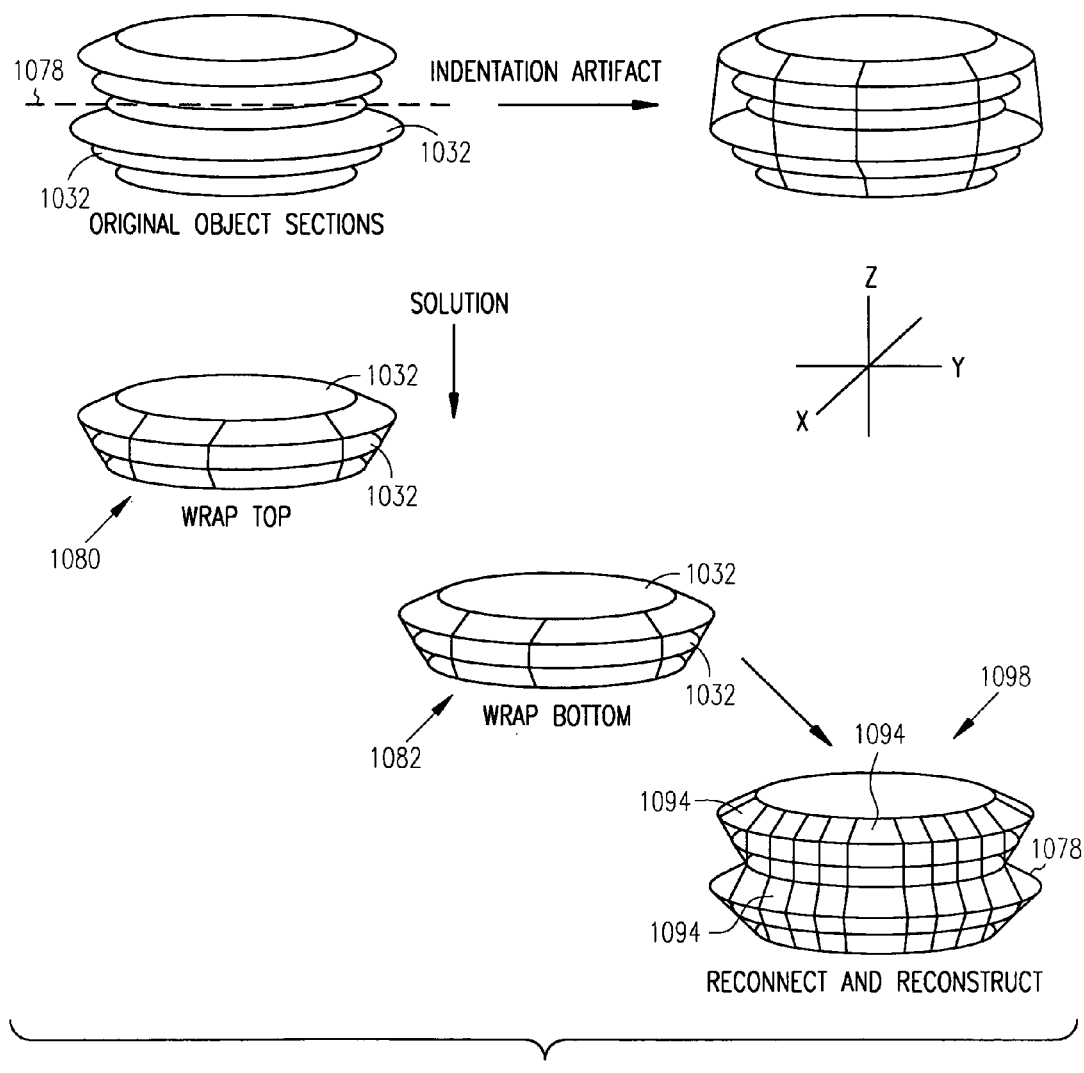
FIG. 10 illustrates different parts of a stacked image reconstruction of a number of digitized optical sections, according to one embodiment of the invention.

FIG. 10 illustrates different parts of a stacked image reconstruction of a number of digitized optical sections, according to one embodiment of the invention. In particular, FIG. 10 illustrates a number of digitized optical sections 1032 having a lateral indentation 1078. FIG. 10 also illustrates a stacked image reconstruction 1034 of a number of digitized optical sections 1032, wherein the lateral indentation 1078 is not accounted for during reconstruction. One embodiment for reconstruction that accounts for the lateral indentation 1078 is described in more detail below. FIG. 10 illustrates a top wrap 1080 and a bottom wrap 1082. FIG. 10 illustrates a partial faceted image reconstruction 1098 having a number of facets 1094. A more detailed description of FIG. 10 will be described with reference to the flow diagrams in FIGS. 11 and 12.

Figure 11:
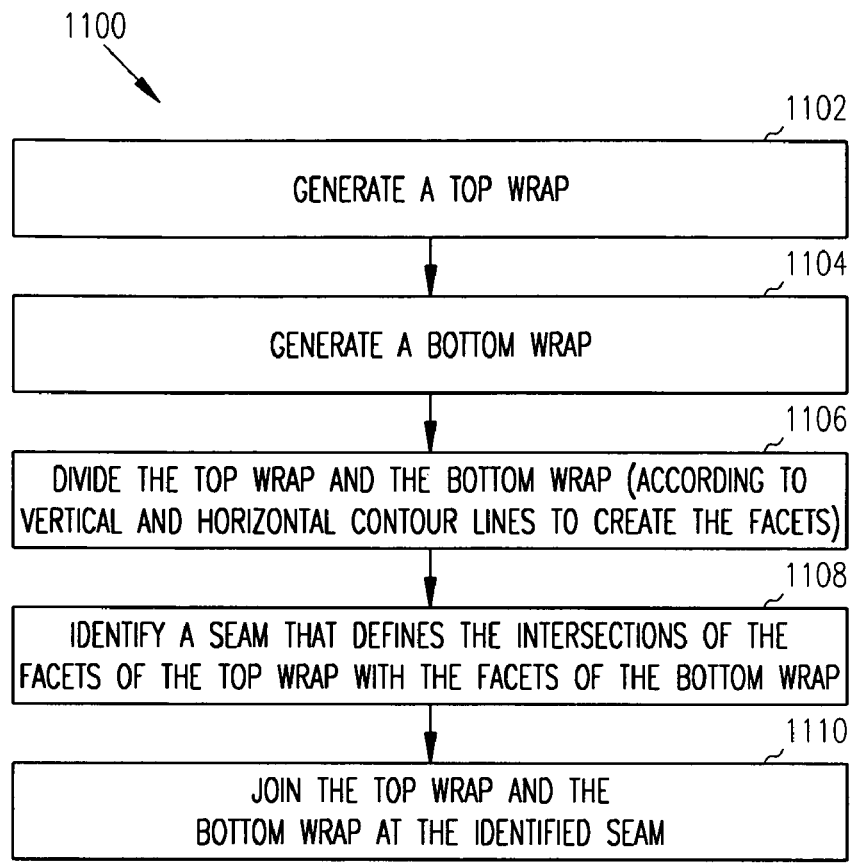
FIG. 11 illustrates a flow diagram for faceted image reconstruction, according to one embodiment of the invention.

FIG. 11 illustrates a flow diagram for faceted image reconstruction, according to one embodiment of the invention. In block 1102 of the flow diagram 1102, the top wrap for the faceted image is generated. With reference to the system 100, the digital image analysis logic 133 generates the top wrap. The top wrap is similar to the stacked image reconstruction 934 shown in FIG. 9B viewed from a 90° attitude. The operations for the generation of the top wrap are described in more detail below in conjunction with the flow diagram 1200 of FIG. 12. Control continues at block 1104.

In block 1104, the bottom wrap for the faceted image is generated. With reference to the system 100, the digital image analysis logic 133 generates the bottom wrap. The bottom wrap is similar to the stacked image reconstruction 934 shown in FIG. 9B, viewed from a minus 90° attitude. The operations for the generation of the bottom wrap are described in more detail below in conjunction with the flow diagram 1200 of FIG. 12. In other words, the faceted image reconstruction 936 (shown in FIG. 9C) includes dividing the stacked image reconstruction 934 into a top wrap and a bottom wrap. Control continues at block 1106.

In block 1106, the top wrap and the bottom wrap are divided according to vertical and horizontal contour lines to create the facets (as illustrated in FIG. 10E). With reference to the system 100, the digital image analysis logic 133 divides the top wrap and bottom wrap according to vertical and horizontal contour lines to create the facets. The facets 1094 encompass the surface area of the top and bottom wraps (as illustrated in FIG. 10E). The facets 1094 comprise the area between the vertical and horizontal contour lines that surround the top wrap 1080 and the bottom wrap 1082. The vertices of the facets 1094 have X Y and Z coordinates defined by an operation described below in conjunction with the flow diagram 1200 in FIG. 12. While FIG. 10E shows the facets 1094, FIG. 9C provides a better illustration but the facets therein are too numerous to provide for numbering. FIG. 9C shows the faceted image reconstruction 936 of the digitized optical sections 932 shown in FIG. 9A, viewed from a plurality of viewing attitudes. The faceted image reconstruction 936 of FIG. 9C viewed at an attitude of 90° shows the facets of the top wrap. Dividing the top wrap and the bottom wrap according to the vertical and horizontal contour lines creates the facets 1094 at the intersections of the contour lines. Therefore, the perimeter of each facet 1094 is defined by a pixel with a X, Y and Z coordinate. Control continues at block 1108.

In block 1108, a seam is identified that defines the intersections of the facets of the top wrap with the facets of the bottom wrap. With reference to the system 100, the digital image analysis logic 133 identifies a seam that defines the intersections of the facets of the top wrap with the facets of the bottom wrap. Evaluation of the X, Y and Z coordinates of the pixels of the top wrap 1080 and the bottom wrap 1082 allows identification of a seam which defines the intersection of the facets 1094 of the top wrap 1080 and the facets 1094 of the bottom wrap 1082. Control continues at block 1110.

In block 1110, the top wrap and the bottom wrap are joined at the seam. With reference to the system 100, the digital image analysis logic 133 joins the top wrap and the bottom wrap at the seam. Joining the top wrap 1080 and the bottom wrap 1082 at the seam allows creation of the faceted image reconstruction, and repeating this operation over several periods of time allows creation of a three dimensional elapsed time faceted image reconstruction.

Figure 12:
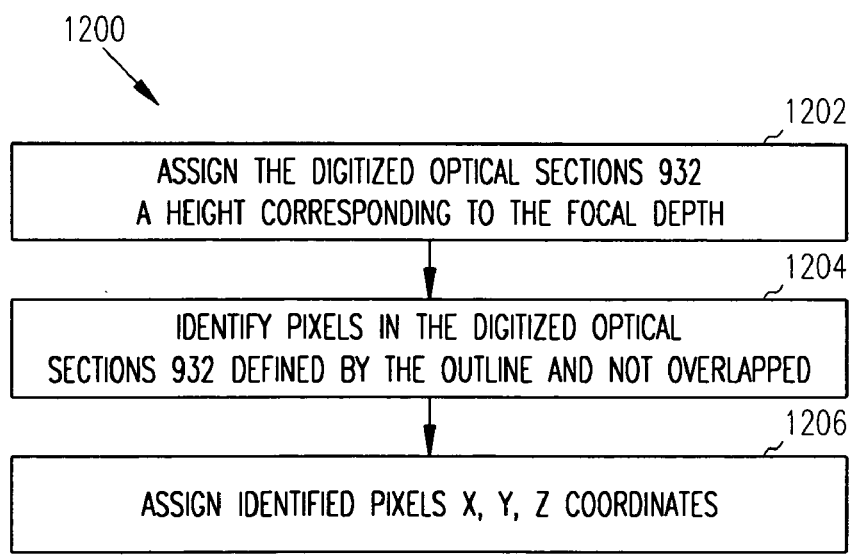
FIG. 12 illustrates a flow diagram for the generation of a top wrap or bottom wrap for faceted image reconstruction, according to one embodiment of the invention.

FIG. 12 illustrates a flow diagram for the generation of a top wrap or bottom wrap for faceted image reconstruction, according to one embodiment of the invention. The flow diagram 1200 is described in reference to the generation of the top wrap but as will be described below modifications can be made to the operations of the flow diagram 1200 for the generation of a bottom wrap for faceted image reconstruction.

In block 1202, the digitized optical sections 932 are assigned a height corresponding to the focal depth. With reference to the system 100, the digital image analysis logic 133 assigns heights to the digitized optical sections 932 that correspond to the focal depth. This operation is similar to the operation of assigning heights used to create the stacked image reconstructions 934 (as described above). Control continues at block 1204.

In block 1204, pixels are identified that are in the digitized optical sections 932 and are defined by the outline 338 and are not overlapped. With reference to the system 100, the digital image analysis logic 133 identifies the pixels that are in the digitized optical sections 932 and are defined by the outline 338 and are not overlapped. In particular, the digital image analysis logic 133 identify pixels corresponding to only that portion of the area of each of the plurality of digitized sections 932 defined by the outline of the digitized sections 932, and not overlapped by another digitized optical section as viewed from the top of the reconstruction. This operation involves creating the stacked image reconstruction 934 of FIG. 9B viewed from the 90° attitude. Thus, the digitized optical section 932 shown in FIG. 9A at frame 12 appears at the top of the stack, and the digitized optical section 932 shown in FIG. 9A at frame 11 appears directly underneath. However, that portion of the digitized optical section 932 of FIG. 9A shown at frame 11, overlapped by the digitized optical section 932 shown at frame 12 does not appear. This operation continues until the appropriate portions of each of the plurality of digitized optical sections 932 appears in the top wrap. Control continues at block 1206.

Figure 13:
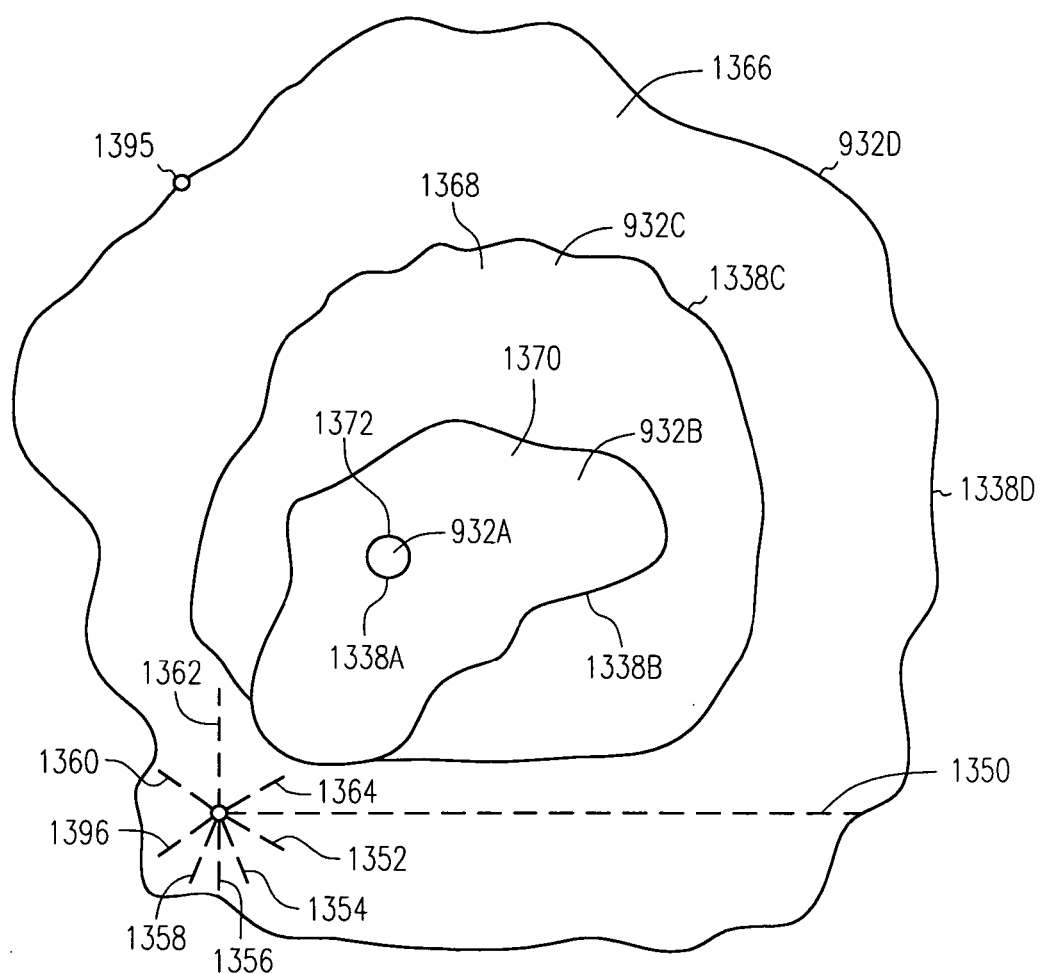
FIG. 13 illustrates a number of digitized optical sections stacked according to height, where the height corresponds to the focal depth of the particular digitized optical section, according to one embodiment of the invention.

In block 1206, the identified pixels are assigned X,Y,Z coordinates. With reference to the system 100, the digital image analysis logic 133 assigns the identified pixels to X,Y,Z coordinates. An X, Y and Z coordinate is such that the X and Y coordinates correlate to the pixels row and column and the Z coordinate represents the height of the location of the pixel in the faceted image reconstruction 936. To help illustrate, FIG. 13 illustrates a number of digitized optical sections stacked according to height, where the height corresponds to the focal depth of the particular digitized optical section, according to one embodiment of the invention. As shown, the plurality of digitized optical sections 932 take on the look of a contour map. FIG. 13 illustrates four contour levels stacked according to height, starting from the bottom: (1) a zero micron contour level 1366, (2) a plus one micron contour level 1368, (3) a plus two micron contour level 1370 and (4) a plus three micron contour level 1372. The zero micron contour level 1366 is associated with the digitized optical section 932D and the outline 1338D. The plus one micron contour level 1368 is associated with the digitized optical section 932C and the outline 1338C. The plus two micron contour level 1370 is associated with the digitized optical section 932B and the outline 1338B. The plus three micron contour level 1372 is associated with the digitized optical section 932A and the outline 1338A.

Additionally, a pixel 1395 lies on the outline 1338D. Accordingly, the Z coordinate for the pixel 1395 equals the height of the digitized optical section 932D. For pixels, like a pixel 1396, that is within a particular outline 1338D, but not actually on the outline 1338D, the Z coordinate is assigned a height based on a weighted average. In an embodiment, for those pixels lying outside of an outline, for example background pixels, the Z coordinate of these pixels can be designated an easily recognizable arbitrary number like one million.

Those skilled in the art will realize that a number of techniques can accomplish the calculation of the weighted average. In one embodiment, a number of rays extending from each of the pixels within any of the outlines 1338 of any of the digitized optical sections 1332 to the next nearest outline 1338 are defined. Additionally, the weighting scheme involves weighting the shortest rays more than the longest rays. To help illustrate, FIG. 13 includes the pixel 1396 that is located between the zero micron contour level 1366, the plus one micron contour level 1368 and the plus two micron contour level 1370. Because the pixel 1396 does not lie directly on any of the outlines 1338, the Z coordinate of the pixel 1396 must equal a value somewhere between the heights of the surrounding outlines 1338 of the digitized optical sections 1332. In one embodiment, the determination of the Z coordinate value of the pixel 1396 involves drawing a number of rays from the pixel 1396 to the surrounding outlines 1338 and weighting the shorter rays more than the longer rays. As shown, a number of rays 1350, 1352, 1354, 1356, 1358, 1360, 1362 and 1364 are drawn out from the pixel 1396 to surrounding outlines 1338B, 1338C and 1338D. In particular, eight rays extend at 45° angles from the pixel 1396. The ray 1350, the ray 1352, the ray 1354, the ray 1356, the ray 1358 and the ray 1360 extend from the pixel 1396 to the zero micron contour level 1366. The ray 1362 extends from the pixel 1396 to the plus one micron contour level 1368, and the ray 1364 extends from the pixel 1396 to the plus two micron contour level 1370. In this manner, each of the eight rays 1396–1364 extends a certain length of L1–L8, and contacts an outline 1338 of a particular height of H1–H8. Calculation of the Z coordinate of the pixel 1396 proceeds by using an equation that weights the heights H1–H8 in an inverse proportion to their lengths L1–L8, in the following manner:

$$Z = \frac{\begin{array}{c}H_1(1/L_1) + H_2(1/L_2) + H_3(1/L_3) + H_4(1/L_4) + \\ H_5(1/L_5) + H_6(1/L_6) + H_7(1/L_7) + H_8(1/L_8)\end{array}}{\begin{array}{c}(1/L_1) + (1/L_2) + (1/L_3) + (1/L_4) + \\ (1/L_5) + (1/L_6) + (1/L_7) + (1/L_8)\end{array}}$$

This operation repeats until each pixel of the top wrap is assigned a X, Y and a Z coordinate. In a converse fashion, the digital image analysis logic 133 constructs a bottom wrap 86 wherein the viewing attitude of the stacked image reconstruction 934 is changed. The top wrap uses a viewing attitude of 90°, while the bottom wrap repeats the operation with a viewing attitude of minus 90°. In other words, the top wrap views the stacked image reconstruction 934 from the top, and the bottom wrap views the stacked image reconstruction 934 from the bottom.

One difficulty encountered with the faceted image reconstruction operations involves the inability to accurately depict advanced and complicated contours. Returning to FIG. 10, a stacked image reconstruction 1034 of a plurality of digitized optical sections 1032 which contains a pronounced lateral indentation 1078 is shown. For pronounced lateral indentations like the lateral indentation 1078, the faceted image reconstruction operations may not accurately describe the area of indentation. Digitized optical sections 1032 above and below the lateral indentation 1078 overhang the lateral indentation 1078. Again, referring to the fishing net analogy, casting a net over the stacked image reconstruction 1034 will not completely define the surface area defined by the digitized optical sections 1032.

Accordingly, in one embodiment, the lateral indentation 1078 is identified at the maximum point of advance, and then subdividing the object at the maximum point of advance creating a top partial wrap 1080 and a bottom partial wrap 1082. Additionally, the operations illustrated above in conjunction with FIG. 11 for creating the faceted image reconstruction 1036 on the top partial wrap 1080 and the bottom partial wrap 1082 are executed. Identification of the lateral indentation 1078 may include manual intervention, wherein the necessity of identifying the lateral indentation 1078 will depend on the particular circumstances and the contour of the particular object involved. Joining the top partial wrap 1080 and the bottom partial wrap 1082 at their seam results in creation of a partial faceted image reconstruction 1098. The partial faceted image reconstruction 1098 clearly shows the lateral indentation 1078. Since the lateral indentation 1078 could appear in either the top wrap 1080 or the bottom wrap 1082, the operations of generating the partial faceted image reconstruction 1098 includes dividing either the top wrap 1080 or the bottom wrap 1082 at the lateral indentation 1078. Additionally, the operations include separately processing the top partial wrap 1080, and the bottom partial wrap 1082. These operations may repeat in order to define successive lateral indentations.

Figure 14:
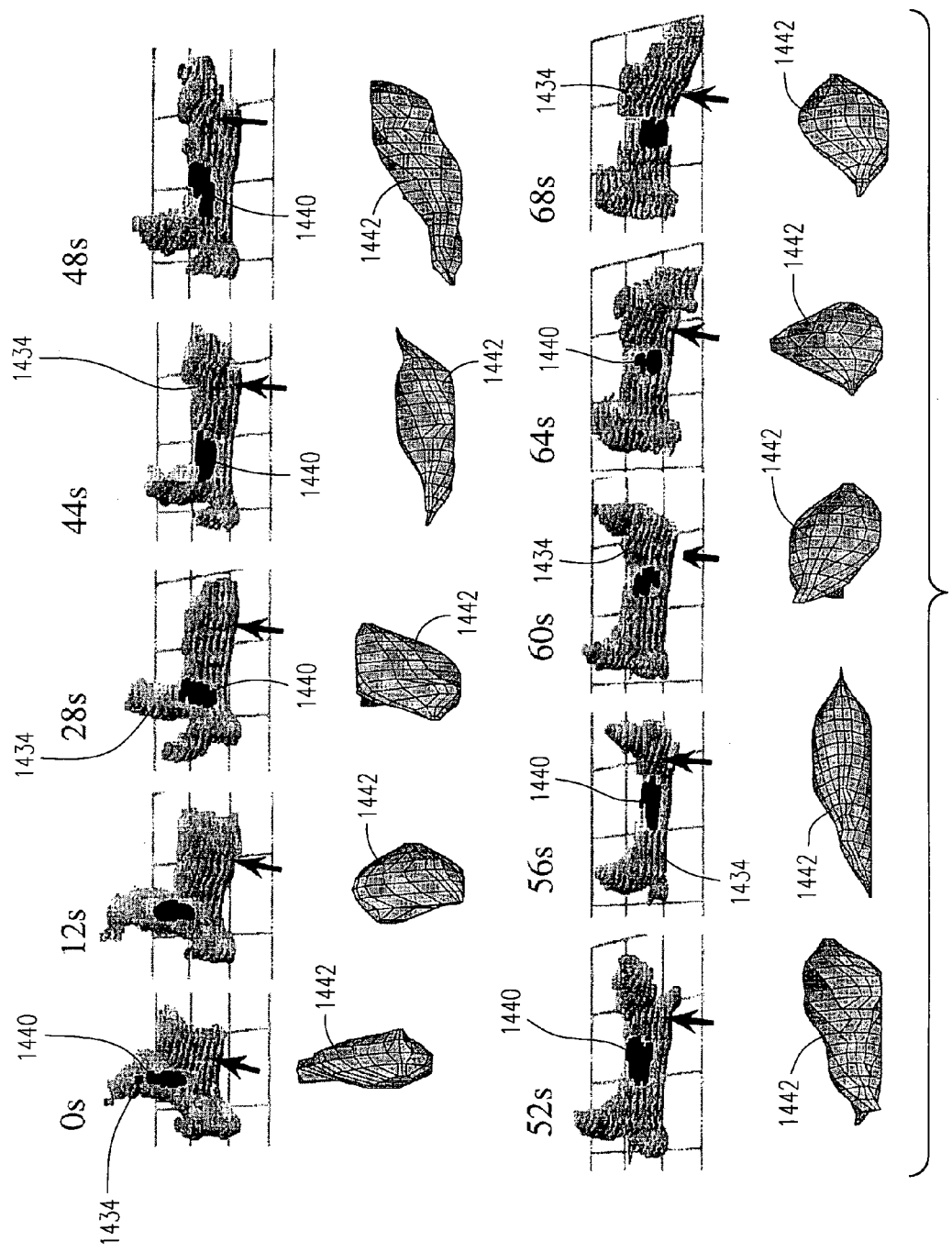
FIG. 14 illustrates a stacked image reconstruction of a cell having a nucleus over a number of time periods, according to one embodiment of the invention.

Some situations may require tracking the motility and morphology of an interior portion of the moving object. For example, FIG. 14 illustrates a stacked image reconstruction of a cell having a nucleus over a number of time periods, according to one embodiment of the invention. The stacked image reconstructions 1434 of the cell contain a slot 1440, representing the location of the nucleus of the cell. Below each of the stacked image reconstructions 1434 appears a faceted slot 1442 representing the nucleus of the cell.

Figure 15:
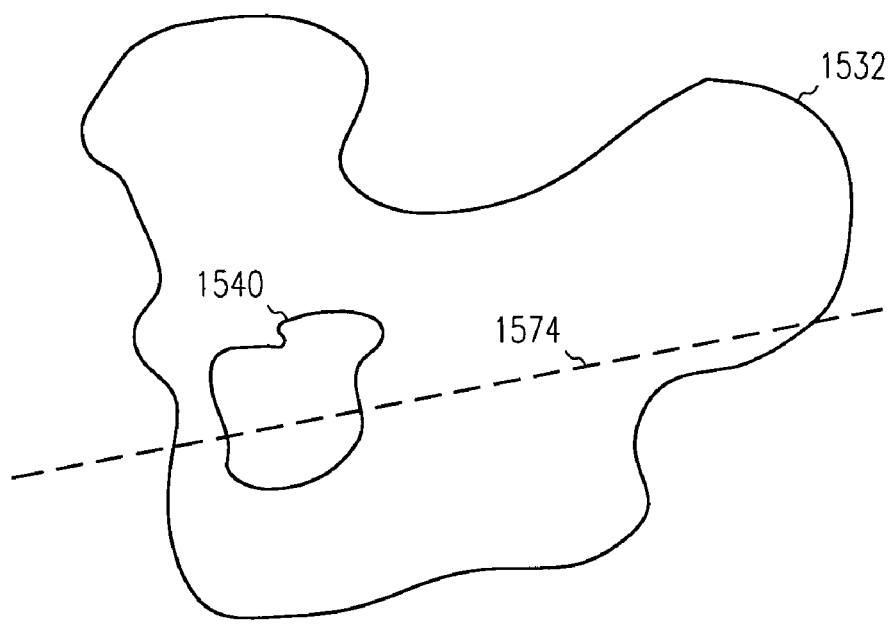
FIG. 15 illustrates a digitized optical section having a slot that is sliced, according to an embodiment of the invention.

FIG. 15 illustrates a digitized optical section having a slot that is sliced, according to an embodiment of the invention. In particular, FIG. 15 shows a single digitized optical section 1532 with an internal trace slot 1540, and a slice 1574 which divides the digitized optical section 1532 and the slot 1540 into two portions. Creating the stacked image reconstruction 1434 of FIG. 14 involves outlining each digitized optical section, identifying a slot 1540 in each of the digitized optical sections 1432, and dividing each slot 1540 of each digitized optical section 1532 at a slice 1574. The stacked image reconstruction 1434 involves stacking one of the portions of the digitized optical sections 1532 defined by the slice 1574. This allows viewing both the stacked image reconstruction 1434 and the slot 1540 in the same image. Outlining the slot 1540 can involve the aforementioned automatic outlining operations; or can proceed manually.

Figure 16:
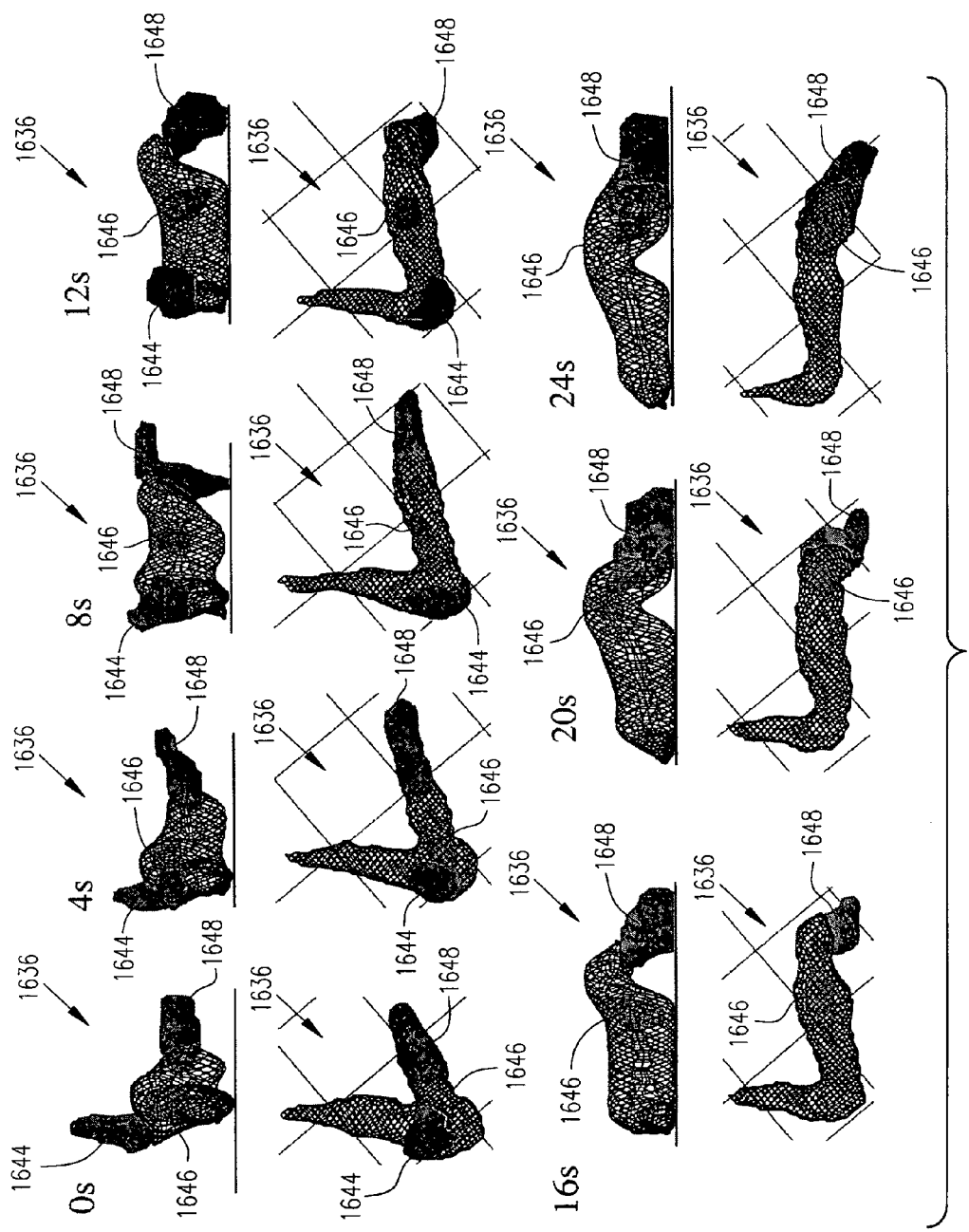
FIG. 16 illustrates a number of faceted image reconstructions over time of the motility and the morphology of a moving object, according to one embodiment of the invention.

FIG. 16 illustrates a number of faceted image reconstructions over time of the motility and the morphology of a moving object, according to one embodiment of the invention. In particular, FIG. 16 shows an example of a plurality of faceted image reconstructions 1636 over a period of time including a first faceted slot 1644, a second faceted slot 1646, and a third faceted slot 1648. FIG. 16 shows the faceted image reconstruction 1636 at seven different time periods, and from two different viewing attitudes. The top group of faceted image reconstructions 1636 appears at a 0° viewing attitude, while the bottom group of faceted image reconstruction 1636 appears at a 90° viewing attitude. In this manner, FIG. 16 shows that embodiments of the invention can depict the motility and morphology of not only a moving object, but of selected portions of the moving object.

Figure 17:
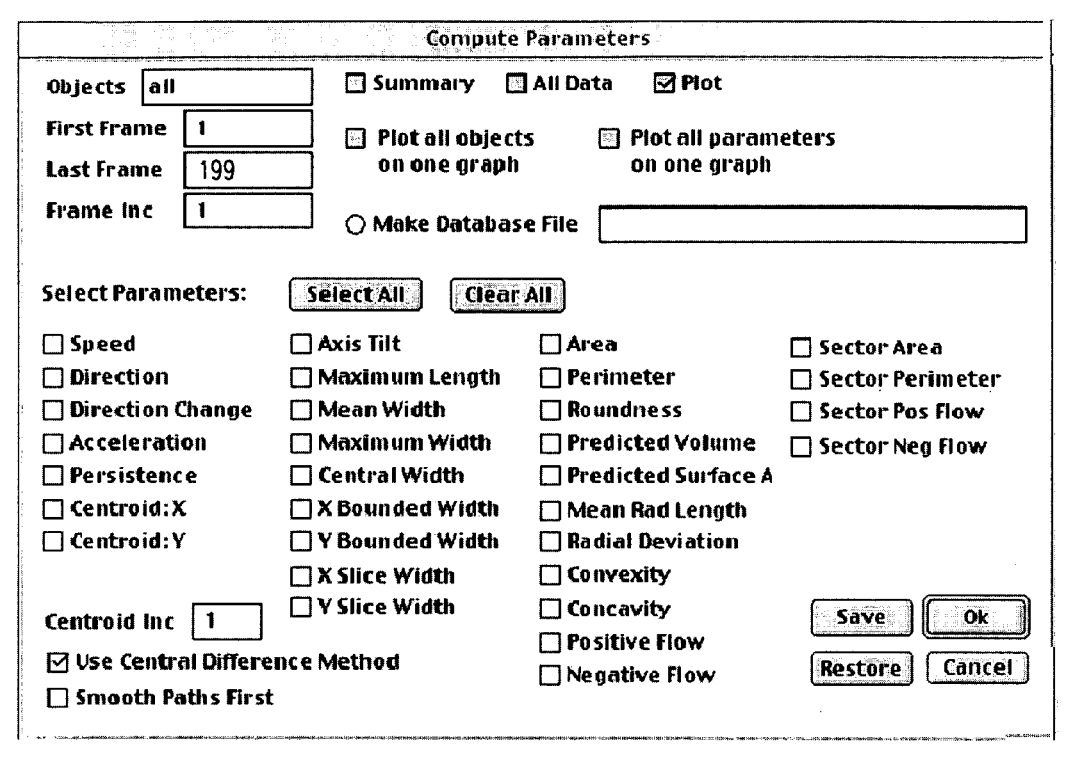

Accordingly, the reconstruction operations of embodiments of the invention may provide a three dimensional mathematical model for computing motility and dynamic morphology parameters. FIG. 17 illustrates a graphical user interface screen to allow for selection from a plurality of parameters representing the motility and morphology of an object, according to one embodiment of the invention. Calculation of parameters representing the motility and morphology of an object requires defining the following notation:

---

Notation:
    "F" equals the total number of digitized time points involved in the calculation, while "f" equals the time point subject to the current calculation; (X[f], Y[f]) equals the coordinates of the centroid of digitized optical section f, where $1 \leq f \leq F$;
    "I" equals the frame increment and defines what previous and subsequent mean (for example a frame increment of I means the centroid based calculations of the N'th digitized frame use the N–I previous digitized frame and the N+I subsequent digitized frame), increasing the centroid increment tends to smooth the particular value, and reduces sudden uneven jumps;
    "n" equals the number of pixels in a digitized frame's outline, where $P_1 \ldots P_N$ represents the n individual pixels, and where $P_{xn}$ and $P_{yn}$ comprises the X and Y coordinates of the n'th pixel;
    "frate" equals the number of digitized frames per unit of time;
    "scale" equals the scale factor in distance units per pixel;
    "sqrt[number]" denotes the square root of the number;
    "abs[number]" denotes the absolute value of the number;
    "angle[X, Y]" denotes the angle in degrees between the vector (X, Y) and the X axis, with positive angles measured counter-clockwise;
    "NAN" equals NOT A NUMBER, an arbitrary large designation (1,000,000 for example) generally used to indicate a non-processed value; and
    "Central Difference Method" (CDM), CDM calculations use the previous and subsequent centroids as determined by the frame increment I in the calculation, while non CDM calculations use only the previous centroid.

Parameters:
  Speed:
    For (f – I <1),
      Speed[f]= 0;
    For (f – I $\geq$ 1),
      Speed[f] = (scale)(frate)(sqrt[ ((X[f] – X[f–I])/I)$^2$ + ((Y[f] – Y[f–I])/I)$^2$
  Speed (CDM):
    For (f – I $\geq$ 1) and (f + I $\leq$ F),
      Speed[f] = (scale)(frate)(sqrt[ ((X[f+I] – X[f–I])/I)$^2$ + ((Y[f+I] – Y[f–I])/I)$^2$
    For (f – I < 1) and (f + I $\leq$ F),
      Speed[f] = (scale)(frate)(sqrt[ ((X[f+I] – X[f])/I)$^2$ + ((Y[f+I] – Y[f])/I)$^2$
    For (f – I $\geq$ 1) and (f + I > F),
      Speed[f] = (scale)(frate)(sqrt[ ((X[f] – X[f–I])/I)$^2$ + ((Y[f] –Y[f–I])/I)$^2$
    For all other f,
      Speed[f] = 0
  Direction:
    For (f – I $\geq$ 1),
      Dir[f] = angle[ (X[f] – X[F–I]), (Y[f] – Y[f–I) ]
    For (f – 1 < 1) and (f + I $\leq$ F),
      Dir[f] = angle[ (X[f + I] – X[f]), (Y[f+I] – Y[f]) ]
    For all other f,
      Dir[f] = 0
  Direction (CDM):
    For (f – I $\geq$ 1) and (f + I $\leq$ F), -continued

```
            Dir[f] = angle[ (X[f+I] − X[f−I]), (Y[f+I] − Y[f−I]) ].
        For (f − 1 < 1) and (f + I ≦ F),
            Dir[f] = angle[ (X[f+I] − X[f]), (Y[f+I] − Y[f]) ]
        For (f − 1 ≧ 1) and (f + I ≧ F),
            Dir[f] = angle[ (X[f] − X[f−I]), (Y[f] − Y[f−I]) ]
        For all other f,
            Dir[f] = 0
        Note - Multiples of ±360° add to the direction to make the graph continuous.
        For example, one object moving in a spiral would have directions: 0°, 45°,
        90°, 135°, 180°, 225°, 270°, 315°, 360°, 405°, etc.
Direction Change:
        For (f − I < 1),
            DirCh[f] = 0
        For all other f,
            DirCh[f] = Abs[ Dir[f] − Dir[f−I] ]
        Note - if the direction change is greater than 180° it is subtracted from 360°.
        This always gives values between 0° and 180°.
Acceleration:
        For (f − I ≧ 1),
            Acc[f] = Speed[f] − Speed[f−I]
        For all other f,
            Acc[f] = 0
Acceleration (CDM):
        For (f − I ≧ 1) and (f + 1 ≦ f),
            Acc[f] = (Speed[f+I] + Speed[f−I])/2
        For (f − I < 1) and (f + I ≦ F),
            Acc[f] = (Speed[f+I] + Speed[f])/2
        For (f − I ≧ 1) and (f + I > F),
            Acc[f] = (Speed[f] + Speed[f−I])/2
        For all other f,
            Acc[f] = 0
```

Persistence:

$$Persis[f] = Speed[f]/((1+100/360)(DirChg[f]))$$

Note—Persistence is essentially speed divided by the direction change (converted from degrees to grads). One is added to the denominator to prevent division by 0. If an object is not turning the persistence equals the speed.

Centroid:

$$CenX[f] = \sum_{i=1}^{n} P_{xi}/n$$

$$CenY[f] = \sum_{i=1}^{n} p_{yi}/n$$

Note—To convert the centroid to a meaningful number requires multiplication by the scale factor.

Axis Tilt:

This first requires defining the Major Axis of the digitized optical section. This involves finding the pixel furthest from the centroid, this pixel becomes the first end point of the major axis. The second end point of the major axis comprises the pixel furthest from the first end point of the major axis. Thus, the major axis equals the chord connecting the first end point to the second end point.

Tilt[f]=angle in degrees between the major axis and the horizontal axis

Note—Multiples of ±180° are added to the axis tilt continuity. In this case divide the axis tilt by 180 and take the remainder. Thus, the graph of axis tilt versus time for an oblong object spinning at a constant rate will have a constant positive slope for a counter-clockwise spin.

Mean Width:
MeanWidth[f]=Area[f]/MaxLen[f]

Maximum Width:
MaxWid[f]=length of the longest chord perpendicular to the major axis Central Width:
CenWid[f]=length of the chord perpendicular to the major axis and passing though the centroid X Bounded Width:
XWid[f]=width of the smallest rectangle enclosing the digitized optical section's outline Maximum Length:
MaxLen[f]=length of the major axis Y Bounded Width:
YWid[f]=height of the smallest rectangle enclosing the digitized optical section's outline X Slice Width:
XSWid[f]=the length of the longest chord parallel to the XWid[f]

Y Slice Width:
YSWid[f]=the length of the longest chord parallel to the YWid[f]

Area:
Where Area equals the area of the outline of the digitized shape. Let X[i],Y[i] for i=0 . . . n be the vertices of the outline such that X[0]=X[n] and Y[0]=Y[n] (the first vertex is the last vertex). Further, let dx[i]=X[i+1]−X[i] and dy[i]=Y[i+1]−Y[i]. Then by Green's Theorem the area is the following.

$$\text{Area}[f] = 0.5\left(\text{abs}\left[\sum_{i=0}^{n-1}(x[i])(dy[i]) - (y[i]dx[i])\right]\right)$$

Perimeter:

The perimeter equals the perimeter of the outline of the digitized optical section plus the perimeter of any holes. Let X[i], Y[i] for i=0 . . . n be the vertices of the outline such that X[0]=X[n] and Y[0]=Y[n] (the first vertex is the last vertex). Further, let dx[i]=X[i+1]−X[i] and dy[i]=Y[i+1]−Y[i]. Then the perimeter is the following.

$$\text{Perimeter}[f] = \sum_{i=0}^{n-1} sqrt[dx[i]^2 + dy[i]^2]$$

Roundness:

$$\text{Round}[f] = (100)(4\pi)(\text{Area}[f]/\text{Perim}[f]^2)$$

Roundness is a measure (in percent) of how efficiently a given amount of perimeter encloses an area. A circle has roundness of 100%, while a straight line has a roundness of 0%. The factor of 4π in the formula ensures a roundness value of 100% for a circle. The perimeter is squared to make the roundness size-invariant (i.e. dimensionless).

Predicted Volume:

$$\text{Vol}[f]=(4\pi/3)(\text{Max}Len[f]/2)(\text{Mean}Wid[f]/2)^2$$

The predicted volume Vol[f] is the volume of the ellipsoid, with circular cross-section, having length MaxLen[f] and width MeanWid[f].

Predicted Surface:

$$\text{Sur}[f]=(CF)(\pi)(\text{Max}Len[f])(\text{Mean}Wid[f])$$

The predicted surface area Sur[f] equals the surface area of the ellipsoid, with circular cross-section, having length MaxLen[f] and width MeanWid[f]. Where CF is the ellipsoidal surface correction factor defined by $$CF=\int(\sin[X])(sqrt[\sin^2[X]+(r)(\cos^2[X])])dx$$

Where r=MeanWid[f]/MaxLen[f]. Using Simpson's Rule with N=10000, the computer approximates the solution of CF with the following polynomial.

$$CF=0.15r^2+0.065r+0.785$$

Mean Radial Length:

The mean radial length RadLen[f] is the average distance from the centroid to the boundary pixels. Let n be the number of vertices (equal to the number of boundary pixels) of the digitized optical section s outline, indexed from 0 to n−1. Let L[i] equal the distance from the i'th vertex to the centroid. Then $$\text{RadLen}[f] = \sum_{i=0}^{n-1} L[i]/n$$

Radial Deviation:

The radial deviation RadDev[f] equals the ratio of the standard deviation of the above average to that average itself in percent. Let SD equal the standard deviation of L[0] . . . L[n−1].

$$\text{RadDev}[f]=(100)SD/\text{RadLen}[f]$$

Figure 18:
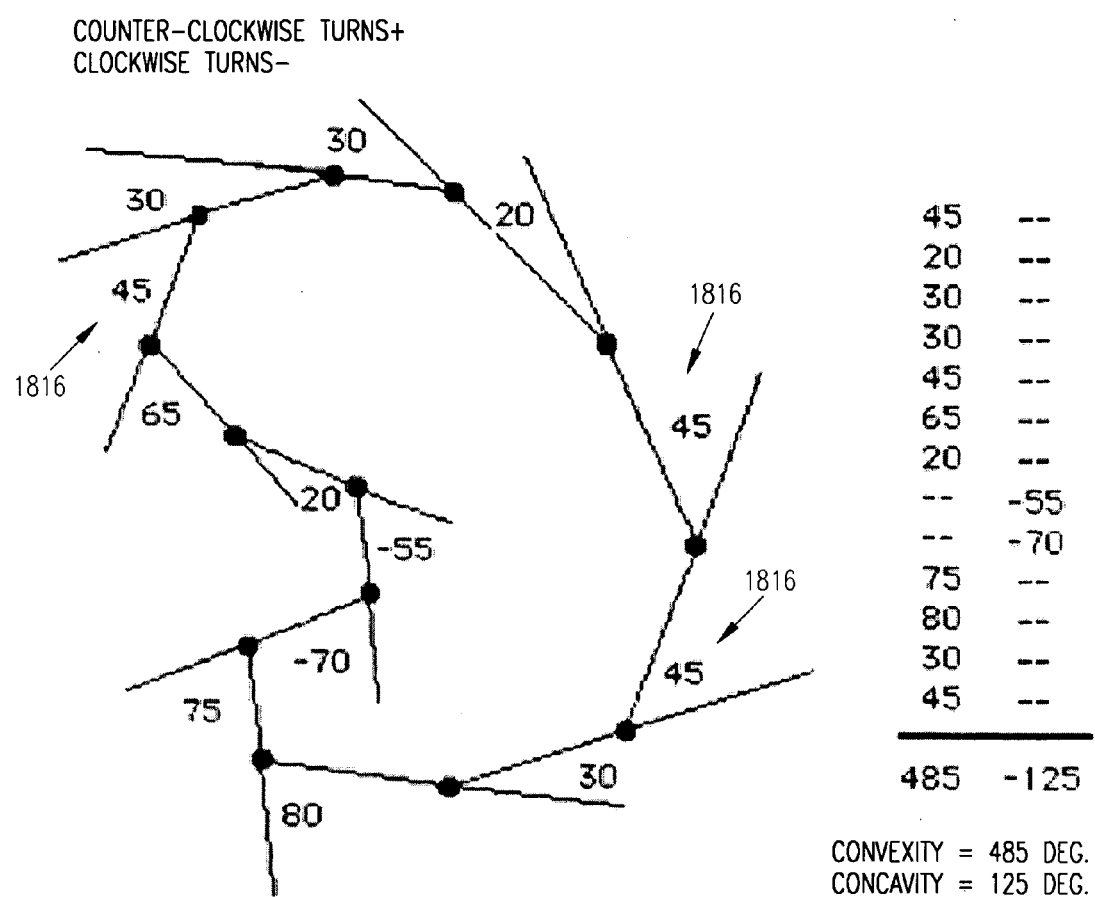
FIG. 18 illustrates the angles of turning 1816 to be measured, according to one embodiment of the invention.

Convexity and Concavity:

To compute Convex[f] and Concav[f] requires drawing line segments connecting each vertices of the outline. The angles of turning 1816 from on segment to the next are measured. FIG. 18 illustrates the angles of turning 1816 to be measured, according to one embodiment of the invention.

Counter-clockwise turning represents a positive angle, while clockwise turning a negative angle. For a closed outline, these angles always add up to 360°. The procedure repeats for holes in the outline.

Convex[f]=sum of the positive turning angles

Concav[f]=abs[sum of the negative turning angles]

Also, Convex[f]−Concav[f]=(360)(1+Number of Holes).

Convexity and concavity measure the relative complexity of the shape of the outline. For example, the convexity of a circle equals 360 and the concavity equals 0.

Positive and Negative Flow:

Positive flow essentially measures the amount of new area formed in a certain amount of time (or in the flow increment), expressed in percent. Conversely, negative flow measures the amount of area lost over the period of time designated by the flow increment in percent. In other words, positive and negative flow measure the percent of area expansion and contraction of an object over a period of time. In particular, let f equal the current frame and FI equal the flow increment. Let A equal the interior of the f-FI outline, minus any holes, and B equal the interior of the f'th outline, minus any holes (with positive and negative flow undefined for f-FI<1). Furthermore, let P equal the area in B not present in A, or P=B−A. Let N equal the area in A not present in B, or N=A−B. Then PosFlow[f]=(100)Area(P)/Area(A)

NegFlow[f]=(100)Area(N)/Area(A)

An additional option for calculation of flow involves fixing the centroids over the flow increment. This aligns the B and A area so that the centroids overlap prior to computing flow, and subtracts out centroid movement from the shape change.

Sectors:

Sector Area, Sector Perimeter, Sector Positive Flow, and Sector Negative Flow comprise derivative measurements of the respective standard parameters. The sector measurements allow parametization of a subset, or sector, of a particular outline. The user inputs the beginning and ending flow in degrees, and the flow range is divided into four sectors. For example, entering 0 and 360 will produce four sectors with sector 1 consisting of 0° to 90°, sector 2 consisting of 91° to 180°, sector 3 consisting of 181° to 270°, and sector 4 consisting of 271° to 360°.

The following summarizes a number of three dimensional parameters representing the motility and dynamic morphology of an object:

3D Centroid:
An average of all the X coordinates of each facet vertex, average of all of the Y coordinates of the each facet vertex, and the average of all of the Z coordinates of each facet vertex.

3D Surface Area:
The sum of all the surface areas of each facet.

3D Volume:
This involves first converting each facet into a prism by extending the facet downward to the corresponding bottom facet. The volume then equals the sum of the volumes of each prism.

3D Height:
The difference between the highest and lowest Z coordinate.

3D Bulk Height:
In the case where the highest or lowest Z coordinate comes from an extruding thin tendril of the object, the bulk height might yield more meaningful information. The first step comprises setting a 3D volume threshold in percent. The 3D Bulk Height equals the 3D Height after eliminating a portion of the 3D Volume equal to the threshold percentage.

3D Length:
The longest chord extending through the centroid from one facet to another.

3D Width:
The longest chord coming from the disc defined by all chords passing through the centroid and perpendicular to the 3D Length.

Sphericity:
The 3D analog of roundness, essentially a measurement of the efficiency of enclosing the 3D Volume with the 3D Area in percent. The Sphericity essentially comprises an invariant ratio of the area to the volume. The sphericity of a perfect sphere would equal 100%.

Overhang:
This would measure the amount any portion of the object overhangs a base (the lowest optical section) of the object, in terms of a ratio scaled from 0 (no overhang) to 100 (maximum overhang). For a given stacked image reconstruction, let A equal the width of the base digitized optical section's outline as viewed from a given attitude. Let B equal the width of the widest digitized optical section's outline. Then the Overhang equals the ratio of B:A.

Area of Projection:
The Area of Projection equals the ratio to the length of the digitized optical section's outline with the greatest area to the length of the base digitized optical section's outline.

Figure 19:
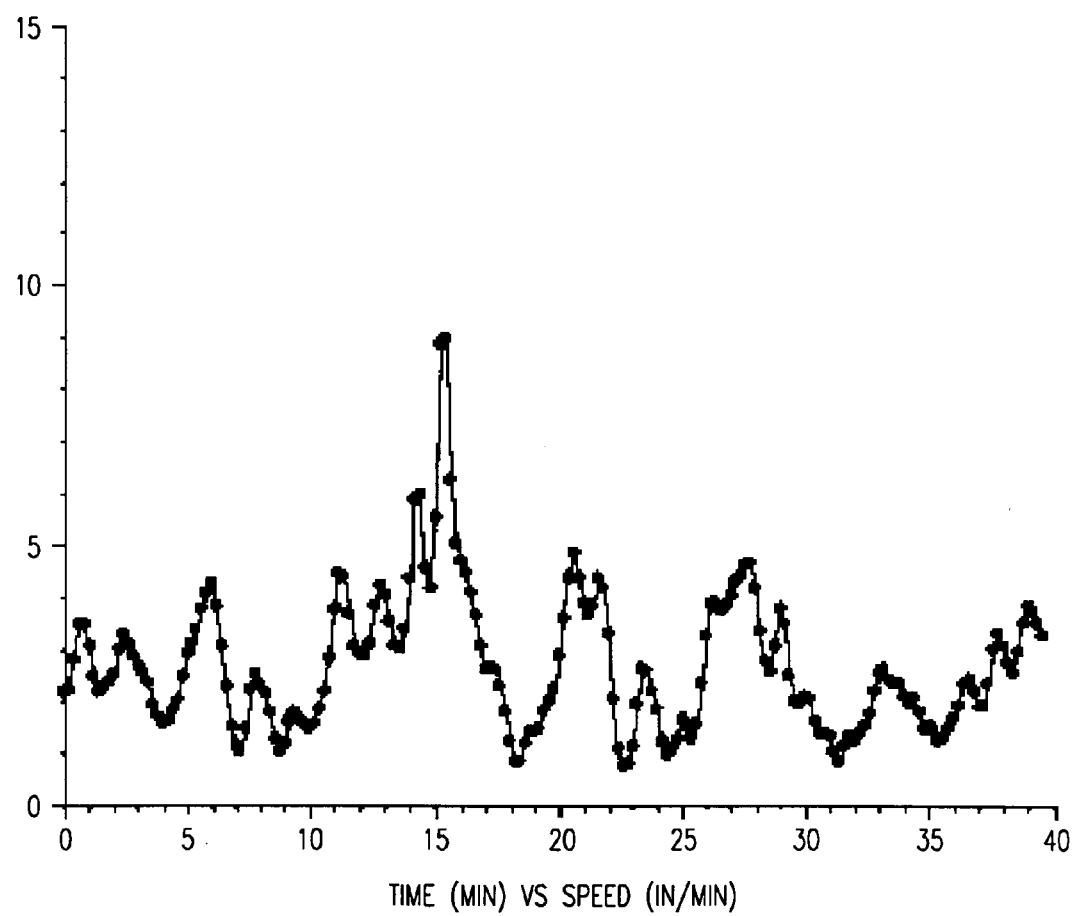
FIG. 19 shows an example of a graph of speed versus time, according to one embodiment of the invention.

Those of ordinary skill in the art will realize the possibility of converting any number of the two dimensional parameters into three dimensional parameters. For example, all of the centroid based parameters easily convert to three dimensional parameters by substituting the 3D Centroid. Additionally, the Graphical User Interface allows for the plotting of graphs of each of the parameters. FIG. 19 shows an example of a graph of speed versus time, according to one embodiment of the invention.

Figure 20:
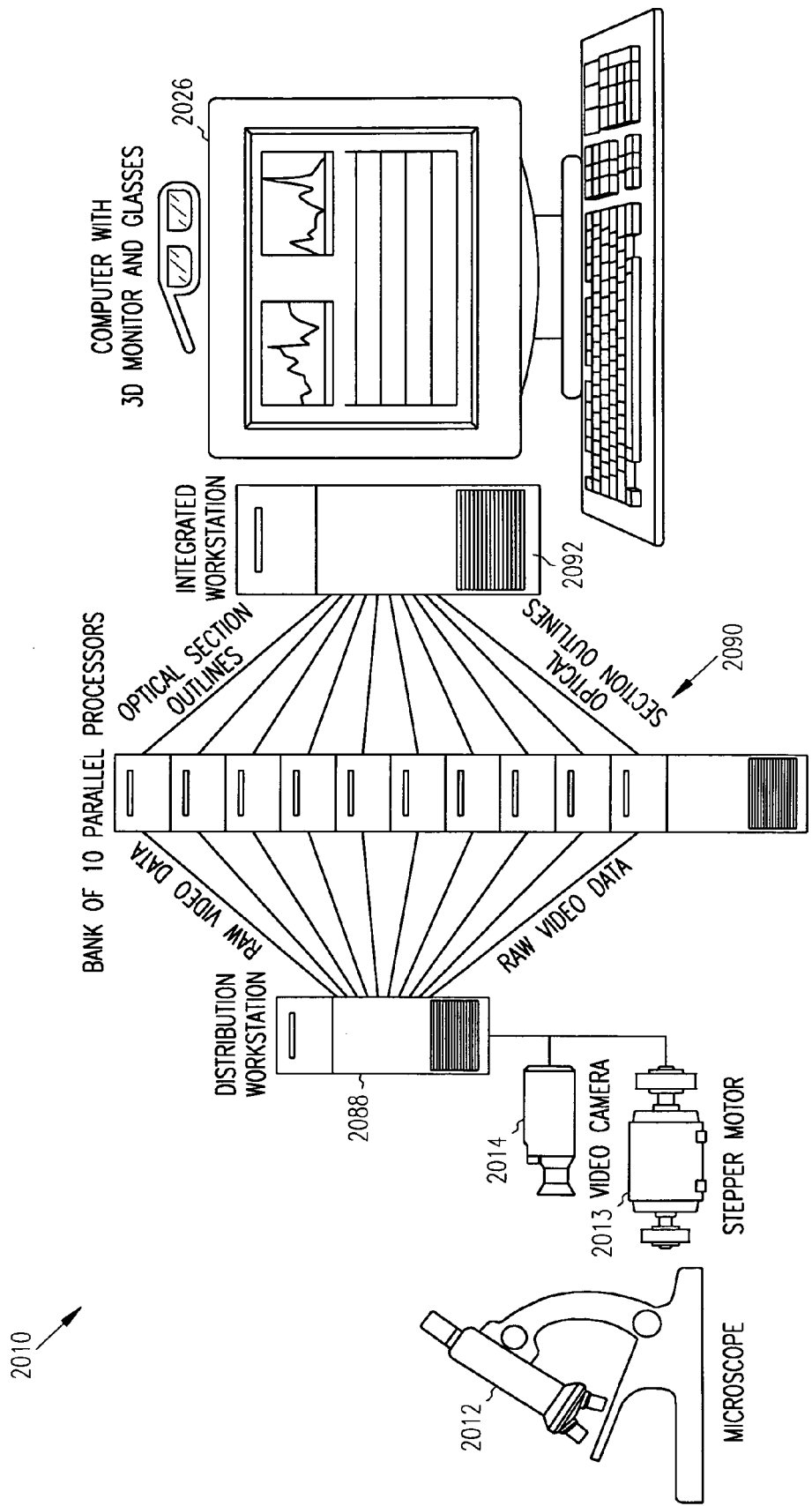
FIG. 20 illustrates a block diagram of a system that allows for reconstruction and motion analysis of cells and nuclei in a developing embryo, according to another embodiment of the invention.

FIG. 20 illustrates a block diagram of a system that allows for reconstruction and motion analysis of cells and nuclei in a developing embryo, according to another embodiment of the invention. In particular, FIG. 20 illustrates a system 2000 configured for parallel processing that allows for reconstruction and motion analysis of cells and nuclei in a developing embryo. In one embodiment, the configuration involves connecting ten parallel processors 2090 through a network connection. The parallel processors 2090 can comprise power PC based Macintosh computers communicating over a fast Ethernet network (two megabytes per second transfer rate) or the accelerated Small Computer System Interface (SCSI) ports (ten megabytes per second). It is anticipated that by utilizing one gigahertz power PC based computers connected by Ethernet the system 2000 may accomplish near real time reconstruction and analysis. In the configuration shown in FIG. 20, a distribution work station 2088 controls the frame grabber 2018. In one embodiment, the ten parallel processors 2090 perform the operations of outlining (as described above), and an integration work station 2092 integrates the information from the parallel processors 2090 and generates the reconstructed images (as described above). In one embodiment, the reconstructed image is played as a dynamic 3D image with four superimposed mini screens which display selected parameters on the computer display terminal 2026. The parallel processing system utilizes software which includes a program for separating the digitized optical sections 32 between the parallel processors 90, and software for reintegrating the information from the parallel processors 90 in the integration work station 92. In one embodiment, such logic may be a process or task that can reside within a memory and/or processor and can be executed within the processor. However, embodiments of the invention are not so limited, as there may be different types of hardware (such as digital logic) executing the operations described therein (which is described in more detail below).

APPLICATION

Application of embodiments of the invention to *C. elegans* embryos will now be described.

Preparation of *C. elegans* Embryos
Embryos of the *C. elegans* Bristol strain N2 were cultured at room temperature (21° C.). Embryos were obtained by placing gravid hermaphroditic animals in depression wells in a glass slide filled with M9 buffer. Animals were bisected transversely at the vulva, releasing embryos into the buffer. Embryos were individually transferred to a slide covered with a thin film of 0.5% agar. Individual embryos was brushed from the initial pool of liquid to the center of the agar pad with an eyelash, and allowed to settle. A drop of M9 buffer was distributed over the embryos, and a coverslip placed over the preparation. Excess agar was trimmed from the edges of the pad with a razor blade, and the edges of the cover slip sealed to prevent dehydration. In one embodiment, to avoid putting excessive pressure on the embryo with a coverslip, embryos were mounted on poly L-lysine coated coverslips, which were then placed on a slide with two pieces of laboratory tape along the edges of the coverslip to act as spacers to avoid pressure on the embryos.

Optical Sectioning and Image Acquisition

Embryos were imaged through a 63× oil immersion objective (NA 1.4) of a Zeiss ICM405 inverted microscope equipped with differential interference contrast (DIC) optics. The shaft of the course focus knob was attached to an Empire Magnetics IN-23P stepping motor controlled by a New England Technologies NEAT 101M motor driver. Such a system may provide 44 steps per μm which is more than adequate. The motor is controlled by a custom designed Linux driver using the parallel port of a 833 MHz Pentium III processor. For added torque, an accuracy motor gear box with a 1:4 step down ratio may be employed, allowing it to operate at 4000 steps per second, and move through 90 μm in one second. In optically sectioning embryos, the stepper motor moves the stage a total of 30 μm in 2.5 sec in each direction. A Burst Electronics MCG-2 micro character-generator is inserted in the video path. It is controlled via the serial port by the Linux driver to mark each video frame for the direction of movement (up versus down), in order to synchronize the beginning of each scan. In reconstructing embryos, only the optical sections in the up-scans, collected in 2.5 sec and repeated at 5 sec intervals are used. This embodiment provides 75 sections, beginning at the lowest point below the substrate, and ending above the embryo. In one embodiment, only the middle 60 sections, beginning at the substratum, are used for reconstruction, the additional 15 sections provides room to bracket the lowest and highest points of the embryo.

In an embodiment, to acquire optical sections in the upscans, a Data Translation DT3152 frame grabber running on a custom built dual 1 GHz Pentium III computer with Windows 2000 is employed. As the scan progressed upwards, the 75 video frames are frame-grabbed into a special driver space memory buffer. As the scan progresses downward, the 75 up-scan frames are transferred to regular computer memory and compressed 20:1 at a rate of 30 frames per second using the Discrete Cosine Transform (DCT) combined with modified Golumb coding. Such an embodiment achieves a better compression ratio than the standard Joint Photographic Expert Group (JPEG) compression because grayscales rather than colors are used, and because the DCT frequency filters are adjusted for DIC optics.

In one embodiment, a dual processor configuration is employed such that the dual processors divide this operation so that each compresses 15 frames per second. A first processor 1 grabs 75 frames, while a second processor transfers the previously compressed 75 frames to the hard disk, providing real time acquisition and storage of up-scan sections. In one embodiment, with compression, one hour of recording uses 690 MB of memory, and six hours of recording could be stored on 6 standard 700 megabytes Compact Disks (CDs).

In one embodiment, a file within the computing device of the system 100 utilizes Apple's attached mini-database called the resource fork. Resource forks allow a maximum of 2727 entries and have a maximum size of 16 megabytes. In an embodiment, the number of trace slots was set to 10,000. In one embodiment, 1024 traces at a time are compressed and bundled into each resource fork entry. One hour of an embryo recording in which 60 optical sections are collected every 5 seconds results in 43,200 optical sections. The video file is compressed. An hour of uncompressed embryo video requires 8 gigabytes of hard disk space. In one embodiment, a compression operation based on the Discrete Cosine Transform (DCI) is employed that achieves 20:1 compression. The DCT frequency filters are fine-tuned to maximize the DIC images.

Outlining Cell Perimeters and Nuclei for Reconstructions

FIG. 21A illustrates a "direct image" reconstruction, according to one embodiment of the invention. FIG. 21B illustrates a faceted image reconstruction of cell surfaces alone, according to an embodiment of the invention. FIG. 21C illustrates a faceted image reconstruction of cell surfaces with nontransparent nuclei, according to an embodiment of the invention. FIG. 21D illustrates a nontransparent reconstruction of nuclei alone, according to an embodiment of the invention. In one embodiment, the system 100 produces the four kinds of embryo reconstruction illustrated in FIGS. 21A–21D.

In an embodiment, these reconstructions can be generated every 5 seconds during embryogenesis, can be made into a continuous movie, and can be viewed from any angle. The latter three reconstructions illustrated in FIGS. 21C–21D depend upon outlining the in-focus perimeter of every cell and nucleus in each optical section.

Figure 22A:
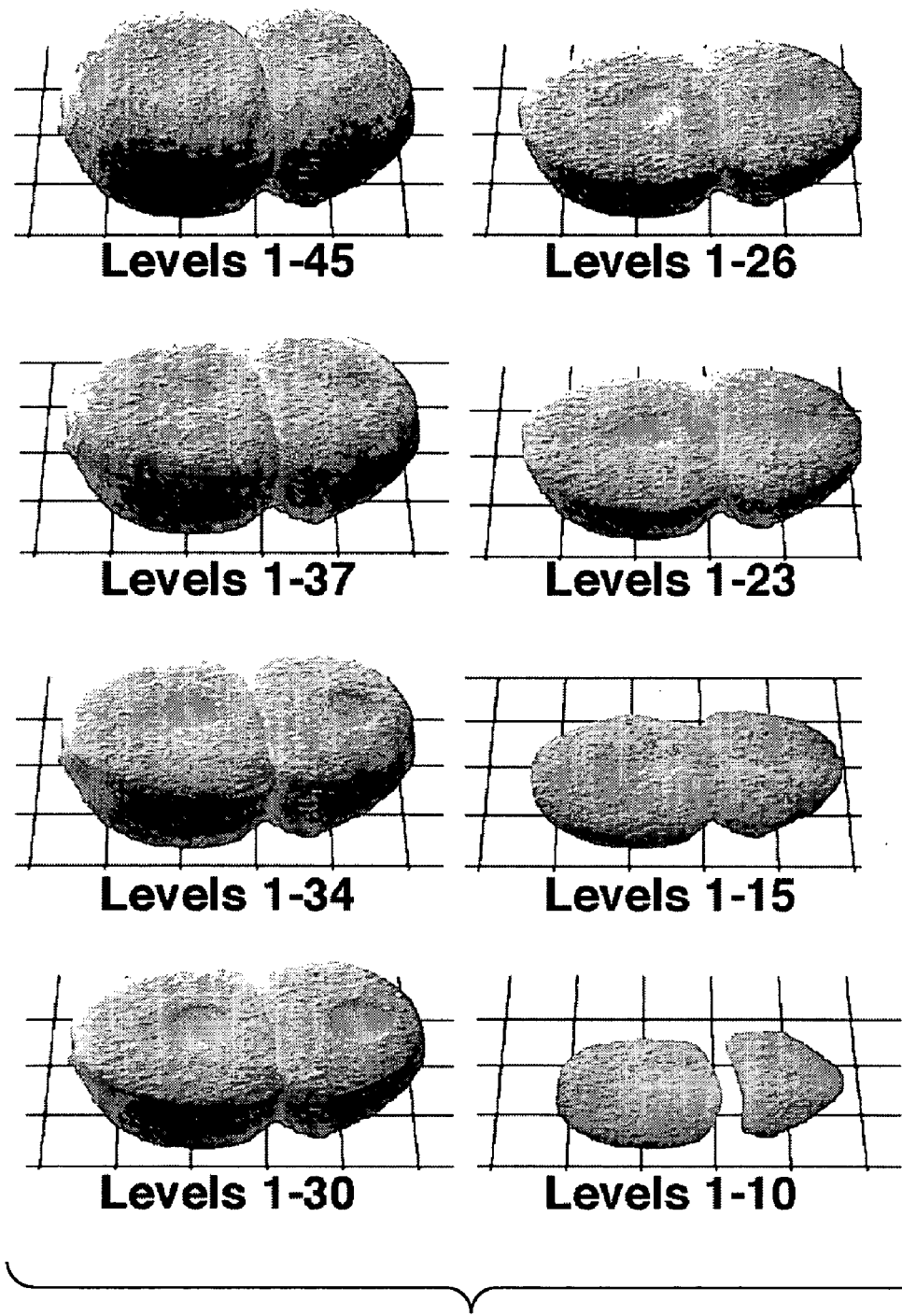
FIGS. 22A–22B show the optical sections being stacked from bottom to top, wherein sections hide the section below, according to one embodiment of the invention.
Figure 22B:
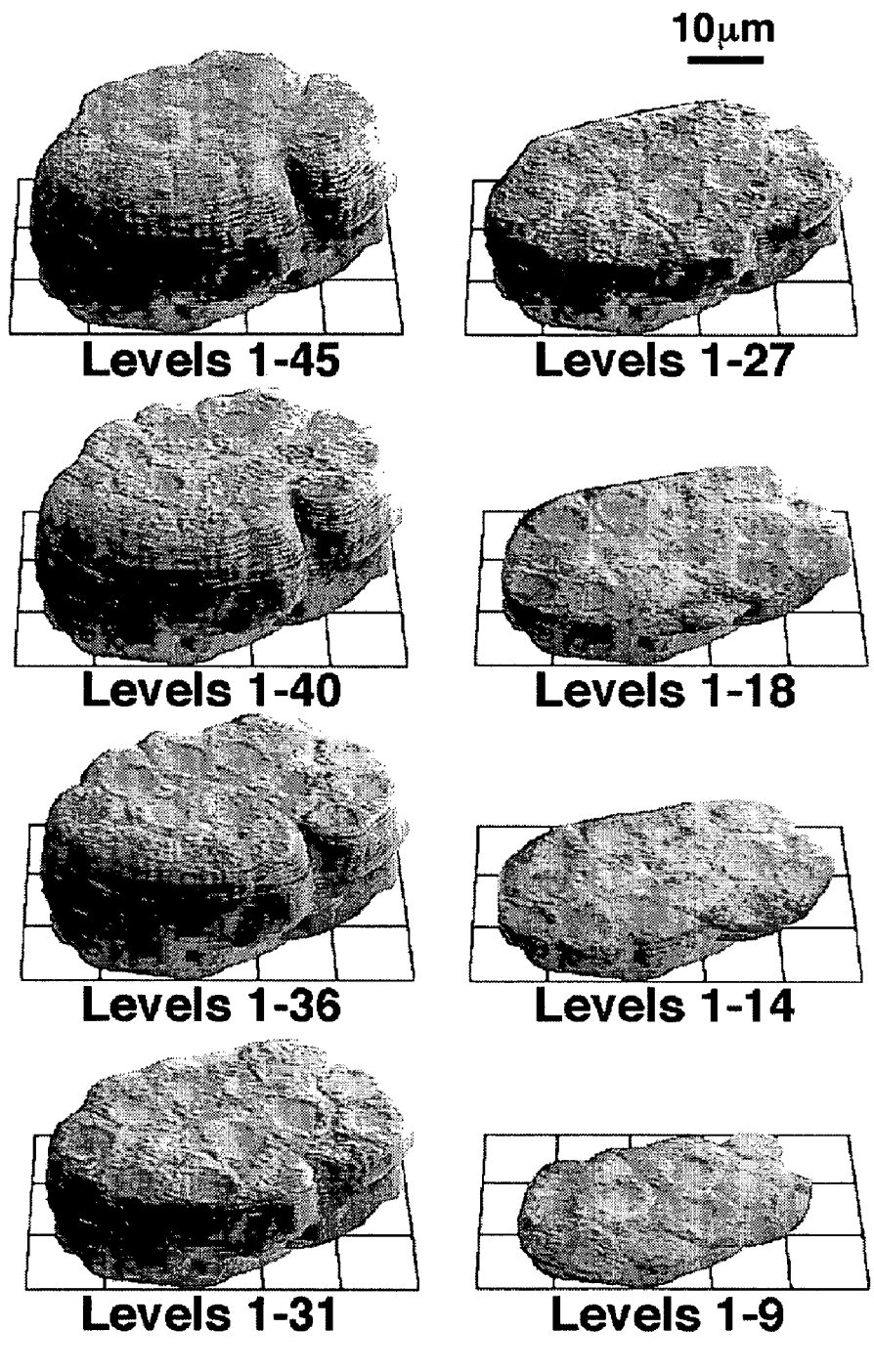

As described above, edge detection operations are employed to locate the edges of the objects in the images, the result of this operation is a stack of approximately 60 2D perimeters filled with the original DIC images. The optical sections are stacked from bottom to top, each section hiding the section below. To help illustrate, FIGS. 22A–22B show the optical sections being stacked from bottom to top, wherein sections hide the section below, according to one embodiment of the invention.

The regions separating the boundaries where the upper slice lies upon a lower slice are jagged (i.e., "aliased"). In one embodiment, to improve image quality, rays are traced form the virtual eye-position to the stacked image at a 4:1 sub-pixel density with bi-cubic interpolation providing extra pixel density, a form of "anti-aliasing". Since ray tracing may be time consuming, logic is employed for tracing in reverse, from the image to the eye, using large (e.g., 50 megabytes of memory) lookup tables to reduce the number computations for each projection. Accordingly, once the complete set of sections is stacked (as illustrated in FIGS. 22A–22B), the set can be accessed at any depth, and movies can be made of the changes over time at any particular depth or at any angle in the embryo.

Figure 23:
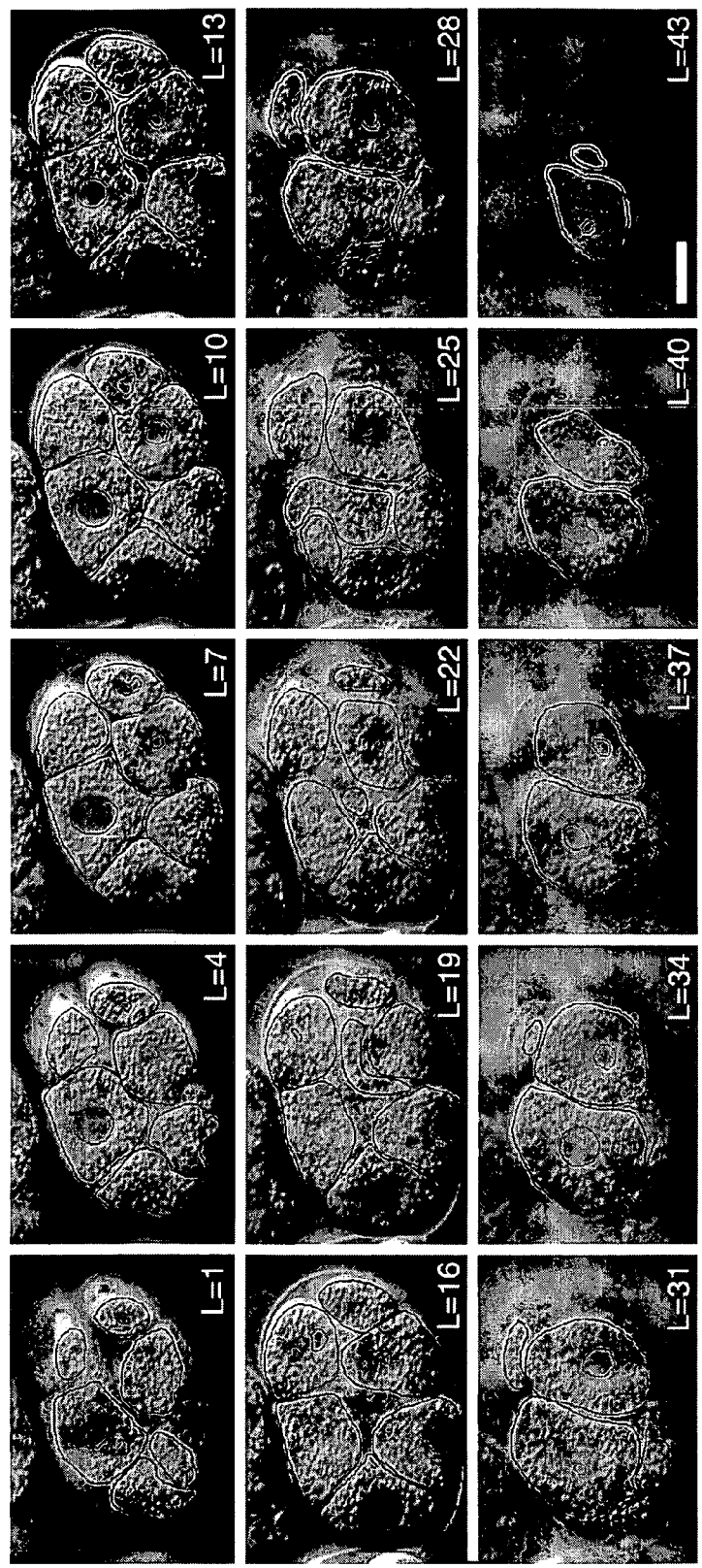
FIG. 23 illustrates traces of an eight cell embryo at representative positions through the Z-axis series, according to an embodiment of the invention.

As described above, in one embodiment, the stacked perimeters of the cell and nucleus are converted to faceted 3D models. To generate a faceted model of the embryo at each time point, the in-focus perimeter of every cell and nucleus is outlined in each optical section. FIG. 23 illustrates traces of an eight cell embryo at representative positions through the Z-axis series, according to an embodiment of the invention. As illustrated, cell perimeters are blue and nuclear perimeters red. Lines are drawn at the interface between in focus and out of focus regions. "Shadows" at these interfaces caused by out of focus steep edges help define the interfaces. Interfaces of cells do not always abut adjacent cells, suggesting that spaces exist between cells, especially near the center of the embryo (e.g., L=19 in FIG. 23). Comparisons of the original images, image-processed optical sections and outlined images suggest that the larger central spaces are extracellular cavities, which the narrow spaces between cells are artifactual. Perimeters of nuclei are identified similarly as the outer edge of the in-focus portion of the image.

Generating Faceted 3D Reconstructions of Cells and Nuclei

As described above, the continuous perimeter encompassing each cell image in an optical section is converted to a β-spline representation. The β-spline representations are then stacked, generating a 3D contour map. One triangulated net is then projected over the top (top down) of the contours and a second net is projected in the reverse direction (bottom up) over the bottom of the contours. The nets are trimmed at their junctions and joined by intersecting triangular sections in intervening spaces. In an embodiment, the system 100 reconstructs each cell and nucleus in the developing embryo. The resulting facets of each reconstruction are individually stored in a facet database file. In one embodiment, up to 10,000 facets can be stored for each reconstruction. Information about each cell and nucleus is stored in a resource fork of the facet file. This information includes parent, progeny, view angle, color code, etc. Once the faceted image of each cell in an embryo at a specific time point is generated, the cell reconstructions can be merged to generate the image in FIG. 21B. Once the faceted image of each nucleus in an embryo at a specific time point is generated, they can be merged with the cell surface images to generate the image in FIG. 21C.

Reconstructing the C. elegans Embryo from the Two to Twenty Eight Cell Stage

Figure 24:
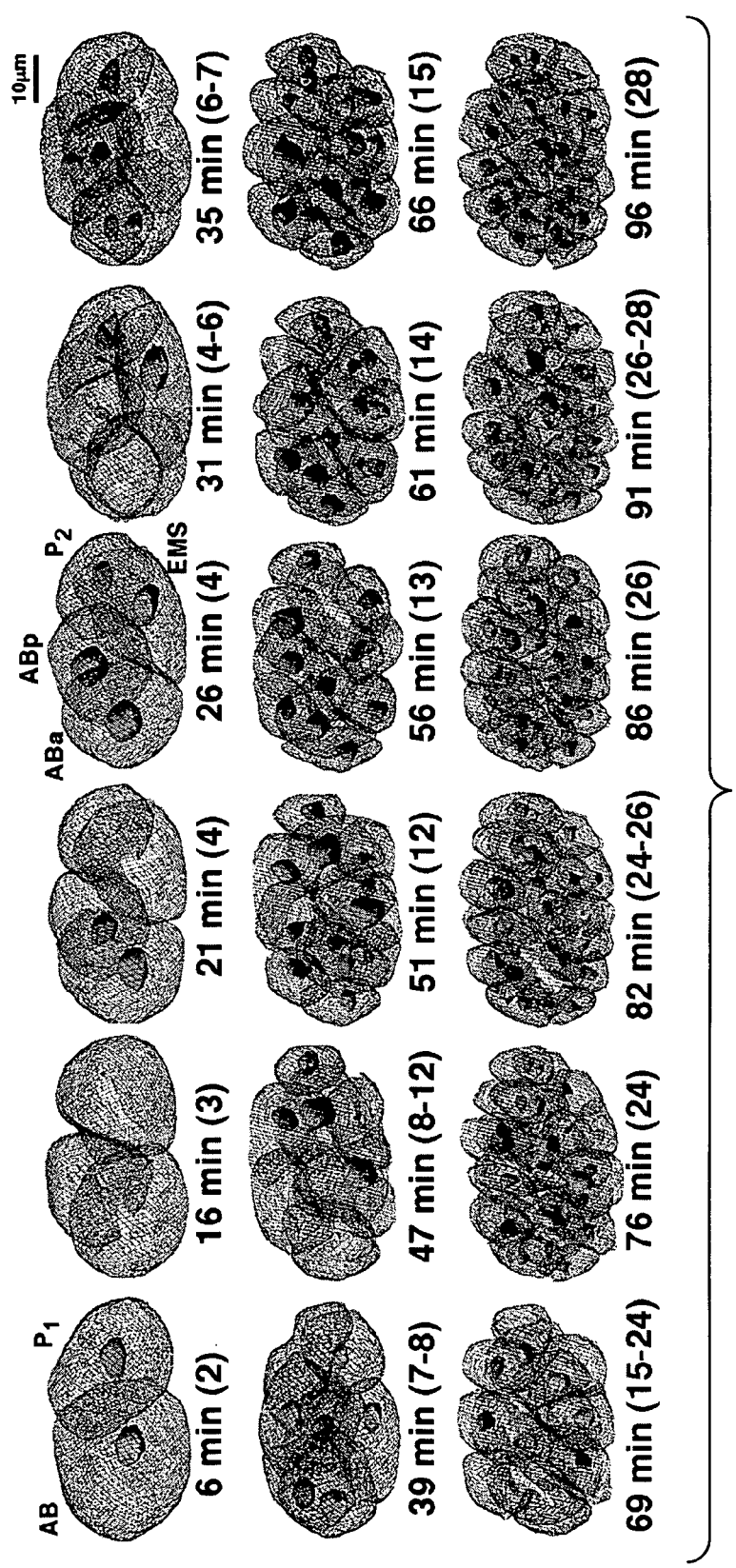
FIG. 24 illustrates reconstructions from the two to 28 cell stage at one viewing angle, according to one embodiment of the invention.

FIG. 24 illustrates reconstructions from the two to 28 cell stage at one viewing angle, according to one embodiment of the invention. In particular, FIG. 24 illustrates reconstructions at approximately 5 minute intervals from the two to 28 cell stage at one viewing angle. The faceted surfaces of cells are presented as transparent blue caged images, the faceted surfaces of nuclei are presented as nontransparent red images, and the faceted surfaces of the regions containing mitotic apparatuses are presented as nontransparent yellow images. This reconstruction format provides one with a view of cell shape changes, cell-cell relationships, and asynchronous and synchronous nuclear divisions. Synchronous division of ABa and ABp, and subsequent synchrony of division by cells in the AB founder cell lineage may be identified. Asynchronous division between AB and $P_1$ is shown between 6 and 16 minutes. Additional asynchronous and asynchronous divisions are shown through the 28 cell stage. Because one can rotate each reconstruction, one can also map the exact plane of mitosis, and any changes in cell position or cell-cell contacts at each stage. One can also select any period and generate reconstructions at far shorter time intervals.

Figure 25A:
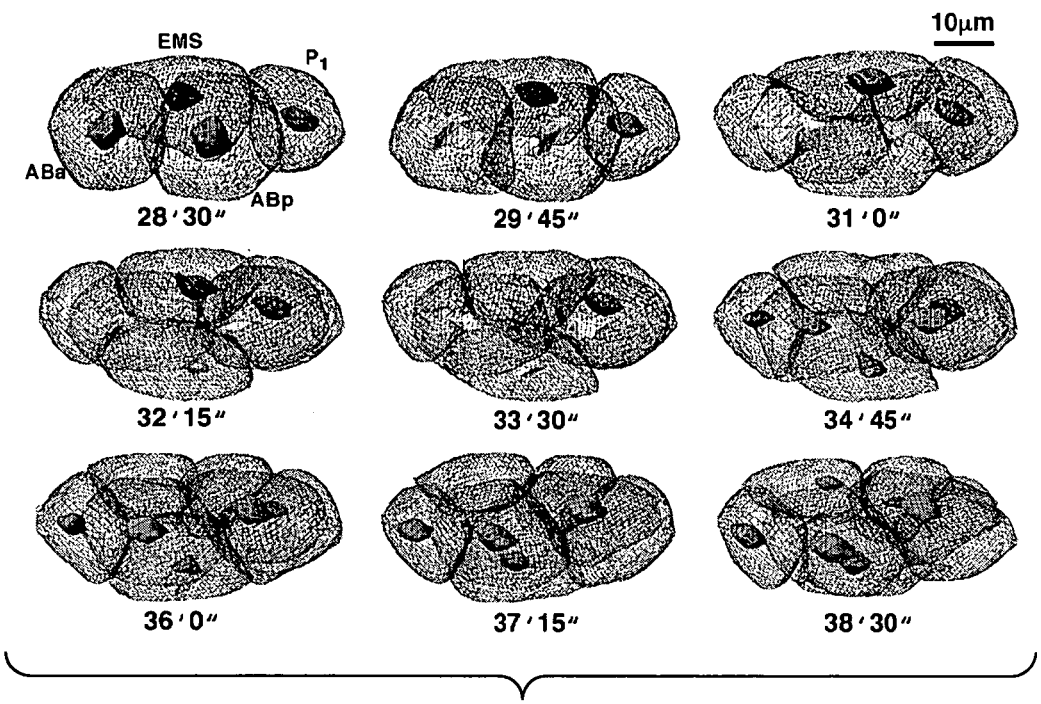
FIGS. 25A–25B illustrate reconstructions at 1 minute and 15 second time intervals between the four and eight cell stage, according to one embodiment of the invention.
Figure 25B:
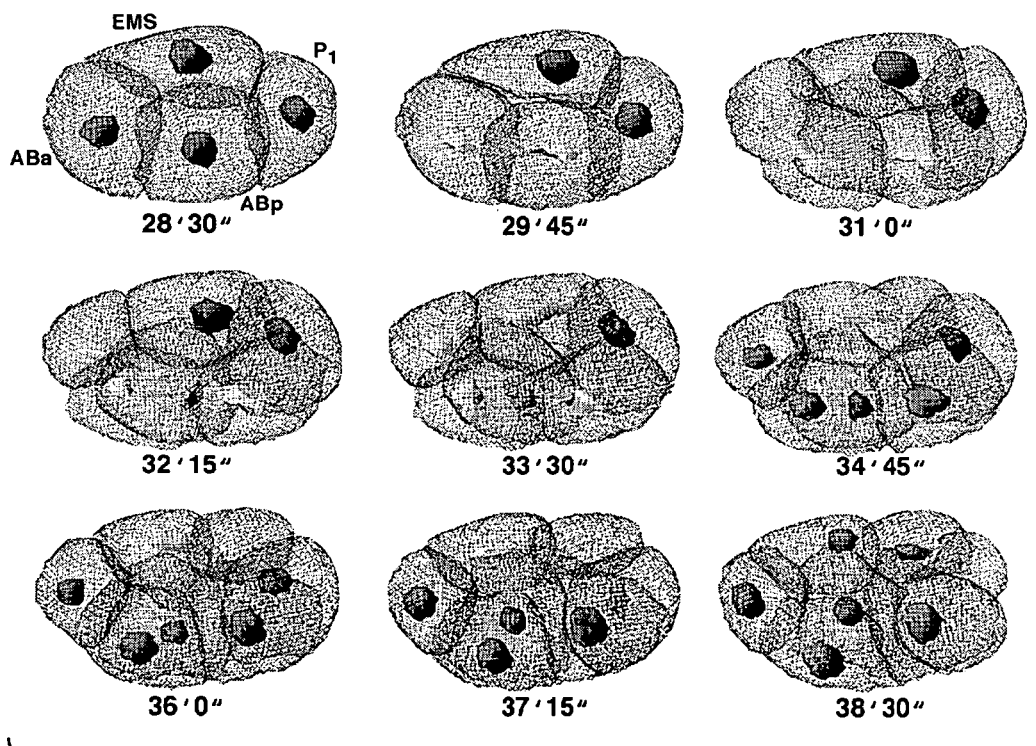

FIGS. 25A–25B illustrate reconstructions at 1 minute and 15 second time intervals between the four and eight cell stage, according to one embodiment of the invention. Such reconstructions can be viewed at different angles (e.g., 20° C. in FIG. 25A and 70° C. in FIG. 25B), and provide greater spatial and temporal resolution for the identification of rapid events. In FIG. 25A, the angle of the mitotic apparatus of ABa and ABp are identical at 29'45". However, the angle of that of ABa changes in relation to the angle of that of ABp between 29'45" and 31'0". In addition, a movie can be generated at any angle in which spatial and temporal differences can be more easily identified. As will be described below, a time period of interest can be windowed such that motility parameters for individual cells or nuclei are quantitated.

Reconstructing Nuclei Only

Figure 26A:
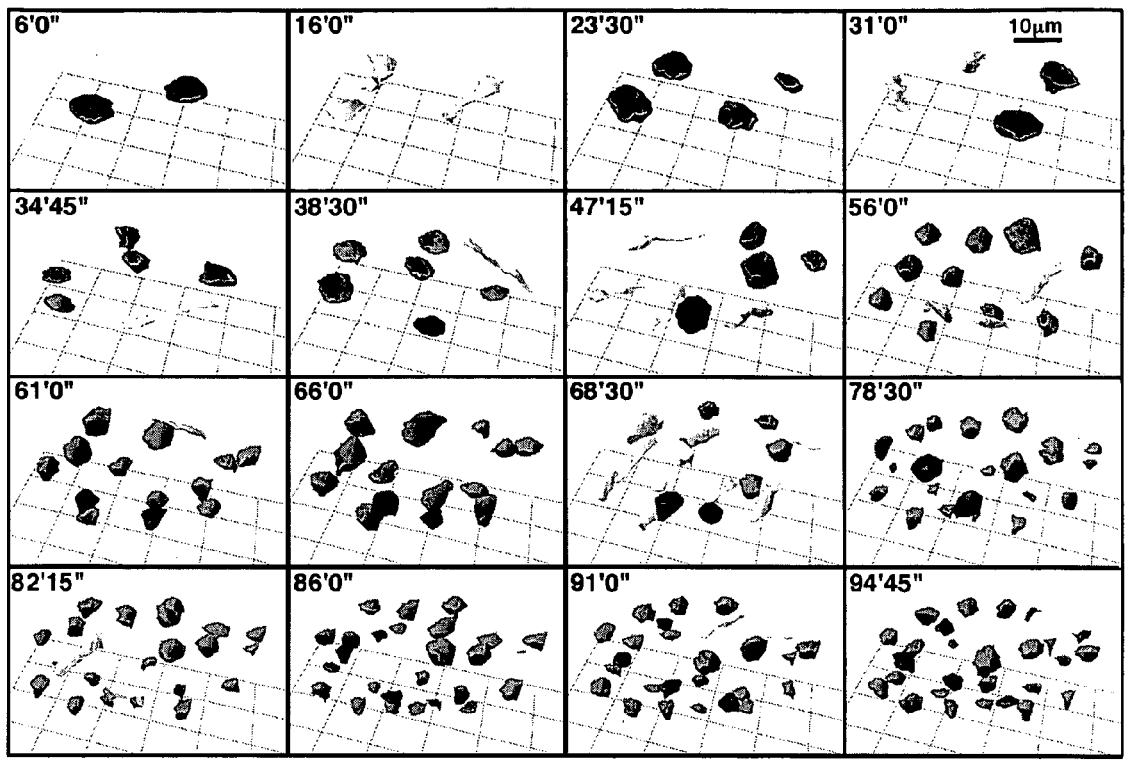
FIGS. 26A–26B illustrate reconstruction of nuclei without the cell surfaces, according to one embodiment of the invention.
Figure 26B:
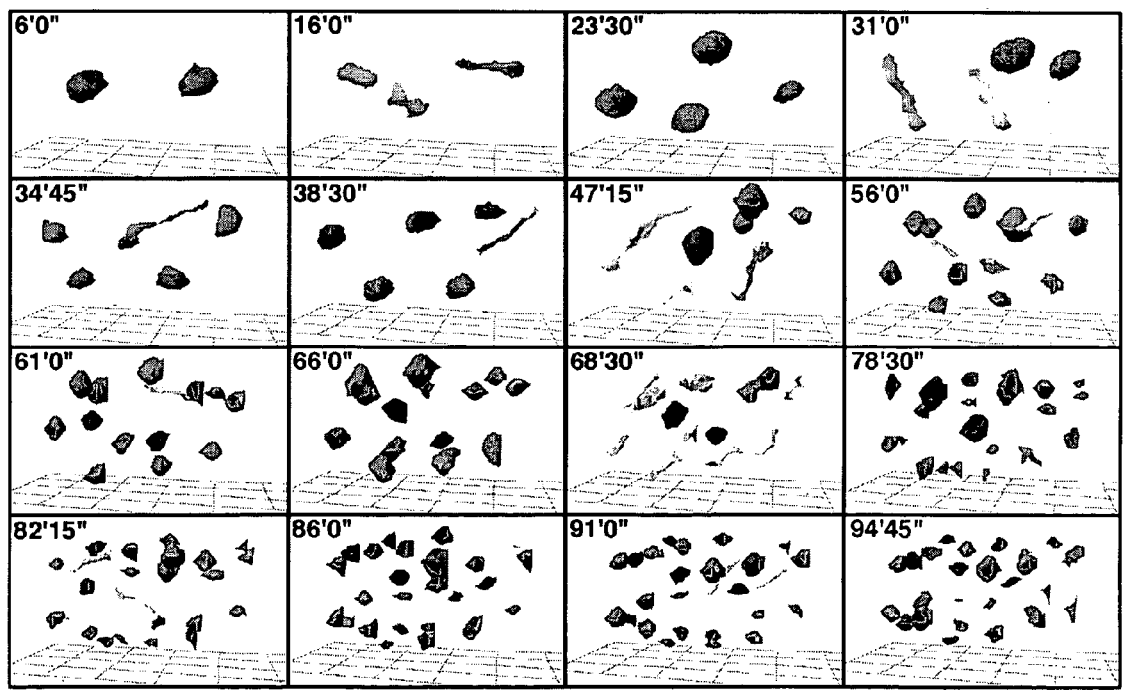

In one embodiment, the cell surfaces may be removed, leaving in place the cell nuclei. FIGS. 26A–26B illustrate reconstruction of nuclei without the cell surfaces, according to one embodiment of the invention. This provides a less obstructed view of the temporal and spatial dynamics of nuclear division, and changes in nuclear shape and volume. It should be noted that because of the long interval time between reconstructions, many of the mitoses were missed in the sequence in FIG. 24, and because of the very short time intervals in FIGS. 25A–25B, only one set of nuclear divisions is described. In FIGS. 26A–26B, times were selected that included most mitoses between the 2 and 28 cell stage. In addition, the MS cell nucleus is color-coded green at 38'30" (the 7 cell stage), and progeny of the MS cell nucleus color-coded green except at mitoses (yellow) through the 28 cell stage. This can be performed for any nucleus at any time during embryogenesis. Alternatively, one can subtract all nuclei other than the nuclear lineage of interest (data not shown).

Reconstructing a Single Cell Lineage

Figure 27A:
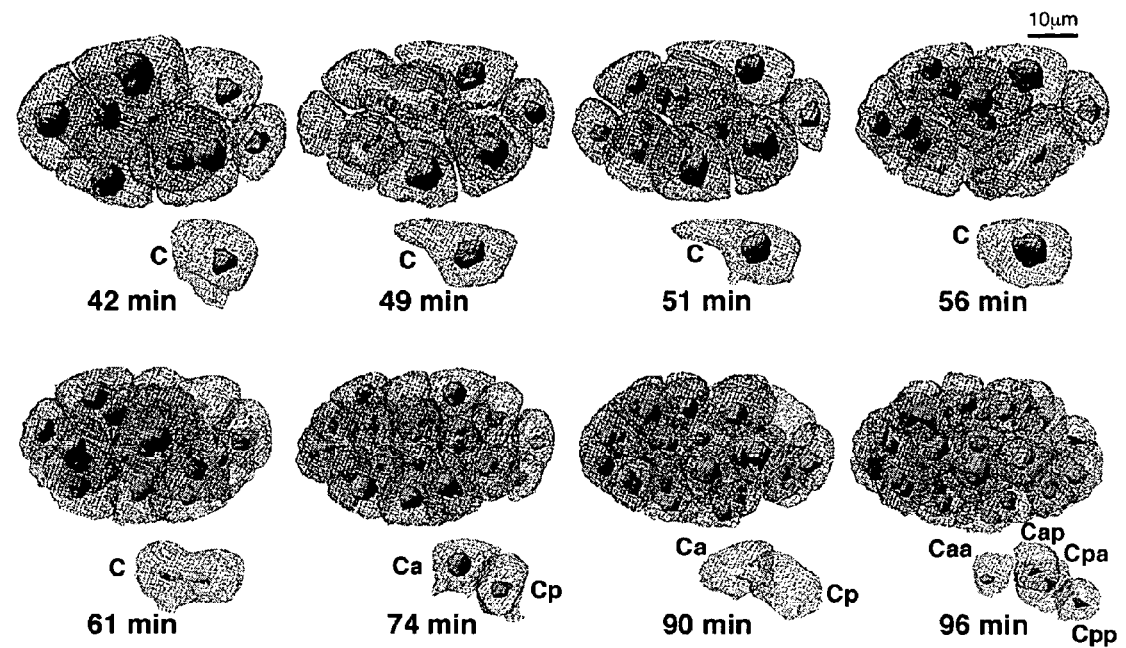
FIGS. 27A–27B illustrate reconstructions of a complete embryo, including cell surfaces and nuclei, according to one embodiment of the invention.
Figure 27B:
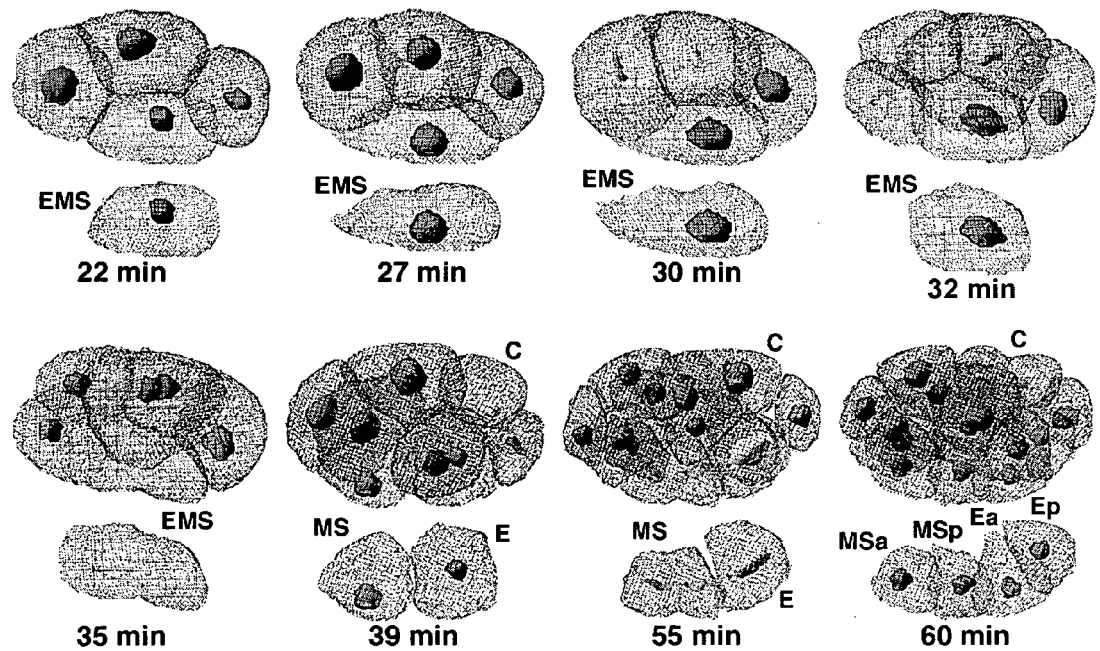

Because every cell and every nucleus is individually reconstructed in space and time, embodiments of the invention provides the capability of isolating and following an individual cell lineage. Such isolation can reveal specific changes in cell morphology that may play fundamental roles in embryogenesis. FIGS. 27A–27B illustrate reconstructions of a complete embryo, including cell surfaces and nuclei, according to one embodiment of the invention.

In FIG. 27A, reconstructions of the complete embryo, including cell surfaces and nuclei, are presented in which the C cell lineage is color-coded green and hence distinguished from other cells color-coded blue from the 8 cell stage (42 min) to 28 cell stage (96 min). Reconstructions demonstrate that the C cell at the 8 cell stage extended an arm around the ABp1 cell while the latter was dividing. This extension was retracted between 51 and 56 min, 5 min prior to the first C cell division. The C cell progeny Ca and Cp then divided synchronously and symmetrically at 90 minutes. In a second embryo analyzed in the same manner, the same C cell extension was observed at approximately 49 to 51 minutes (data not shown). To be sure that this was not a cell type-specific artifact due to the compression caused by the coverslip, C cell morphology in an embryo mounted in a chamber with a spacer that prevented compression of the embryo by the coverslip was monitored, wherein similar C cell extension was observed (data not shown).

In FIG. 27B, a second example is presented of a cell that undergoes a shape change, in this case the EMS cell. The EMS cell formed an extension between 22 and 30 minutes, then retracted the extension between 30 and 32 minutes. The EMS cell then divided into the MS and E cells 3 minutes later. The MS and E cells then divided synchronously and symmetrically at 55 minutes. The extension of the EMS cell was observed in a noncompressed embryo as well (data not shown). The ability to isolate and follow the changes in a cell's morphology and associated nuclear division sometimes unmasks behavior camouflaged by neighboring cells.

Reconstructing Gastrulation

Figure 28A:
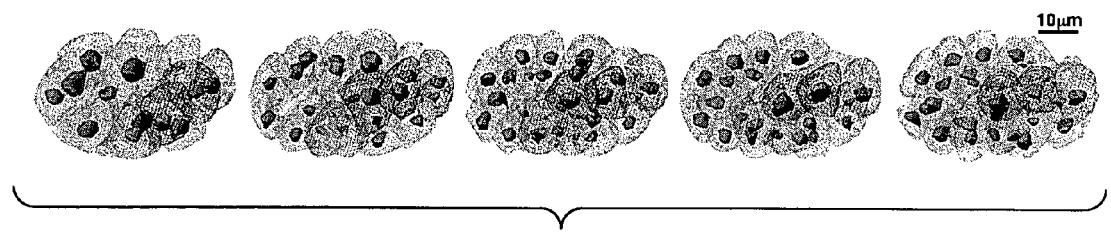
FIGS. 28A–28D illustrate isolation of group cells, according to one embodiment of the invention.
Figure 28B:
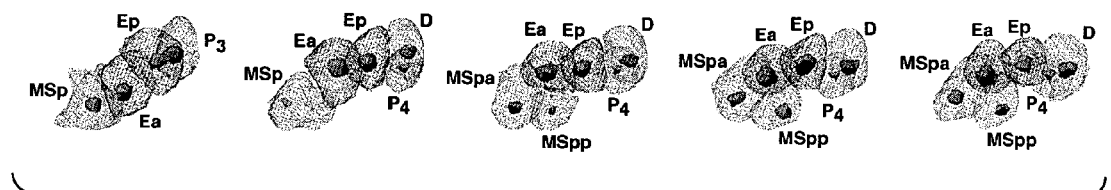
Figure 28C:
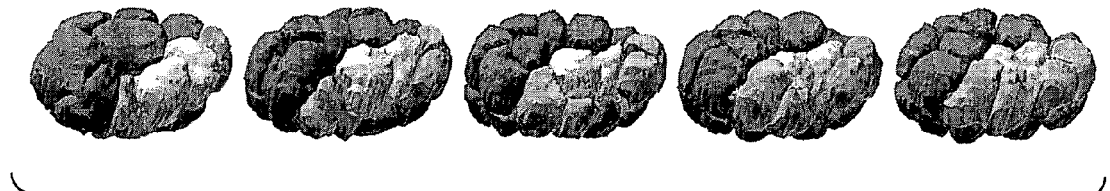
Figure 28D:
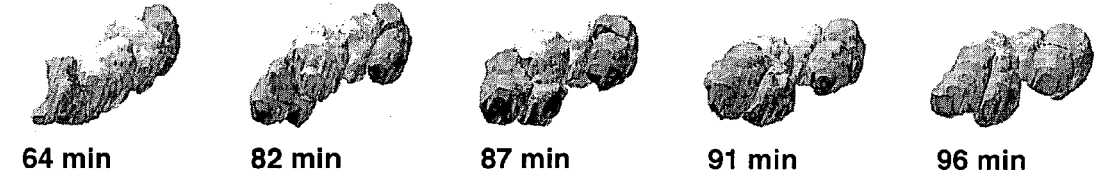

Because cells are individually digitized, embodiments of the invention provide the capability of isolating and following the interactions between any selected groups of cells. FIGS. 28A–28D illustrate isolation of group cells, according to one embodiment of the invention. FIG. 28A illustrates that the cells that play a major role in the invagination process during gastrulation are color-coded blue and green in transparent faceted reconstructions that include nuclei. It is clear that reorganization of these cells occurs between 64 and 96 minutes but it is difficult to resolve these changes in the entire reconstruction of transparent faceted cells, even with color-coding. In FIG. 28B, the cells involved in this reorganization (progeny of MSp, E and $P_3$) have been isolated and monitored over the same time period. This presentation not only allows one to follow the ingression of the blue cells (Ea and Ep) and the enveloping behavior of the green cells (MSp, P3), but also the nuclear and cell divisions of MSp and $P_3$ accompanying these embryogenic movements. Because the behavior of a subgroup of transparent faceted cell images can sometimes be difficult to interpret in space, one can generate nontransparent images of the whole embryo in which the cells of interest are color-coded, as illustrated in FIG. 28C or nontransparent images of the isolated cells of interest, as shown in FIG. 28D. These latter reconstructions provide a very vivid display of gastrulation.

Quantitating the Embryonic, Cellular and Nuclear Changes During Embryogenesis

Because each cell and nucleus is individually reconstructed, then reassembled, each cell and nucleus can be individually motion-analyzed, using embodiments of the invention to compute roughly 100 individual parameters, based on centroid dynamics and changes in contour. Additional parameters that are specific to the changes accompanying embryogenesis, most notably those that assess multicellular interactions, and optical and temporal relationships can be incorporated into embodiments of the invention.

FIGS. 29A–29F illustrate time plots of motility and morphology parameters for individual cells and progeny, according to one embodiment of the invention. In particular, FIGS. 29A–29F, embodiments of the invention computed the volumes of the AB, C, $P_3$, E and MS cell lineages as a function of development time.

Figure 29A:
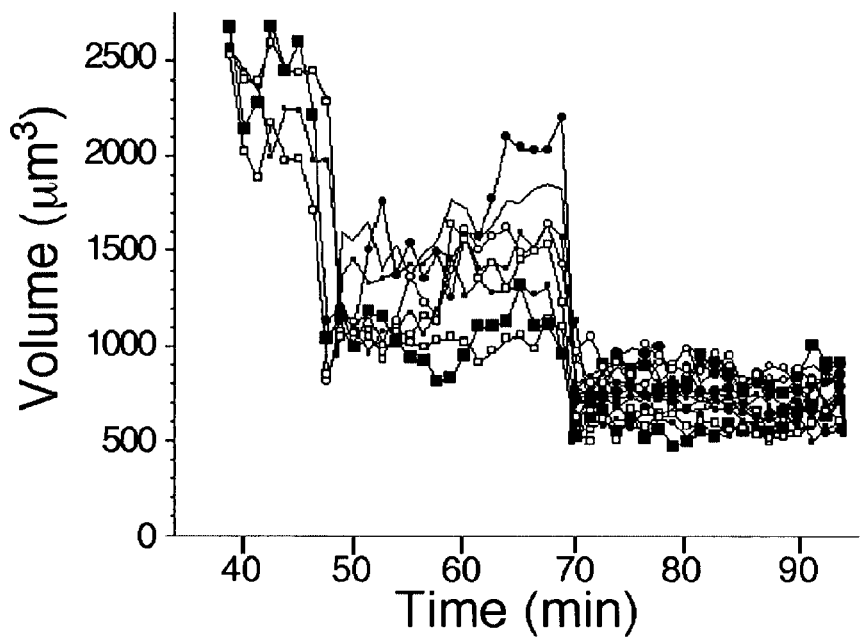
FIGS. 29A–29F illustrate time plots of motility and morphology parameters for individual cells and progeny, according to one embodiment of the invention.

In FIG. 29A, the volumes of the four AB progeny, beginning at 33 minutes after the first cleavage, are monitored through two subsequent divisions. It is clear from these plots that the four AB cells divided synchronously at 43 minutes and that the eight progeny cells then divided synchronously again at 65 minutes. Second, the volumes of the original four AB cells were distributed between 2300 and 2900 $\mu m^3$, with a mean (± standard deviation) of 2525±259 $\mu m^3$. After the first division, the volumes ranged between 1050 and 1500 $\mu m^3$, with a mean of 1250±160 $\mu m^3$, approximately half that of the mean volume prior to division. After the second division, the volumes of the sixteen progeny cells ranged between 550 and 950 $\mu m^3$, with a mean of 780±136 $\mu m^3$, a bit more than half that of the mean volume prior to division. Therefore, these two AB cell divisions, were synchronous and symmetric.

Figure 29B:
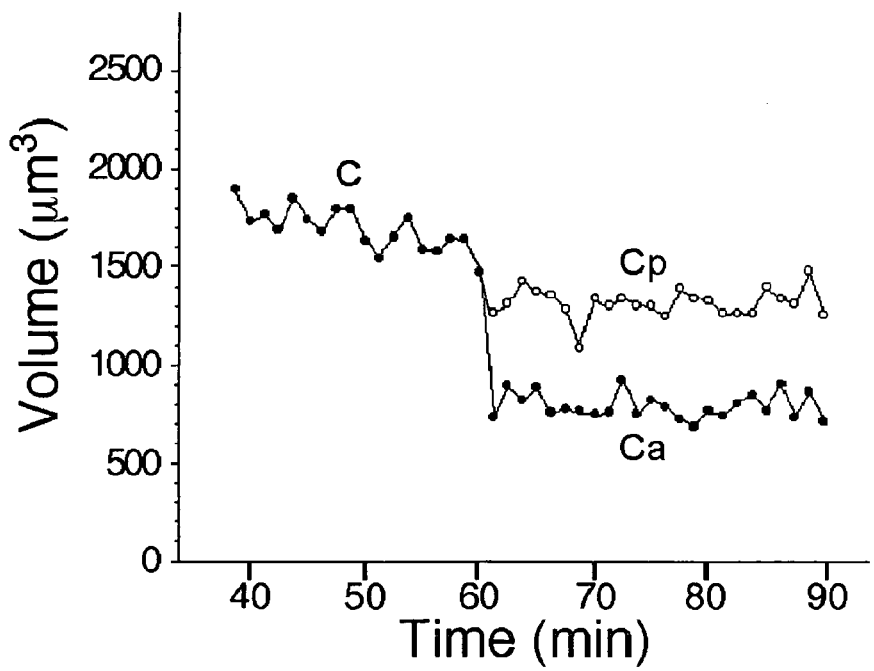

In FIG. 29B, the volumes of the C cell beginning at 33 min are monitored through one cell division. It is clear from the plots that the C cell divides at 55 min, 12 min after synchronous division of the four AB cells and 10 min prior to synchronous division of the eight progeny AB cells, providing reasonably concise measures of the different times of cleavage. More interestingly, unlike the AB cells, C cell cleavage is asymmetric. The volumes of progeny cells were 1300 $\mu m^3$ and 700 $\mu m^3$, respectively. The constancy of the volume measurements after C cell division suggests that the volume difference is real. This difference was not previously noted in the literature. The summed volume of the daughter cells (700 $\mu m^3$ and 1300 $\mu m^3$) was 2000 $\mu m^3$, within 10% of mother cell volume (1800 $\mu m^3$).

Figure 29C:
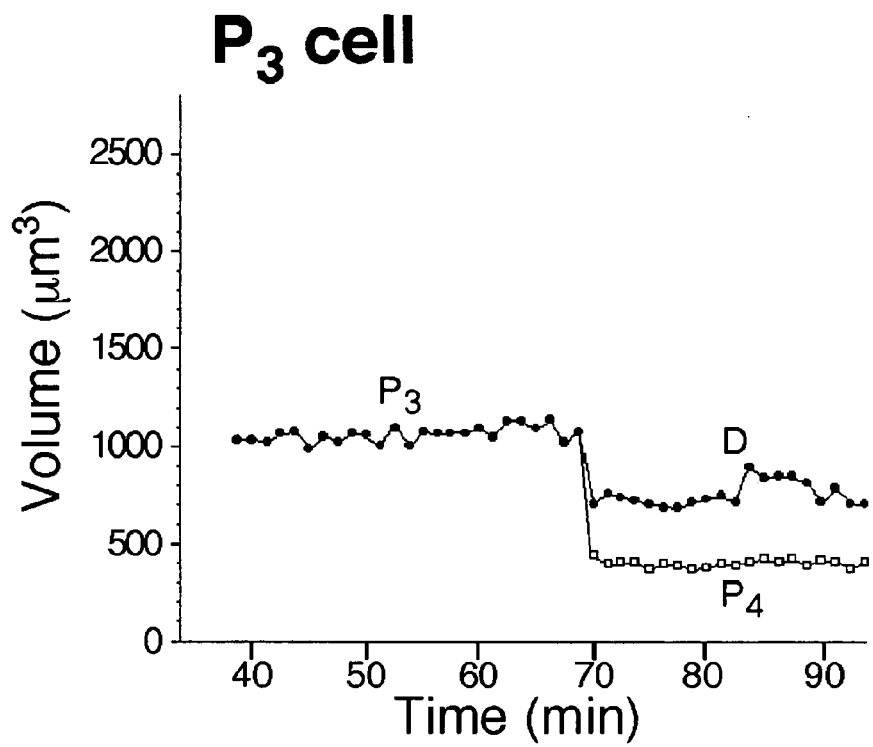

In FIG. 29C, the volumes of the P3 cell and progeny are monitored between 34 and 89 minutes. Cleavage was asymmetric resulting in two daughter cells with volumes of 600 and 400 $\mu m^3$. The summed volume of the P3 daughter cells (1000 $\mu m^3$) was within 10% of that of the mother cell (910 $\mu m^3$).

Figure 29D:
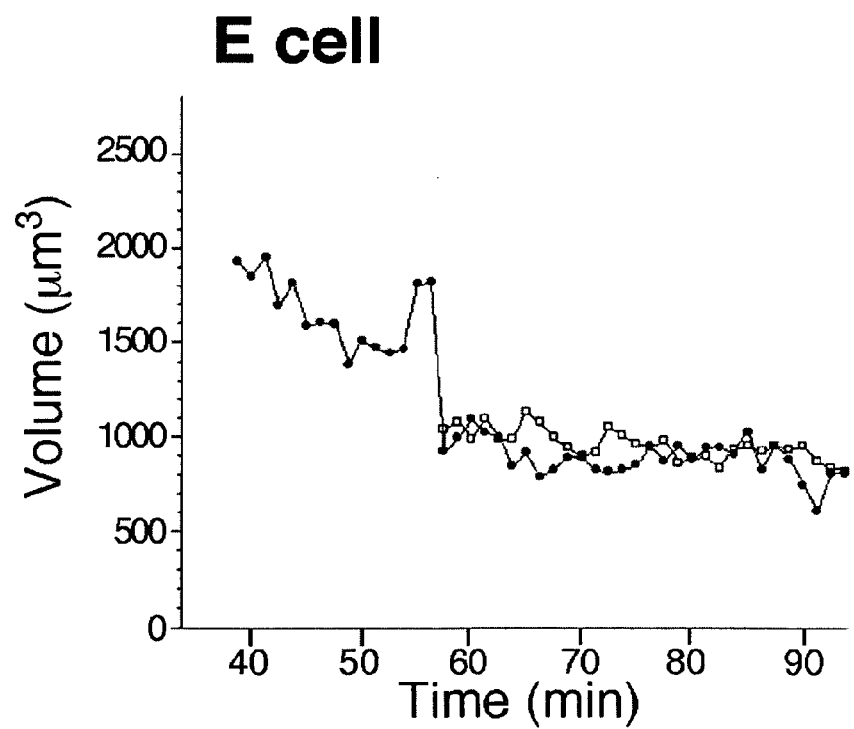
Figure 29E:
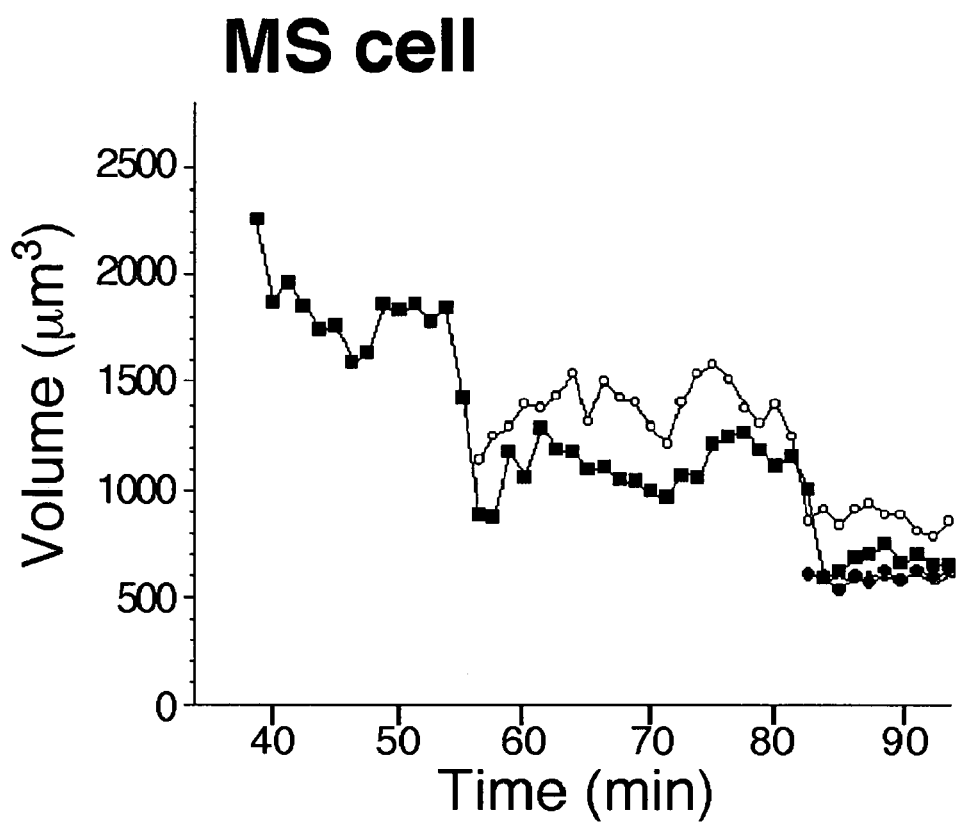

In FIG. 29D, the volume of the E cell was monitored through one division. The E cell (1700 $\mu m^3$) divided at 52 min and resulted in daughter cells of equal volume (900 $\mu m^3$). Similarly in FIG. 29E, the volume of the MS founder cell was monitored through two cell divisions. The MS cell divided symmetrically at 56 minutes and its progeny divide roughly synchronously and symmetrically at 78 minutes.

Figure 29F:
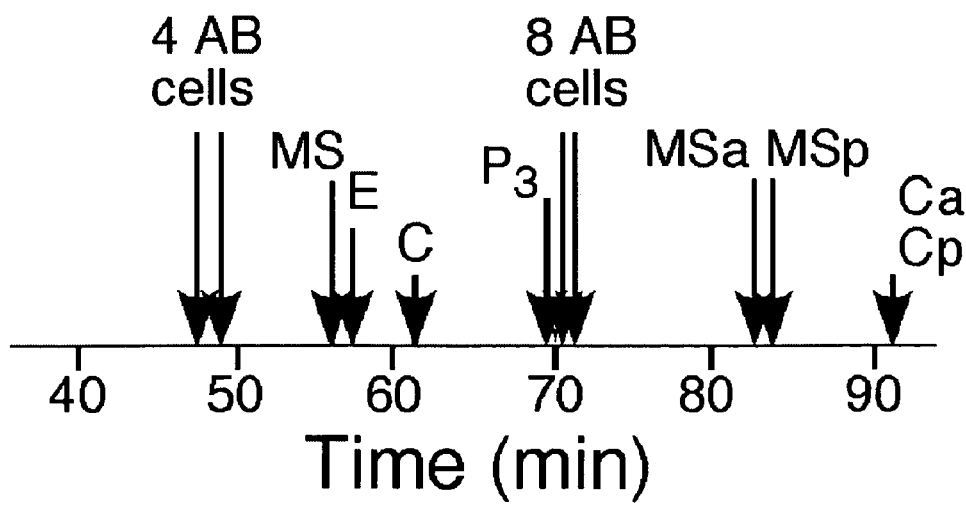

Therefore, by simply computing and plotting the volumes of cells and their progeny during embryogenesis, one obtains a record of the relative times of cell divisions (as illustrated in FIG. 29F), and assessment of the symmetry of division. Because the data is obtained from a single embryo, one can assess small differences in cleavage time of different cell types, and verify these differences by analyzing multiple embryos. Because the temporal resolution equals the minimum interval time between reconstructions (i.e., 5 sec), one can theoretically assess differences close to that time interval. For instance, although the difference between division of MS and E is approximately 2 min, one can obtain from the collected data 24 intervening reconstructions in multiple embryos, more than enough resolution to demonstrate the validity of the time difference.

Figure 30A:
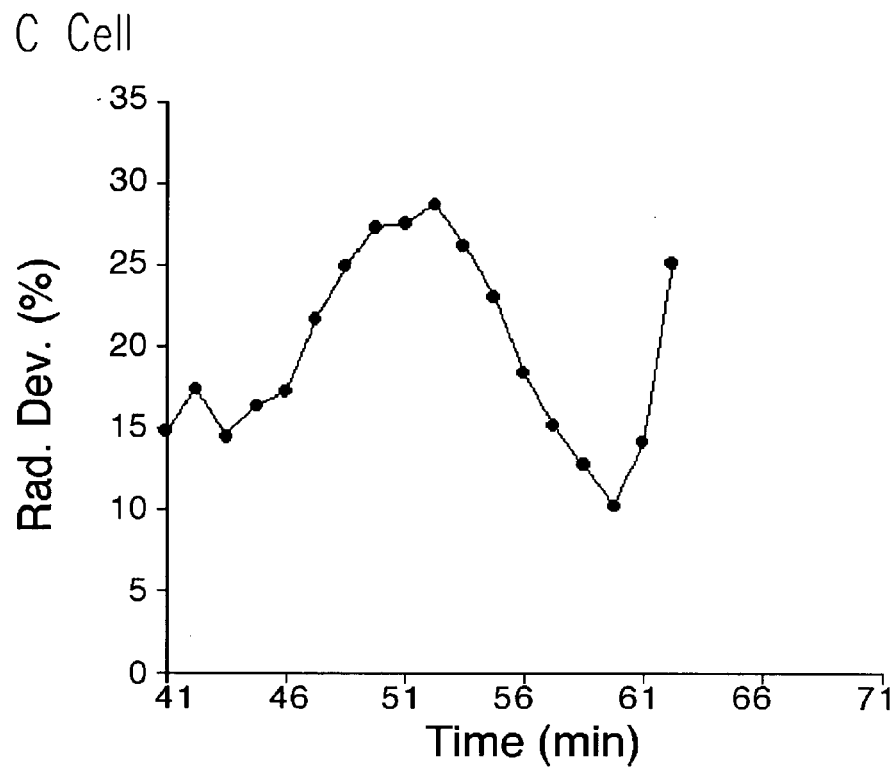
FIGS. 30A–30C illustrate time plots of morphology parameters of individual cells, according to an embodiment of the invention.
Figure 30B:
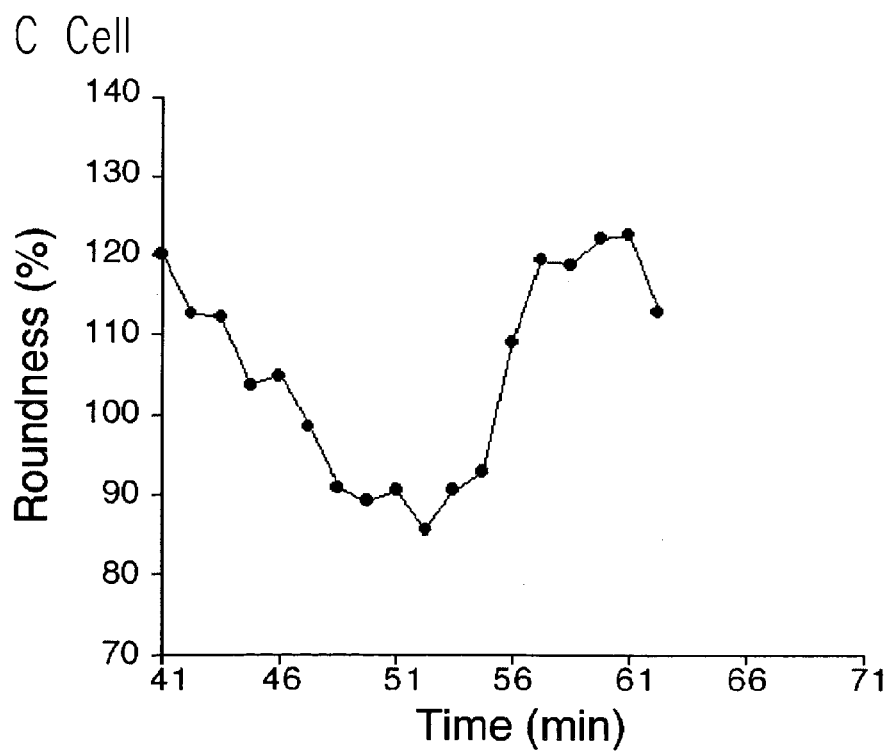
Figure 30C:
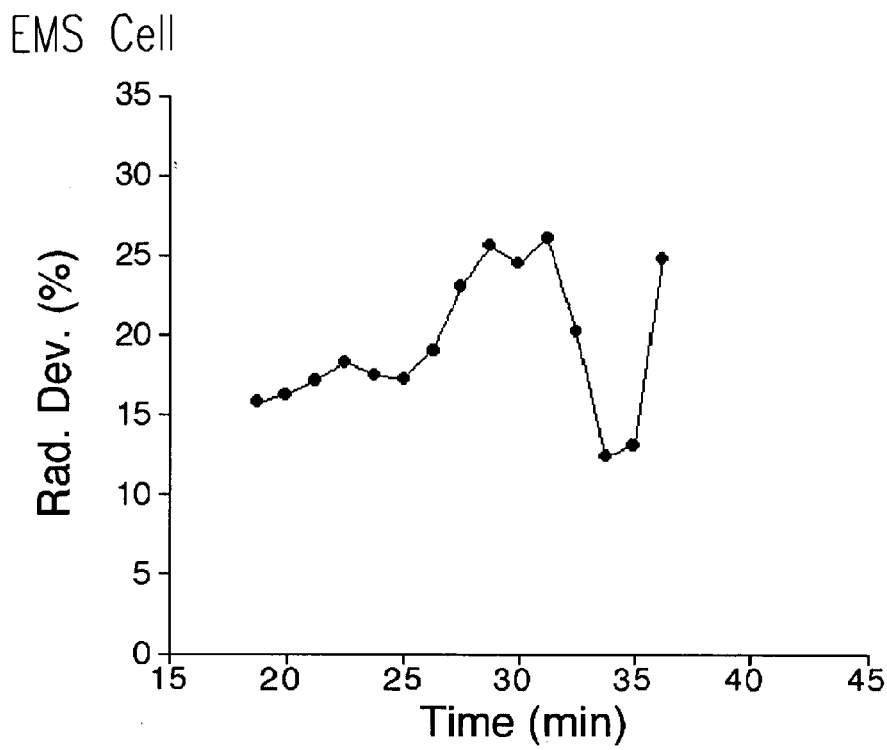
Figure 30D:
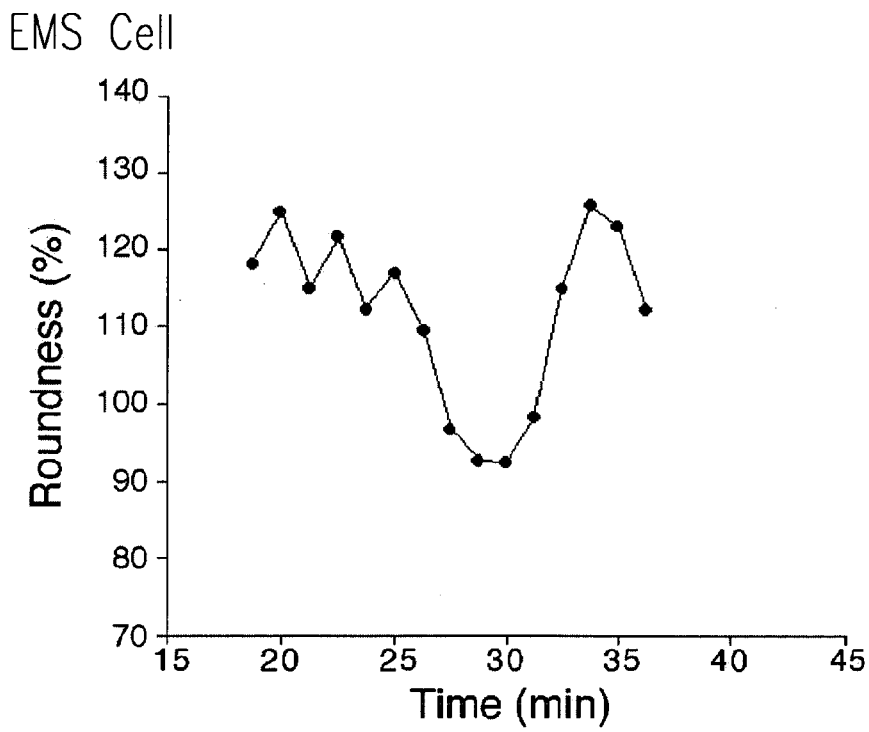
Figure 30E:
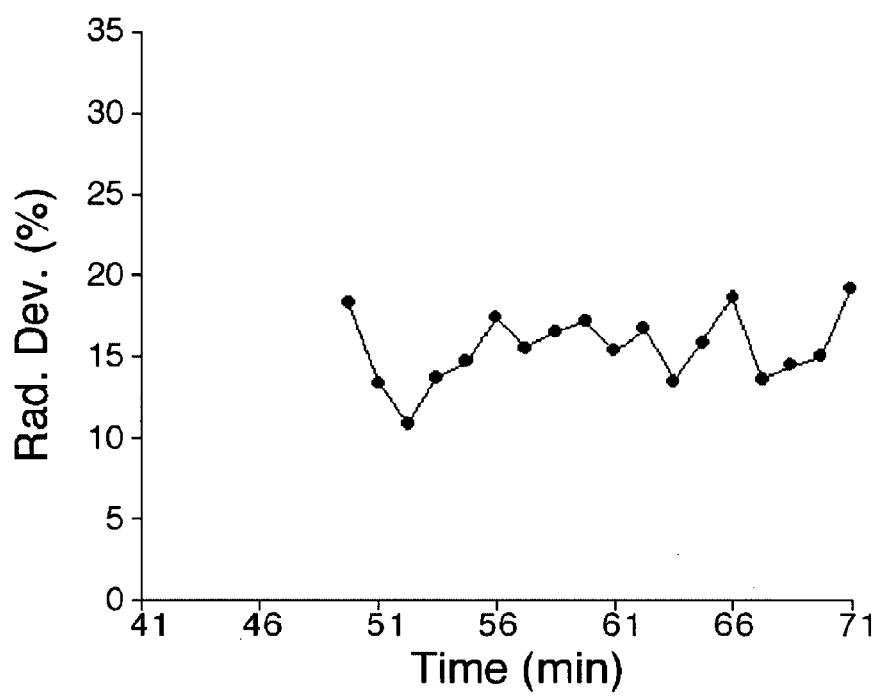
Figure 30F:
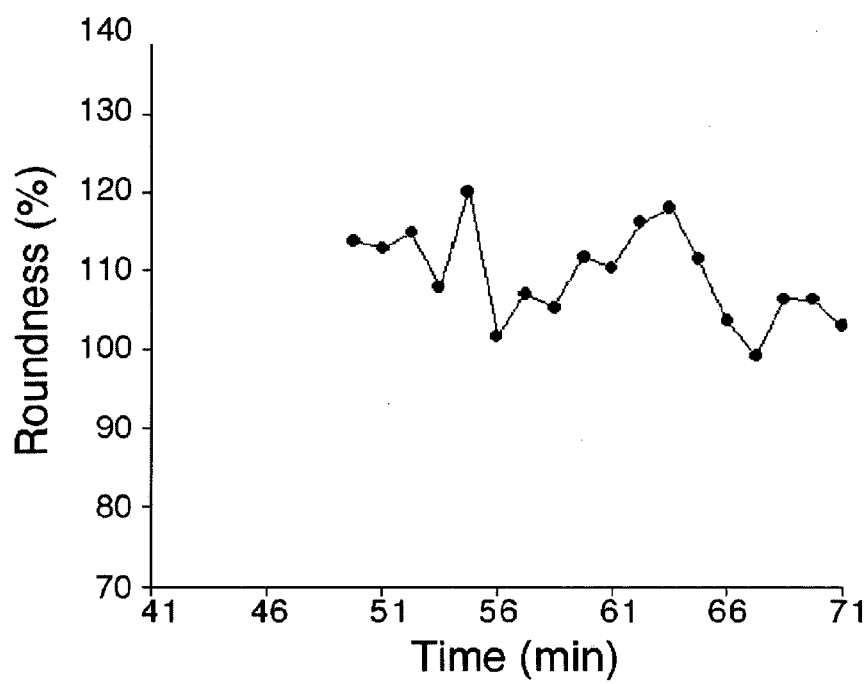

In addition to size measurements, embodiments of the invention compute a number of shape parameters including radial deviation and roundness. FIGS. 30A–30F illustrate time plots of morphology parameters of individual cells, according to an embodiment of the invention. In FIGS. 30A and 30B, both parameters have been computed over time for the C cell and EMS cell during the period each elongates and then rounds up again. Both cells displayed a peak in the plots of radial deviation and a valley in the plots of cell roundness at precisely the time they were observed to extend protrusions (FIGS. 27A and 27B, respectively). In contrast, the same parameters are plotted in FIG. 30C for an AB cell that went through no obvious morphological changes between divisions. These plots contained no consistent peaks or valleys.

Figure 31A:
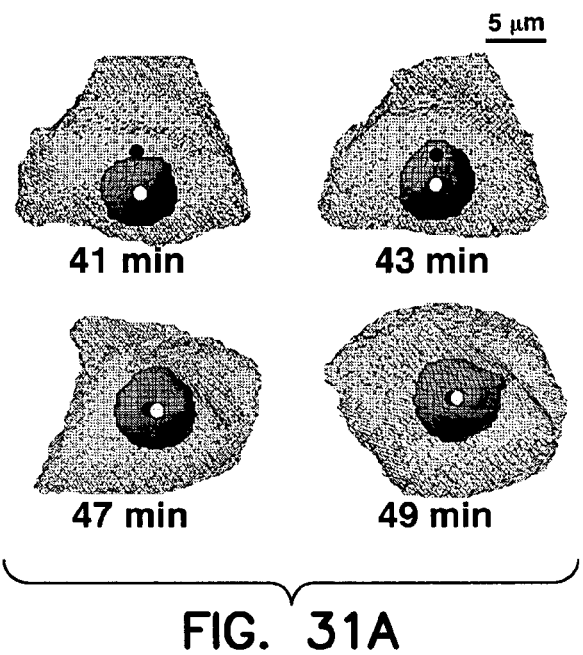
FIGS. 31A–31B illustrate measurements of nuclear localization within a cell, according to an embodiment of the invention.
Figure 31B:
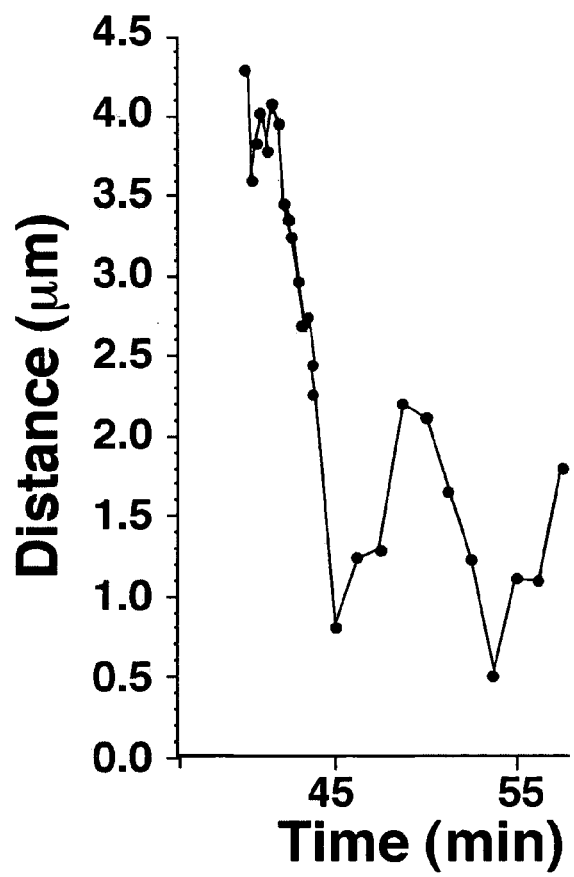

Nuclear behavior can also be quantitated in a variety of ways. For instance, one can compute all of the motility and dynamic morphology parameters for nuclei that are computed for cells. One can also monitor nuclear position within a cell over time. FIGS. 31A–31B illustrate measurements of nuclear localization within a cell, according to an embodiment of the invention. In FIG. 31A, faceted reconstructions of the MS cell with its nucleus are displayed at four time points. It was observed that shortly after the birth of the MS cell (41 minutes), its nucleus resided near the cell membrane. Over the next 8 minutes, however, it moved to the center of the cell. This was verified by plotting the centroids of cell and nucleus in reconstructions (FIG. 31A) and distance between the nuclear and cell centroids as a function of time (FIG. 31B). These results demonstrate that the nucleus initially resides close to the cell membrane after mitosis, then rapidly migrates to the cell center.

Vector Flow Plots and the Analysis of Cytoplasmic Streaming

Additionally, embodiments of the invention analyze cytoplasmic flow in 2D at any depth, using direct image reconstructions as the analyzed images. In one embodiment, a kernel of 5×5 pixels is centered over a point of interest in video frame F and the next video frame F+1. The best match, based on the mean and standard deviation of the difference in corresponding intensities is found and an arrow (the "vector flow arrow") is constructed, connecting the original point and best match point in the next frame. Each vector grows as the process is repeated. Arrows are constructed and averaged over three pixels in a period of 15 seconds using a Tukey window to remove noise. Arrows are drawn 10 to 20 times their real length for visualization. The direction of the arrow represents the direction of pixel flow, and the relative length reflects speed (the longer the faster).

Figure 32:
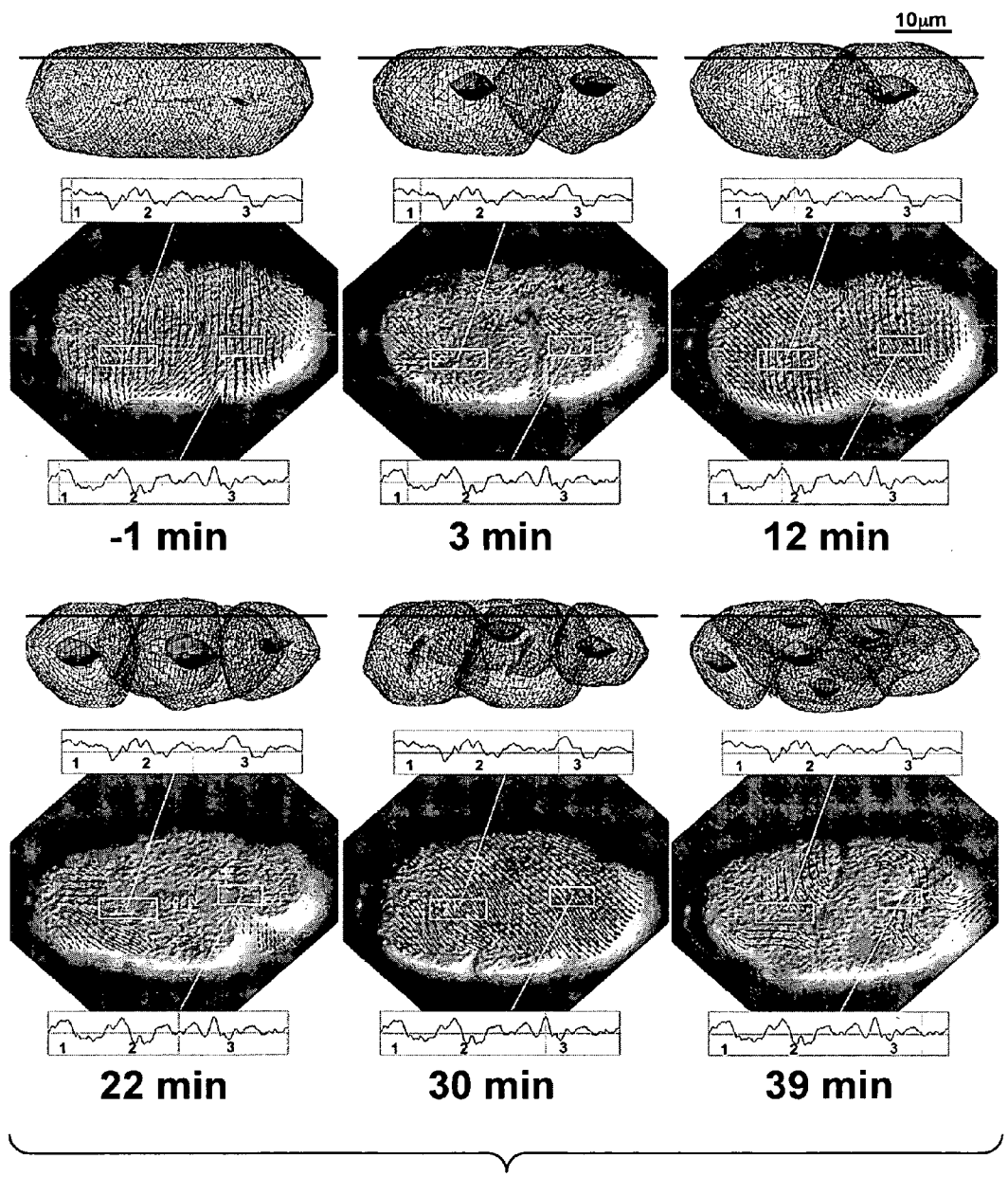
FIG. 32 illustrates two dimensional descriptions of cytoplasmic flow at different depths of the embryo through the generation of vector flow plots of particles in the cytoplasm, according to an embodiment of the invention.

FIG. 32 illustrates two dimensional descriptions of cytoplasmic flow at different depths of the embryo through the generation of vector flow plots of particles in the cytoplasm, according to an embodiment of the invention. For direct image reconstructions, a single plane of choice is analyzed in time, as described by the green line through the image viewed form the side in the upper panel at each time point in FIG. 32. This provides the continuous generation of "vector flow plots" (groups of blue arrows) over time. In FIG. 32, vector flow plots were selected for presentation at 0, 3, 11, 20, 26 and 34 minutes after the first mitosis. Two regions of the vector flow plots were then monitored for velocity over time, and these data were continuously graphed above and below the vector flow plot images. The plots are connected to the general are of analysis by yellow lines. The vertical green line along each graph defines the time point of the respective vector flow plot. It is noteworthy that peaks in velocity usually precede cell divisions. This method provides a remarkable description of cytoplasmic flow, but is presently two-dimensional. Operations are now being written in 3D-DIASemb to generate 3D vector flow plots.

What is claimed is:

1. A method comprising:
   receiving a number of optical sections of different parts of an embryo over time along a Z-axis through differential interference contrast microscopy;
   outlining a perimeter of the number of parts of the embryo within the number of optical sections;
   generating a three-dimensional faceted image of the number of parts based on the outlined perimeter; and
   reconstructing, separately, a four-dimensional image of a growth of the different parts of the embryo over time based on the three-dimensional facet image of the number of parts.

2. The method of claim 1 comprising isolating viewing of one of the number of parts of the embryo.

3. The method of claim 1, wherein the number of parts includes a number of cells and a number of nuclei of the embryo.

4. The method of claim 1, wherein the outlining of the perimeter of the number of parts of the embryo within the number of optical sections includes,
   locating a periphery of the number of parts within the number of optical sections based on a complexity threshold operation;
   dilating outlines of the periphery of the number of parts within the number of optical sections;
   removing pixels, within the number of optical sections, having grayscale values below a grayscale threshold value; and
   eroding the dilated outlines of the periphery of the parts within the number of optical sections.

5. The method of claim 1, generating the three-dimensional faceted image of a part of the number of parts based on the outlined perimeter includes,
   generating a top wrap for the three-dimensional faceted image of the part;
   generating a bottom wrap for the three-dimensional faceted image of the part;
   generating a number of facets within the top wrap and the bottom wrap based on a division of the top wrap and the bottom wrap according to vertical and horizontal contour lines;
   identifying a seam that defines an intersection of the facets of the top wrap with the facets of the bottom wrap; and
   joining the top wrap and the bottom wrap at the identified seam.

6. The method of claim 5, wherein generating the top wrap for the three-dimensional faceted image of a part of the number of parts includes,
   assigning the number of optical sections a height corresponding to a focal depth for the optical section based on a viewing attitude of 90 degrees;
   identifying pixels in the number of optical sections, which are not overlapped by other optical sections and defined by the outlined perimeter of the part;
   assigning X,Y,Z coordinates to the identified pixels.

7. The method of claim 6, wherein generating the bottom wrap for the three-dimensional faceted image of a part of the number of parts includes,
   assigning the number of optical sections a height corresponding to a focal depth for the optical section based on a viewing attitude of a minus 90 degrees;
   identifying pixels in the number of optical sections, which are not overlapped by other optical sections and defined by the outlined perimeter of the part;
   assigning X,Y,Z coordinates to the identified pixels.

8. A method comprising:
   receiving a number of optical sections of a number of objects over time along a Z-axis through differential interference contrast microscopy;
   outlining a perimeter of the number of objects within the number of optical sections, wherein the outline includes a locating operation, a dilating operation, a removing operation and an eroding operation, wherein the locating operation includes locating a periphery of the number objects within the number of optical sections based on a complexity threshold operation, the dilating operation including dilating outlines of the periphery of the number of objects within the number of optical sections, the removing operation includes removing pixels, within the number of optical sections, having grayscale values below a grayscale threshold value, wherein the eroding operation includes eroding the dilated outlines of the periphery of the number of objects within the number of optical sections;
   generating, separately, a three-dimensional faceted image of a part of the number of parts based on the outlined perimeter; and
   reconstructing, separately, a four-dimensional image of a growth of the number of objects over time based on the three-dimensional facet image of the number of objects.

9. The method of claim 8 comprising isolating viewing of one of the number of objects.

10. The method of claim 8, wherein the number of objects includes a number of cells and a number of nuclei of the embryo.

11. The method of claim 8, generating, separately, the three-dimensional faceted image of an object of the number of objects based on the outlined perimeter includes, generating a top wrap for the three-dimensional faceted image of the object;

generating a bottom wrap for the three-dimensional faceted image of the object;

generating a number of facets within the top wrap and the bottom wrap based on a division of the top wrap and the bottom wrap according to vertical and horizontal contour lines;

identifying a seam that defines an intersection of the facets of the top wrap with the facets of the bottom wrap; and joining the top wrap and the bottom wrap at the identified seam.

12. The method of claim 11, wherein generating the top wrap for the three-dimensional faceted image of the object of the number of object includes, assigning the number of optical sections a height corresponding to a focal depth for the optical section based on a viewing attitude of 90 degrees;

identifying pixels in the number of optical sections, which are not overlapped by other optical sections and defined by the outlined perimeter of the object;

assigning X,Y,Z coordinates to the identified pixels.

13. The method of claim 12, wherein generating the bottom wrap for the three-dimensional faceted image of the object of the number of objects includes, assigning the number of optical sections a height corresponding to a focal depth for the optical section based on a viewing attitude of a minus 90 degrees;

identifying pixels in the number of optical sections, which are not overlapped by other optical sections and defined by the outlined perimeter of the object;

assigning X,Y,Z coordinates to the identified pixels.

14. An apparatus comprising:

an input/output logic to receive a number of frames of images of a growth over time of an embryo having a number of cells that include a number of nuclei;

a storage disk to store the received number of frames of images of the growth over time of the embryo having the number of cells that include the number of nuclei; and a digital image analysis logic to outline a perimeter of the number of cells and to separately outline a perimeter of the number of nuclei for the number of frames of images of the growth over time of the embryo, wherein the digital image analysis logic is to generate a four dimensional reconstruction of the growth over time of the embryo based on a three-dimensional faceted image of the number of cells and the number of nuclei using the perimeter outline of the number of cells and the perimeter outline of the number of nuclei.

15. The apparatus of claim 14, wherein the number of frames of images include a number of optical sections of the number of cells and the number of nuclei captured at different focal depths along a Z-axis of a capturing device.

16. The apparatus of claim 14, wherein the digital image analysis logic is to locate a periphery of the number of cells and to locate a periphery of the number of nuclei based on a complexity threshold operation as part of the outline of the perimeter of the number of cells and the separately outline of the perimeter of the number of nuclei.

17. The apparatus of claim 16, wherein the digital image analysis logic is to dilate outlines of the periphery of the number of cells and the number of nuclei as part of the outline of the perimeter of the number of cells and the separately outline of the perimeter of the number of nuclei.

18. The apparatus of claim 17, wherein the digital image analysis logic is to erode the dilated outlines of the periphery of the number of cells and the number of nuclei as part of the outline of the perimeter of the number of cells and the separately outline of the perimeter of the number of nuclei.

19. A system comprising:

a microscope having a focus knob, wherein the microscope is to receive an embryo having a number of cells and a number of nuclei;

a stepping motor to adjust the microscope, through the focus knob, at a number of different focus depths along the Z-axis;

a camera to capture growth of the embryo over time based a number of optical sections of the number of cells and the number of nuclei of the embryo through the microscope at a number of different focus depths;

a recorder to record the captured number of optical sections in a media, wherein the recorder includes a frame grabber to digitize the number of optical sections;

a computing device to store the number of digitized optical sections into a storage disk, wherein the computing device includes a digital image analysis logic to outline a perimeter of the number of cells and to separately outline the number of nuclei for the number of digitized optical sections over time of the embryo, wherein the digital image analysis logic is to generate a four dimensional reconstruction of the growth over time of the embryo based on a three-dimensional faceted image of the number of cells and the number of nuclei using the perimeter outline of the number of cells and the perimeter outline of the number of nuclei; and a display to display the four dimensional reconstruction of the growth over time of the embryo.

20. The system of claim 19, wherein the digital image analysis logic is to locate a periphery of the number of cells and to locate a periphery of the number of nuclei based on a complexity threshold operation as part of the outline of the perimeter of the number of cells and the separately outline of the perimeter of the number of nuclei.

21. The system of claim 20, wherein the digital image analysis logic is to dilate outlines of the periphery of the number of cells and the number of nuclei as part of the outline of the perimeter of the number of cells and the separately outline of the perimeter of the number of nuclei.

22. The system of claim 21, wherein the digital image analysis logic is to erode the dilated outlines of the periphery of the number of cells and the number of nuclei as part of the outline of the perimeter of the number of cells and the separately outline of the perimeter of the number of nuclei.

23. A machine-readable medium that provides instructions, which when executed by a machine, cause said machine to perform operations comprising:

receiving a number of optical sections of different parts of an embryo over time along a Z-axis through differential interference contrast microscopy;

outlining a perimeter of the number of parts of the embryo within the number of optical sections;

generating a three-dimensional faceted image of the number of parts based on the outlined perimeter; and reconstructing, separately, a four-dimensional image of a growth of the different parts of the embryo over time based on the three-dimensional facet image of the number of parts.

24. The machine-readable medium of claim 23 comprising isolating viewing of one of the number of parts of the embryo.

25. The machine-readable medium of claim 23, wherein the number of parts includes a number of cells and a number of nuclei of the embryo.

26. The machine-readable medium of claim 23, wherein the outlining of the perimeter of the number of parts of the embryo within the number of optical sections includes,
- locating a periphery of the number of parts within the number of optical sections based on a complexity threshold operation;
- dilating outlines of the periphery of the number of parts within the number of optical sections;
- removing pixels, within the number of optical sections, having grayscale values below a grayscale threshold value; and
- eroding the dilated outlines of the periphery of the parts within the number of optical sections.

27. The machine-readable medium of claim 23, generating the three-dimensional faceted image of a part of the number of parts based on the outlined perimeter includes,
- generating a top wrap for the three-dimensional faceted image of the part;
- generating a bottom wrap for the three-dimensional faceted image of the part;
- generating a number of facets within the top wrap and the bottom wrap based on a division of the top wrap and the bottom wrap according to vertical and horizontal contour lines;
- identifying a seam that defines an intersection of the facets of the top wrap with the facets of the bottom wrap; and
- joining the top wrap and the bottom wrap at the identified seam.

28. The machine-readable medium of claim 27, wherein generating the top wrap for the three-dimensional faceted image of a part of the number of parts includes,
- assigning the number of optical sections a height corresponding to a focal depth for the optical section based on a viewing attitude of 90 degrees;
- identifying pixels in the number of optical sections, which are not overlapped by other optical sections and defined by the outlined perimeter of the cell;
- assigning X,Y,Z coordinates to the identified pixels.

29. The machine-readable medium of claim 28, wherein generating the bottom wrap for the three-dimensional faceted image of a part of the number of parts includes,
- assigning the number of optical sections a height corresponding to a focal depth for the optical section based on a viewing attitude of a minus 90 degrees;
- identifying pixels in the number of optical sections, which are not overlapped by other optical sections and defined by the outlined perimeter of the cell;
- assigning X,Y,Z coordinates to the identified pixels.

30. A machine-readable medium that provides instructions, which when executed by a machine, cause said machine to perform operations comprising:
- receiving a number of optical sections of a number of objects over time along a Z-axis through differential interference contrast microscopy;
- outlining a perimeter of the number of objects within the number of optical sections, wherein the outline includes a locating operation, a dilating operation, a removing operation and an eroding operation, wherein the locating operation includes locating a periphery of the number objects within the number of optical sections based on a complexity threshold operation, the dilating operation including dilating outlines of the periphery of the number of objects within the number of optical sections, the removing operation includes removing pixels, within the number of optical sections, having grayscale values below a grayscale threshold value, wherein the eroding operation includes eroding the dilated outlines of the periphery of the number of objects within the number of optical sections;
- generating, separately, a three-dimensional faceted image of a part of the number of parts based on the outlined perimeter; and
- reconstructing, separately, a four-dimensional image of a growth of the number of objects over time based on the three-dimensional facet image of the number of objects.

31. The machine-readable medium of claim 30 comprising isolating viewing of one of the number of objects.

32. The machine-readable medium of claim 30, wherein the number of objects includes a number of cells and a number of nuclei of the embryo.

33. The machine-readable medium of claim 30, generating, separately, the three-dimensional faceted image of an object of the number of objects based on the outlined perimeter includes,
- generating a top wrap for the three-dimensional faceted image of the object;
- generating a bottom wrap for the three-dimensional faceted image of the object;
- generating a number of facets within the top wrap and the bottom wrap based on a division of the top wrap and the bottom wrap according to vertical and horizontal contour lines;
- identifying a seam that defines an intersection of the facets of the top wrap with the facets of the bottom wrap; and
- joining the top wrap and the bottom wrap at the identified seam.

34. The machine-readable medium of claim 33, wherein generating the top wrap for the three-dimensional faceted image of the object of the number of object includes,
- assigning the number of optical sections a height corresponding to a focal depth for the optical section based on a viewing attitude of 90 degrees;
- identifying pixels in the number of optical sections, which are not overlapped by other optical sections and defined by the outlined perimeter of the object;
- assigning X,Y,Z coordinates to the identified pixels.

35. The machine-readable medium of claim 34, wherein generating the bottom wrap for the three-dimensional faceted image of the object of the number of objects includes,
- assigning the number of optical sections a height corresponding to a focal depth for the optical section based on a viewing attitude of a minus 90 degrees;
- identifying pixels in the number of optical sections, which are not overlapped by other optical sections and defined by the outlined perimeter of the object;
- assigning X,Y,Z coordinates to the identified pixels.

* * * * *

UNITED STATES PATENT AND TRADEMARK OFFICE
CERTIFICATE OF CORRECTION

PATENT NO. : 7,194,124 B2
APPLICATION NO. : 10/409838
DATED : March 20, 2007
INVENTOR(S) : Soll et al.

It is certified that error appears in the above-identified patent and that said Letters Patent is hereby corrected as shown below:

In column 1, line 30, delete "metastic," and insert -- metastatic, --, therefor.

In column 13, line 57, delete "erosionis" and insert -- erosions --, therefor.

In column 17, line 67, delete "1396" and insert -- 1350 --, therefor.

In column 20, line 58, delete "$Y[f-I]/I)^2$" and insert -- $Y[f-I])/I)^2$ --, therefor.

In column 20, line 62, delete "$Y[f-I]/I)^2$" and insert -- $Y[f-I])/I)^2$ --, therefor.

In column 20, line 67, delete "X[F–I])," and insert -- X[f–I]), --, therefor.

In column 20, line 67, delete "Y[f–I) ]" and insert -- Y[f–I])] --, therefor.

In column 20, line 68, delete "(f – 1 < 1)" and insert -- (f – I < 1) --, therefor.

In column 21, line 1, delete "Y[f–I) ]." and insert -- Y[f–I])]. --, therefor.

In column 21, line 2, delete "(f – 1 < 1)" and insert -- (f – I < 1) --, therefor.

In column 21, line 4, delete "(f – 1 ≥1)" and insert -- (f – I ≥1) --, therefor.

In column 21, line 24, delete "(f + 1 ≤f)," and insert -- (f + I ≤f), --, therefor.

In column 24, line 67, delete "parametization" and insert -- parametrization --, therefor.

In column 27, line 43, delete "Golumb" and insert -- Golomb --, therefor.

In column 31, line 20, delete "Ouantitating" and insert -- Quantitating --, therefor.

UNITED STATES PATENT AND TRADEMARK OFFICE
CERTIFICATE OF CORRECTION

PATENT NO. : 7,194,124 B2
APPLICATION NO. : 10/409838
DATED : March 20, 2007
INVENTOR(S) : Soll et al.

It is certified that error appears in the above-identified patent and that said Letters Patent is hereby corrected as shown below:

In column 38, line 3, in Claim 30, after "number" insert -- of --.

Signed and Sealed this

Sixteenth Day of December, 2008

JON W. DUDAS
*Director of the United States Patent and Trademark Office*